United States Patent [19]

Ito et al.

[11] Patent Number: 5,475,666
[45] Date of Patent: Dec. 12, 1995

[54] OPTICALLY MODULATED OVERWRITABLE RECORDING DEVICE

[75] Inventors: Masaya Ito; Osamu Ito; Kouichi Yamada; Masayoshi Shimamoto; Yoshiki Nakajima; Kouichi Takeuchi; Kyousuke Yoshimoto, all of Amagasaki, Japan

[73] Assignee: Mitsubishi Denki Kabushiki Kaisha, Tokyo, Japan

[21] Appl. No.: 25,944

[22] Filed: Mar. 3, 1993

[30] Foreign Application Priority Data

| Mar. 4, 1992 | [JP] | Japan | 4-046830 |
| Mar. 30, 1992 | [JP] | Japan | 4-074369 |
| Apr. 2, 1992 | [JP] | Japan | 4-080808 |
| Apr. 8, 1992 | [JP] | Japan | 4-087051 |
| Apr. 10, 1992 | [JP] | Japan | 4-091139 |
| Apr. 16, 1992 | [JP] | Japan | 4-096385 |
| Jan. 14, 1993 | [JP] | Japan | 5-005203 |

[51] Int. Cl.$^6$ ................................................. G11B 7/00
[52] U.S. Cl. ........................ 369/54; 369/73; 369/116
[58] Field of Search .......................... 369/54, 58, 59, 369/48, 116, 111, 44.26, 44.32, 13, 112, 124

[56] References Cited

U.S. PATENT DOCUMENTS

| 4,631,713 | 12/1986 | Romeas et al. | 369/54 |
| 4,788,674 | 11/1988 | Maeda et al. | 369/116 |
| 5,050,156 | 9/1991 | Barton | 369/116 |
| 5,060,208 | 10/1991 | Nagai et al. | 369/58 |
| 5,070,495 | 12/1991 | Bletscher, Jr. et al. | 369/116 |
| 5,134,606 | 7/1992 | Sekiguchi et al. | 369/116 |
| 5,216,663 | 6/1993 | Tsutsumi et al. | 369/275.2 |
| 5,249,172 | 9/1993 | Hagihara et al. | 369/116 |
| 5,255,007 | 10/1993 | Bakx | 369/116 |

FOREIGN PATENT DOCUMENTS

| 1-102739 | 4/1989 | Japan . |
| 3-91124 | 4/1991 | Japan . |
| 3-116566 | 5/1991 | Japan . |

OTHER PUBLICATIONS

B. Bartholomeusz et al., "Simple Predictive Models for the Thermal Response of Optical Data Storage Media", *J. Appl. Phys.* 66(10), pp. 4635–4639, Nov. 15, 1989.

B. Bartholomeusz et al., "Influence of Laser Read and Bias Power Levels on the Performance of Thermomagnetooptic Recording Media", *Applied Optics*, vol. 29, No. 20, pp. 3030–3039, Jul. 10, 1990.

Primary Examiner—Georgia Y. Epps
Assistant Examiner—Nabil Hindi
Attorney, Agent, or Firm—Burns, Doane, Swecker & Mathis

[57] ABSTRACT

A recording device for recording information upon optically modulated overwritable magneto-optical recording medium including four magnetic layers first records DC "1" and then a test signal at high and low recording laser power levels upon a test track of the recording medium. The high and low recording laser power levels are successively modified to scan a two-dimensional region of the high and low recording laser power levels, and the optimal high and low recording laser power levels are determined on the basis of the reproduction signal levels corresponding to respective combination of high and low recording laser power levers. The reproduction signal levels are represented upon the α-K plane which is divided into six characteristic regions, The optimal combination of high and low recording laser power levels is determined as a representative point within the region of correct reproduction with a predetermined allowance.

29 Claims, 32 Drawing Sheets

OPTICALLY MODULATED OVERWRITABLE RECORDING DEVICE

BACKGROUND OF THE INVENTION

This invention relates to optically modulated overwritable recording devices by which the new information can be written directly over the old information upon a magneto-optical recording medium.

A conventional optically modulated overwritable magneto-optical recording medium is disclosed, for example, in Japanese patent application No. 1-154918. In the case of such a overwritable magneto-optical medium, the old information is erased simultaneously as the new information is recorded on the medium. FIG. 36 shows the stable recording temperature ranges or temperature patterns for recording information upon the recording medium. As shown in FIG. 36, the medium exhibits two temperature threshold levels $T_{C1}$ and $T_{C2}$. When recording information in the form of 1's and 0's, the laser power is modulated at two levels. The "1" is recorded at a high level above the threshold level $T_{C2}$ (e.g., at the peak levels of the temperature patterns 1, 3 and 4), while "0" is recorded at a low level between the two threshold levels $T_{C1}$ and $T_{C2}$ (e.g., at the peak levels of the temperature patterns 2 and 5). When either "1" or "0" is recorded, the old information previously recorded upon the recording medium is erased simultaneously. When the laser power is below the threshold level $T_{C1}$, no recording or erasure is effected (temperature pattern 6).

In the case of the non-overwritable medium, on the other hand, the old information is erased by reversing the externally applied magnetic field before the new information is recorded upon the medium. Thus, the laser power for recording "1" and "0" are substantially at the same levels. As a result, the non-overwritable medium exhibits wide margins for the permissible laser power levels.

In the case of the optically modulated overwritable medium illustrated in FIG. 36, on the other hand, three distinct levels must be distinguished: the high power level for recording "1" (the first recording power level); the intermediate level for recording "0" (the second recording power level or the so-called erasure power level); and the low power level for reproducing the recorded information (the reproduction power level). Thus, the margins or allowances of the laser power levels for recording "1" and "0" are much narrower.

FIG. 37a shows the allowable recording power range of a non-overwritable magneto-optical recording medium. Due to the variation of the sensitivity to the recording laser power level, the allowable recording laser power range differs from one medium to another. The allowable range also varies with the change in ambient temperature. The margin or the allowable range of the recording laser power level for each medium, however, is sufficiently wide. Thus, the common allowable range for all the media put to use over the service temperature range exhibits a substantial width as represented by the white arrow (at the legend 'the allowable range for write "1"') at the bottom of FIG. 37a. The laser power level for recording information can thus be set without difficulty.

FIG. 37b shows the allowable recording power ranges of an overwritable magneto-optical recording medium. Since the power level for recording "0" must be distinct from the power level fop recording "1" the allowable ranges of the recording laser power levels for each medium are narrowed. Thus, the common allowable ranges of the recording laser power levels for writing "1" and "0" for all the media put to use over the service temperature range are extremely narrow, as represented by two short white arrows (at the legends 'allowable range for write "0"' and 'allowable range for write "1"') at the bottom of FIG. 37b.

It is thus difficult to determine the appropriate power levels for recording "1" and "0" upon an overwritable magneto-optical recording medium. An expensive spectrum analyzer is necessary for measuring and determining the optimal recording power levels for recording information upon the overwritable medium. Namely, the threshold level $T_{C2}$ of the overwritable medium is determined by the level of the recording characteristic, and in particular is obtained as the range of the high laser power level in which the ratio C/N of the carrier level to the noise level N exceeds a reference level. On the other hand, the threshold level $T_{C1}$ is determined by the level of the erasure characteristic, and is obtained, for example, as the range of the laser power level satisfying the following condition. Assume that a signal $f_1$ is recorded upon the medium, and then a new signal $f_2$ is written over the old signal $f_1$ recorded on the medium. Then, the remnant amount of the signal $f_1$ should be below a predetermined reference level. The predetermined reference level of the remnant amount after erasure is, for example, from −40 dB to −25 dB, and a spectrum analyzer is necessary for measuring the amount of the feeble remnant old signal $f_1$ embedded in the newly recorded signal $f_2$. The spectrum analyzer is thus needed for determining the optimal recording power levels of the overwritable medium.

A method of controlling the recording and reproduction upon this kind of optically modulated overwritable medium is disclosed, for example, in Japanese Laid-Open Patent (Kokai) No. 3-116566. According to this Japanese patent, the optimal laser power levels for the recording, the reproduction, and the erasure are determined by evaluating 1) the error rate of recording data 2) the DC recording level, and 3) the test signal recording level. The evaluations are effected with the high and the low laser power levels as the parameters. Thus, according to this Japanese patent, the overwriting characteristic is comprehended in terms of the recording and the erasure processes, and the high laser power level and the low laser power level are varied linearly to determine the optimal laser power levels. However, it is difficult to determine the optimal recording power levels with high precision and with a high degree of reliability when the sensitivity of the recording medium or the ambient temperature varies. For example, the evaluation of the error rate is time-consuming. For the purpose of obtaining the bit error rate of $10^{-6}$, as many as $10^7$ data bits must be monitored. Thus, this method is not suitable for the quasi-real time processing which is required when booting the device or exchanging the recording medium. Further, with respect to the recording of the test signal, the evaluation of the erasure characteristic is effected by monitoring the erasure level. The precise measurement of the erasure level, however, is difficult.

In summary, the conventional optically modulated overwritable recording device has the following disadvantage. Since the appropriate recording laser power levels are extremely narrow and the measurements thereof may be adversely affected by the adjustment errors and the variation in the ambient temperature, the determination of the optimal laser power levels is difficult and requires an expensive spectrum analyzer, and even using a spectrum analyzer, it is sometimes impossible.

SUMMARY OF THE INVENTION

It is therefore an object of this invention to provide a recording device for recording information upon optically modulated overwritable magneto-optical recording medium by which the optimal combination of high and low recording laser power levels for each medium can be determined accurately and rapidly such that information can be recorded and reproduced reliably from the overwritable recording media in spite of the variance in the sensitivity of the media or the changes in the ambient temperature.

The above object is accomplished in accordance with the principle of this invention by a recording device for recording information upon an optically modulated overwritable magneto-optical recording medium. The recording device includes: laser output means for radiating a laser beam upon the recording medium at a high and a low recording laser power level and at a reproduction laser power level which is lower than the high and low recording laser power levels; level detector means for detecting a signal level reproduced from the recording medium; and driver and controller means for driving the laser output means means for recording and reproduction of a two-value signal, wherein the driver and controller means drives the laser output means at the high and low recording laser power levels to record the two-value signal upon the recording medium, the driver and controller means setting drive levels of the high and low recording laser power levels of the laser output means and supplying the signal to be recorded upon the recording medium to the laser output means;

wherein the driver and controller means includes test recording and reproduction means and determines an optimal combination of the high and low recording laser power levels by means of the test recording and reproduction means which comprises: means for driving the laser output means at a fixed high recording laser power level to record a DC high level signal upon a track of the recording medium; means for driving the laser output means at test levels of the high and low recording laser power levels to record a test signal upon the track of the recording medium, a combination of test levels of the high and low recording laser power levels being successively modified to scan a two-dimensional region of the high and low recording laser power levels; means for driving the laser output means at the reproduction laser power level to reproduce the test signal from the track; means for storing reproduction signal levels corresponding to successive combinations of the test levels of the high and low recording laser power levels detected by means of the level detector; and means for determining the optimal combination of the high and low recording laser power levels on the basis of the stored reproduction signal levels.

Alternatively, the above object is accomplished by a recording device for recording information upon an optically modulated overwritable magneto-optical recording medium, which includes: laser output means for radiating a laser beam upon the recording medium at a high and a low recording laser power level and at a reproduction laser power level which is lower than the high and low recording laser power levels; level detector means for detecting a signal level reproduced from the recording medium; and driver and controller means for driving the laser output means for recording and reproduction of a two-value signal; wherein the driver and controller means drives the laser output means at the high and low recording laser power levels to record the two-value signal upon the recording medium, the driver and controller means setting drive levels of the high and low recording laser power levels of the laser output means and supplying the signal to be recorded upon the recording medium to the laser output means;

wherein the driver and controller means includes test recording and reproduction means and determines an optimal combination of the high and low recording laser power levels by means of the test recording and reproduction means which comprises: means for driving the laser output means at test levels of the high and low recording laser power levels to record a test signal upon the track of the recording medium, wherein a combination of the test levels of the high and low recording laser power levels is successively modified to scan a two-dimensional region of the high and low recording laser power levels; means for driving the laser output means at the reproduction laser power level to reproduce the test signal recorded upon the track at the high and low recording laser power levels, wherein a reproduction signal level corresponding to each combination of the test levels of the high and low recording laser power levels is determined by means of the level detector means; means for representing reproduction signal levels corresponding to the combinations of test levels of the high and low recording laser power levels upon two-dimensional coordinate plane of a first coordinate corresponding to the high recording laser power level and a second coordinate corresponding to a ratio of the low recording laser power level to the high recording laser power level, the two-dimensional coordinate plane being divided into a plurality of characteristic regions of reproduction signal levels by means of a plurality of boundary lines; means for determining an allowable region within one characteristic region of the plurality of regions upon the two-dimensional coordinate plane, the one characteristic region corresponding to combinations of the high and low recording laser power levels at which the signal is reproduced correctly; and means for determining a representative point within the allowable region, a combination of the coordinates of the representative point determining the optimal combination of the high and low recording laser power levels.

Preferably, the means for determining the allowable region first determines an initial point substantially corresponding to a combination of the high and low recording laser power levels both set equal to the reproduction laser power level, and then successively crosses the boundary lines by means of linear calculations based on linear gradient characteristic of the reproduction signal levels upon the two-dimensional coordinate plane to reach within the one characteristic region.

Still alternatively, the above object is accomplished by a recording device for recording information upon an optically modulated overwritable magneto-optical recording medium, which includes: laser output means for radiating a laser beam upon the recording medium at a high and a low recording laser power level and at a reproduction laser power level which is lower than the high and low recording laser power levels; and driver and controller means for driving the laser output means for recording and reproduction of a two-value signal, wherein the driver and controller means drives the laser output means at the high and low recording laser power levels to record the two-value signal upon the recording medium, the driver and controller means setting drive levels of the high and low recording laser power levels of the laser output means and supplying the signal to be recorded upon the recording medium to the laser output means;

wherein the driver and controller means includes test recording and reproduction means and determines an optimal combination of the high and low recording laser power levels by means of the test recording and reproduction means including: means for driving the laser output means at test levels of the high and low recording laser power levels to record a test signal upon a track of the recording medium, a combination of test levels of the high and low recording laser power levels being successively modified to scan a two-dimensional region of the high and low recording laser power levels; means for driving the laser output means at the reproduction laser power level to reproduce the test signal from the track; means for determining error rates of the reproduced test signal corresponding to successive combinations of the test levels of the high and low recording laser power levels; means for determining combinations of the test levels of the high and low recording laser power levels at which the error rate of the reproduced signal is less than a predetermined reference level; and means for selecting a combination of a lowest laser power level as the optimal combination of the high and low recording laser power levels, from among combinations selected by the means for determining combinations.

Preferably, the error rates determining means of the test recording and reproduction means includes: means for defining detection windows within which respective bits of the two-value signal are detected; and means for narrowing a width of the detection windows during reproduction of the test signal. Still preferably, the test recording and reproduction means further includes means for multiplying by a predetermined factor the high and low recording laser power levels of the optimal combination selected by the selecting means, thereby obtaining an operating optimal combination of the high and low recording laser power levels. It is further preferred that the selecting means selects as the combination of lowest laser power level a combination of the high and low recording laser power levels exhibiting a smallest product or sum of the high and low recording laser power levels.

Further, the above object is accomplished by a recording device for recording information upon an optically modulated overwritable magneto-optical recording medium, which includes: laser output means for radiating a laser beam upon the recording medium at a high and a low recording laser power level and at a reproduction laser power level which is lower than the high and low recording laser power levels; level detector means for detecting a signal level reproduced from the recording medium; and driver and controller means for driving the laser output means means for recording and reproduction of a two-value signal, wherein the driver and controller means drives the laser output means at the high and low recording laser power levels to record the two-value signal upon the recording medium, the driver and controller means setting drive levels of the high and low recording laser power levels of the laser output means and supplying the signal to be recorded upon the recording medium to the laser output means;

wherein the driver and controller means includes test recording and reproduction means and determines an optimal combination of the high and low recording laser power levels by means of the test recording and reproduction means which comprises: means for driving the laser output means at test levels of the high and low recording laser power levels to record a test signal upon the track of the recording medium, a combination of the test levels of the high and low recording laser power levels being successively modified to scan at least three points lying on a line within a two-dimensional region of the high and low recording laser power levels; means for driving the laser output means at the reproduction laser power level to reproduce the test signal from the track; means for determining respective reproduction signal levels of the test signal recorded at the test levels of the high and low recording laser power levels corresponding to the three points, respectively, lying upon the line; means for approximating a distribution of the reproduction signal level along the line on the basis of the reproduction signal levels corresponding to the three points; and means for determining the optimal combination of high and low recording laser power levels on the basis of the distribution of the reproduction signal level upon the line.

Preferably, the optimal combination determining means determines a central point of the three points as representing the optimal combination of the high and low recording laser power levels, if the reproduction signal levels corresponding to the three points all exceed a predetermined allowable level.

Still further, the above object is accomplished by a recording device for recording information upon an optically modulated overwritable magneto-optical recording medium, which includes: laser output means for radiating a laser beam upon the recording medium at a high and a low recording laser power level and at a reproduction laser power level which is lower than the high and low recording laser power levels; driver and controller means for driving the laser output means for recording and reproduction of a two-value signal, wherein the driver and controller means drives the laser output means at the high and low recording laser power levels to record the two-value signal upon the recording medium, the driver and controller means setting drive levels of the high and low recording laser power levels of the laser output means and supplying the signal to be recorded upon the recording medium to the laser output means; and wherein the driver and controller means includes test recording and reproduction means and determines an optimal combination of the high and low recording laser power levels by means of the test recording and reproduction means which includes: means for driving the laser output means at test levels of the high and low recording laser power levels to record a two-value test signal upon a track of the recording medium, a combination of test levels of the high and low recording laser power levels being successively modified to scan a two-dimensional region of the high and low recording laser power levels; means for driving the laser output means at the reproduction laser power level to reproduce the test signal from the track; means for defining detection windows for detecting respective bits of the two-value signal, and for shifting the detection windows by a predetermined shift amount in a delaying and advancing direction; means for determining first and second error rates of the reproduced test signal obtained, respectively, when the detection windows are shifted in the delaying and advancing direction, respectively, by means of the shifting means, the first and second error rates being determined for each successive combination of the test levels of the high and low recording laser power levels; means for determining combinations of the test levels of the high and low recording laser power levels at which the first and second error rates of the reproduced signal are both less than a predetermined reference level; and means for determining an average of a maximum and a minimum of the high recording laser power levels, and an average of a maximum and a minimum of the low recording laser power levels, of the combinations determined by the combinations determining means, the optimal combination of high and low recording laser power levels being determined as a combination of the two averages.

Still further, the above object is accomplished by a recording device for recording information upon an optically modulated overwritable magneto-optical recording medium, which includes: laser output means for radiating a laser beam upon the recording medium at a high and a low recording laser power level and at a reproduction laser power level which is lower than the high and low recording laser power levels; driver and controller means for driving the laser output means for recording and reproduction of a two-value signal, wherein the driver and controller means drives the laser output means at the high and low recording laser power levels to record the two-value signal upon the recording medium, the driver and controller means setting drive levels of the high and low recording laser power levels of the laser output means and supplying the signal to be recorded upon the recording medium to the laser output means; and wherein the driver and controller means includes test recording and reproduction means and determines an optimal combination of the high and low recording laser power levels by means of the test recording and reproduction means which includes: means for driving the laser output means at test levels of the high and low recording laser power levels to record a two-value test signal upon a track of the recording medium, a combination of test levels of the high and low recording laser power levels being successively modified to scan a two-dimensional region of the high and low recording laser power levels; means for driving the laser output means at the reproduction laser power level to reproduce the test signal from the track means for defining detection windows for detecting respective bits of the two-value test signal, and for shifting the detection windows successively by a variable shift amount in a delaying and advancing direction; means for determining error rates of the reproduced test signal obtained when the detection windows are shifted successively by the variable shift amount in the delaying and advancing direction by means of the shifting means; means for determining a window margin corresponding to each combination of the high and low recording laser power levels at which the test signal is recorded, the window margin being a smaller of a delaying and an advancing shift amount wherein error rate obtained with delaying shift of the detection windows smaller than the delaying shift amount is less than a predetermined level and error rate obtained with advancing shift of the detection windows smaller than the advancing shift amount is less than a predetermined level; and means for determining as the optimal combination of high and low recording laser power levels a combination of the test levels of the high and low recording laser power levels at which the window margin is at a maximum.

Further, the above object is accomplished by a recording device for recording information upon an optically modulated overwritable magneto-optical recording medium, which includes: laser output means for radiating a laser beam upon the recording medium at a high and a low recording laser power level and at a reproduction laser power level which is lower than the high and low recording laser power levels; level detector means for detecting a signal level reproduced from the recording medium; and driver and controller means for driving the laser output means means for recording and reproduction of a two-value signal, wherein the driver and controller means drives the laser output means at the high and low recording laser power levels to record the two-value signal upon the recording medium, the driver and controller means setting drive levels of the high and low recording laser power levels of the laser output means and supplying the signal to be recorded upon the recording medium to the laser output means;

wherein the driver and controller means includes test recording and reproduction means and determines an optimal combination of the high and low recording laser power levels by means of the test recording and reproduction means which comprises: means for driving the laser output means at a fixed high recording laser power level to record a DC high level signal upon a track of the recording medium; means for driving the laser output means at test levels of the high and low recording laser power levels to record a test signal upon the track of the recording medium, a combination of test levels of the high and low recording laser power levels being successively modified to scan a two-dimensional region of the high and low recording laser power levels; means for driving the laser output means at the reproduction laser power level to reproduce the test signal from the track; means for representing reproduction signal levels corresponding to successive combinations of the test levels of the high and low recording laser power levels upon a two-dimensional coordinate plane; and means for determining the optimal combination of the high and low recording laser power levels on the basis of the reproduction signal levels represented upon the two-dimensional coordinate plane.

Alternatively, the above object is accomplished by a recording device for recording information upon an optically modulated overwritable magneto-optical recording medium, which includes: laser output means for radiating a laser beam upon the recording medium at a high and a low recording laser power level and at a reproduction laser power level which is lower than the high and low recording laser power levels; level detector means for detecting a signal level reproduced from the recording medium; and driver and controller means for driving the laser output means means for recording and reproduction of a two-value signal, wherein the driver and controller means drives the laser output means at the high and low recording laser power levels to record the two-value signal upon the recording medium, the driver and controller means setting drive levels of the high and low recording laser power levels of the laser output means and supplying the signal to be recorded upon the recording medium to the laser output means;

wherein the driver and controller means includes test recording and reproduction means and determines an optimal combination of the high and low recording laser power levels by means of the test recording and reproduction means which comprises: means for driving the laser output means at a fixed high recording laser power level or a fixed low recording laser power level to record a DC high level signal or a DC low level signal upon a track of the recording medium; means for driving the laser output means at test levels of the high and low recording laser power levels to record a first bit pattern, corresponding to a test signal or a inversion of the test signal, upon the track of the recording medium, and a second bit pattern consisting of inversion of the first bit pattern synchronized with the test signal, a combination of test levels of the high and low recording laser power levels being successively modified to scan a two-dimensional region of the high and low recording laser power levels; means for driving the laser output means at the reproduction laser power level to reproduce the test signal from the track; means for representing reproduction signal levels corresponding to successive combinations of the test levels of the high and low recording laser power levels upon a two-dimensional coordinate plane; and means for determining the optimal combination of the high and low recording laser power levels on the basis of the reproduction signal levels represented upon the two-dimensional coordinate plane.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

OVERWRITABLE MAGNETOOPICAL MEDIA

Figure 1:
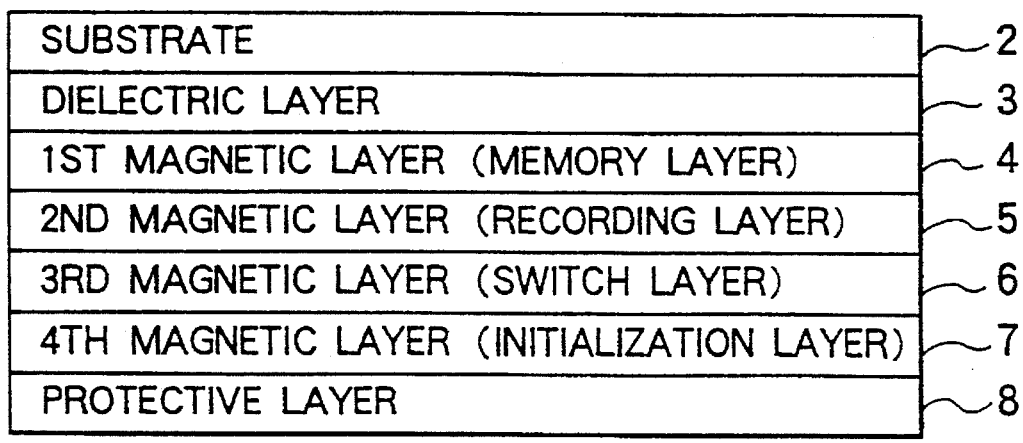
FIG. 1 is a diagrammatic sectional view showing the structure of the overwritable magneto-optical recording medium.

FIG. 1 is a diagrammatic sectional view showing the structure of the overwritable magneto-optical recording medium. The overwritable magneto-optical recording medium 1 is constituted as follows. Upon a substrate 2 made, for example, of glass, are formed, by means of sputtering, etc., a dielectric layer 3, a first magnetic layer 4 serving as the memory layer, a second magnetic layer 5 serving as the recording layer, a third magnetic layer 6 serving as the switch layer, a fourth magnetic layer 7 serving as the initialization layer, and a protective layer 8 for protecting the magnetic layers. As described below, the magnetic layers adjacent to each other are coupled by the exchange forces. The first magnetic layer 4 is the memory layer for storing the information. The second magnetic layer 5 is the recording layer in which the information is first recorded before transcribed to the first magnetic layer 4. The third magnetic layer 6 and the fourth magnetic layer 7 are the additional layers for realizing the direct overwriting operation and do not store information themselves. Namely, the third magnetic layer 6 is the switch layer for intercepting the exchange force from the fourth magnetic layer 7 to the second magnetic layer 5 at a high temperature. The fourth magnetic layer 7 is the initialization layer and the magnetization of the sub-lattice thereof is not inverted within the operating temperature range of the magneto-optical recording medium 1 even when the temperature is raised by the irradiation of the laser. The direction of the magnetization of the fourth magnetic layer 7 is opposite to that of the external biasing magnetic field applied upon the magneto-optical recording medium 1 to record "1".

Figure 2:
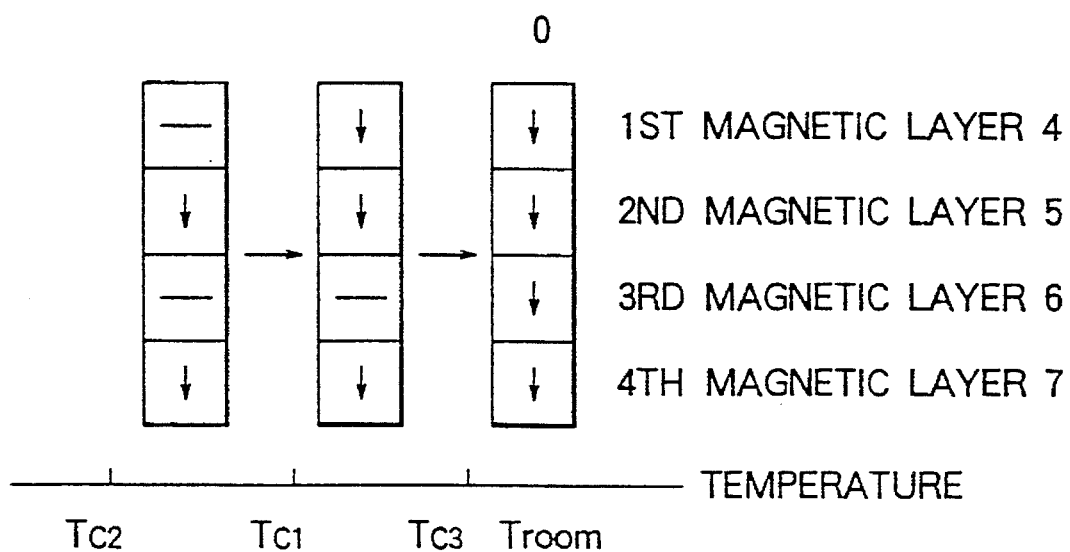
FIG. 2 is a diagram showing the change of the magnetization of the respective magnetic layers during the erasure operation (i.e., the recording of "0" upon the medium)
Figure 3:
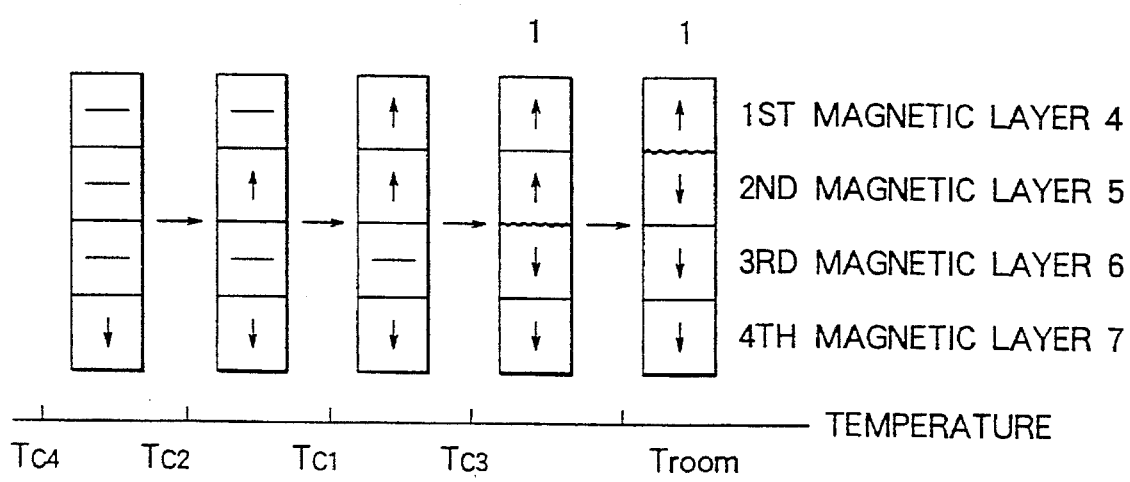
FIG. 3 is a diagram showing the change of the magnetization of the respective magnetic layers during the recording of "1"

FIG. 2 is a diagram showing the change of the magnetization of the respective magnetic layers during the erasure operation (i.e., the recording of "0" upon the medium). FIG. 3 is a diagram showing the change of the magnetization of the respective magnetic layers during the recording of "1". In FIGS. 2 and 3, the arrows within the boxes show the direction of magnetization. The minus sign within a box represents the random state (referred to as the Curie state) above the Curie point (i.e., the Curie temperature). The Curie points $T_{C1}$, $T_{C2}$, and $T_{C3}$ of the first magnetic layer 4, the second magnetic layer 5, and the third magnetic layer 6, and the room temperature $T_{room}$ are ordered as shown upon the temperature scale at the bottom of FIGS. 2 and 3: $T_{C2}$, $T_{C1}$, $T_{C3}$, and $T_{room}$ in descending order. The Curie point $T_{C4}$ of the fourth magnetic layer 7 is higher than the Curie point $T_{C2}$ of the second magnetic layer 5 and is above the operating temperature range of the magneto-optical recording medium 1. The orientation of the magnetization of the first magnetic layer 4 records the bit "1" or "0": the downward directed magnetization records "0" and the upward directed magnetization records "1". The magnetizations of the other magnetic layers (the second through fourth magnetic layers 5 through 7) are always directed downward except when heated above the respective Curie points, as described below, such that the recording or the erasure operation is effected.

Next, referring to FIG. 2, the change of magnetization of respective magnetic layers during the erasure or recording of "0" is described. When the laser power level is raised to the erasure level between the recording level for recording "1" and the reproduction level, the temperature rises to a point which is above the Curie point $T_{C1}$ of the first magnetic layer 4 but is below the Curie point $T_{C2}$ of the second magnetic layer 5. The states of the respective magnetic layers are shown within the boxes at the left column of boxes in FIG. 2. Thus, the first magnetic layer 4 and the third magnetic layer 6 are above the respective Curie points and in the random magnetization state, while the magnetization of the second magnetic layer 5 and the fourth magnetic layer 7 remains in the downward aligned state. Thereafter, as the temperature falls below the Curie point $T_{C1}$ of the first magnetic layer 4 to the state represented by the middle column of boxes in FIG. 2, the magnetization of the second magnetic layer 5 is transcribed to the first magnetic layer 4 and the first magnetic layer 4 obtains the downward magnetization and thereby stores the bit "0". When the temperature further falls to the room temperature $T_{room}$, the third magnetic layer 6 resumes the downward magnetization due to the exchange force from the fourth magnetic layer 7. The final state of the magnetic layers recording "0" is shown at the right column of boxes. The fourth magnetic layer 7 retains the downward magnetization throughout the process. The third magnetic layer 6 is always in the the downward magnetized state at the room temperature $T_{room}$ due to the exchange force from the fourth magnetic layer 7.

Next, referring to FIG. 3, the change of magnetization of respective magnetic layers during the recording of "1" is described. When the laser power is raised to the high recording level for recording "1", the temperature of the magnetic layers rises to a point which is above the Curie point $T_{C2}$ of the second magnetic,layer 5 but is below the Curie point $T_{C4}$ of the fourth magnetic layer 7. Thus, the first through third magnetic layers 4, 5, and 6 are above the respective Curie points, $T_{C1}$, $T_{C2}$, and $T_{C3}$, and these layers are put in the random magnetization state, as shown within the boxes of the leftmost column in FIG. 3. For recording "1", however, the upward directed external magnetic field is applied upon the magneto-optical recording medium 1. Thus, when the temperature falls below the Curie point $T_{C2}$ to the state shown at the second left column of boxes in FIG. 3, the second magnetic layer 5 acquires the upward magnetization without being affected by the exchange forces acting from the adjacent magnetic layers, the first magnetic layer 4 and the third magnetic layer 6. When the temperature further falls below the Curie point $T_{C1}$ to the state shown at the middle column of boxes, the magnetization of the second magnetic layer 5 is transcribed to the first magnetic layer 4, and "1" is recorded in the first magnetic layer 4. When the temperature further falls below the Curie point $T_{C3}$ as shown at the second right column of boxes, the third magnetic layer 6 is magnetized downward due to the exchange force from the fourth magnetic layer 7. Further, during the time in which the temperature further falls to the room temperature $T_{room}$, the direction of magnetization of the second magnetic layer 5 is aligned with that of the third magnetic layer 6 and the fourth magnetic layer 7. The final state recording "1" is shown at the right in FIG. 3. In this final state, only the first magnetic layer 4 retains upward magnetization for recording "1". At the room temperature $T_{room}$, the magnetization of the second through fourth magnetic layers 5 through 7 are all directed downward. In the second right and the right most column of boxes in FIG. 3, the domain wall between magnetizations of opposing directions is represented by a thick waggled line.

Figure 4:
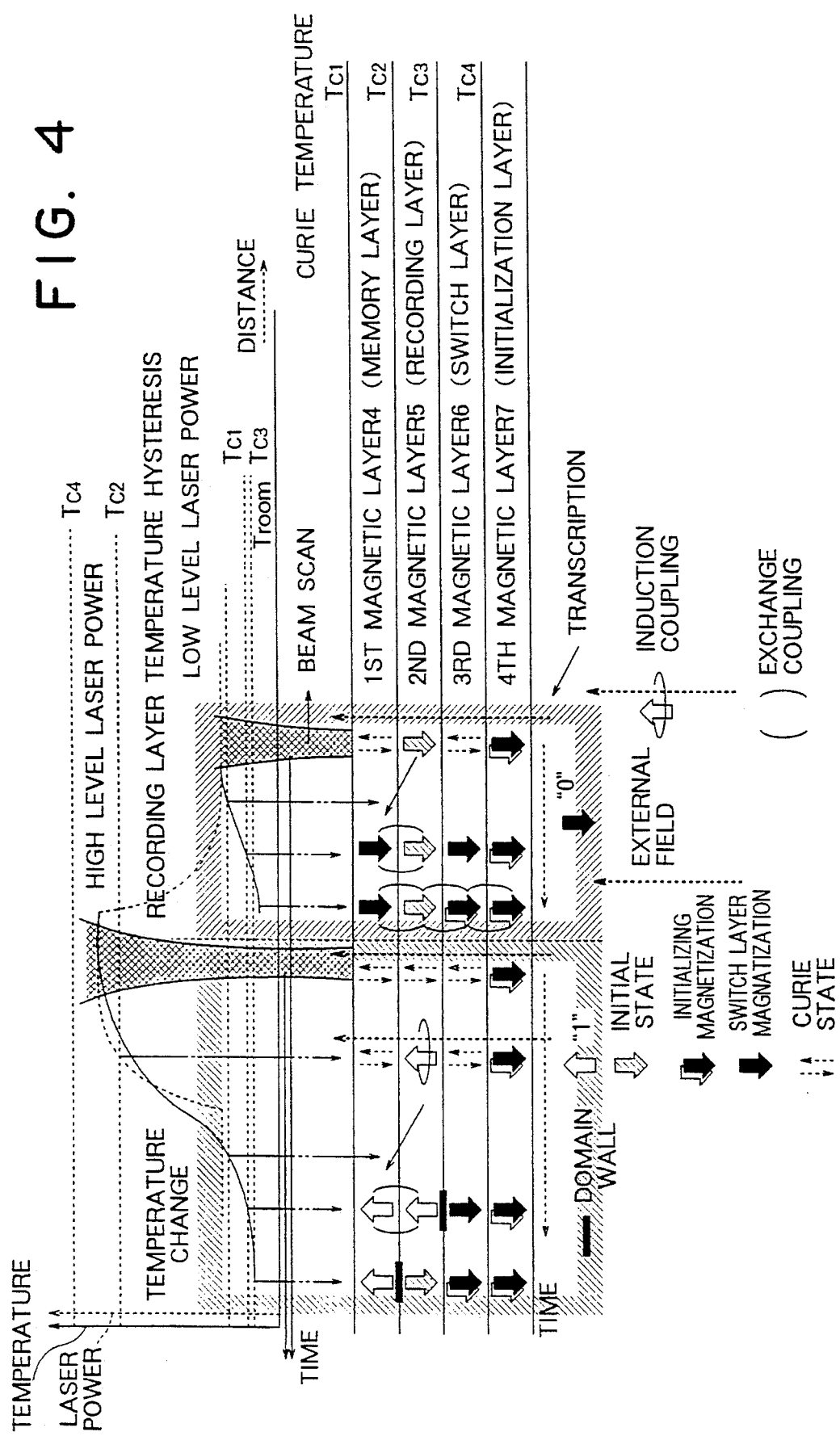
FIG. 4 is a schematic diagram visualizing the processes of the recording of "1" and "0" upon the overwritable magneto-optical recording medium.

FIG. 4 is a schematic diagram visualizing the processes of the recording of "1" and "0" upon the overwritable magneto-optical recording medium. The left and the right half show the process of the magnetization of the respective magnetic layers when the bits "1" and "0" are recorded, respectively, where the solid curves at the top half of the figure show the change of temperature with the lapse of time (the time advances from right to left in the figure). The laser beam scans from left to right alone the track upon the recording medium, at the high power level for recording "1" and at the low power level for recording "0". The change of the laser power level is shown by a dashed curve partially overlapping with the temperature curve. The magnetization states of the respective magnetic layers are shown by arrows at the bottom half of the figure. The Curie state or the random magnetization state above the respective Curie points of the magnetic layers is represented by a pair of dashed arrows of the upward and downward directions. The upward magnetisation of the first magnetic layer 4 and the second magnetic layer 5 for recording "1" is represented by a white arrow. The magnetization of the first magnetic layer 4 for recording "0" is represented by a black arrow. The initial state of the second magnetic layer 5 (the state thereof at the room temperature which may be retained or modified during the recording process) is shown by a shaded arrow. The magnetization of the third magnetic layer 6 (the switch layer magnetization) immediately after the temperature thereof falls below the Curie point $T_{C3}$ is also represented by a black arrow. The initializing magnetization of the third magnetic layer 6 and the fourth magnetic layer 7 is represented by a pair of partially overlapped black and white arrows. The exchange coupling of magnetizations is shown by a pair of parentheses enclosing the pair of magnetization arrows coupled by the exchange force. The induction coupling of a magnetization with the external magnetic field (represented by a long dashed arrow) is indicated by a ring encircling the arrows representing the magnetization and the external magnetic field. The magnetic domain wall separating the opposite magnetization orientations is indicated by a thick black line segment placed between the magnetization arrows.

Thus, for recording "1", the laser beam at the high recording level is radiated upon the magneto-optical recording medium 1 to raise the temperature of the magnetic layers to a point between the Curie points $T_{C4}$ of the fourth magnetic layer 7 and $T_{C2}$ of the second magnetic layer 5. The first through third magnetic layers 4 through 6 are thus put in the Curie state. An external magnetic field directed opposite to the initializing magnetization is applied, such that the upward magnetization is induced and obtained in the second magnetic layer 5 when the temperature falls below the Curie point $T_{C2}$ of the second magnetic layer 5. When the temperature further falls below the Curie point $T_{C1}$, the magnetization of the second magnetic layer 5 is transcribed to the first magnetic layer 4 as indicated by a thin slanted arrow joining the magnetization of the second magnetic layer 5 and the magnetization of the first magnetic layer 4 at respective temperatures. The process of the changes of the magnetizations during the recording of "1" has already been described above with reference to FIG. 3.

For recording "0", on the other hand, the laser beam at the low recording level is radiated upon the magneto-optical recording medium 1 to raise the temperature of the magnetic layers to a point between the Curie points $T_{C2}$ of the second magnetic layer 5 and $T_{C1}$ of the first magnetic layer 4. The magnetization of the first and third magnetic layers 4 and 6 are thus put in the Curie state. This process of magnetization changes during the recording of "0" has already been described above with reference to FIG. 2.

When the recorded information is reproduced, the laser beam at the reproduction power level lower than the Curie point $T_{C3}$ of the third magnetic layer 6 is radiated upon the recording medium. Thus, for effecting the recording and reproduction upon the overwritable magneto-optical recording medium 1, a three-level control of the laser power is necessary.

EMBODIMENT 1

Figure 6:
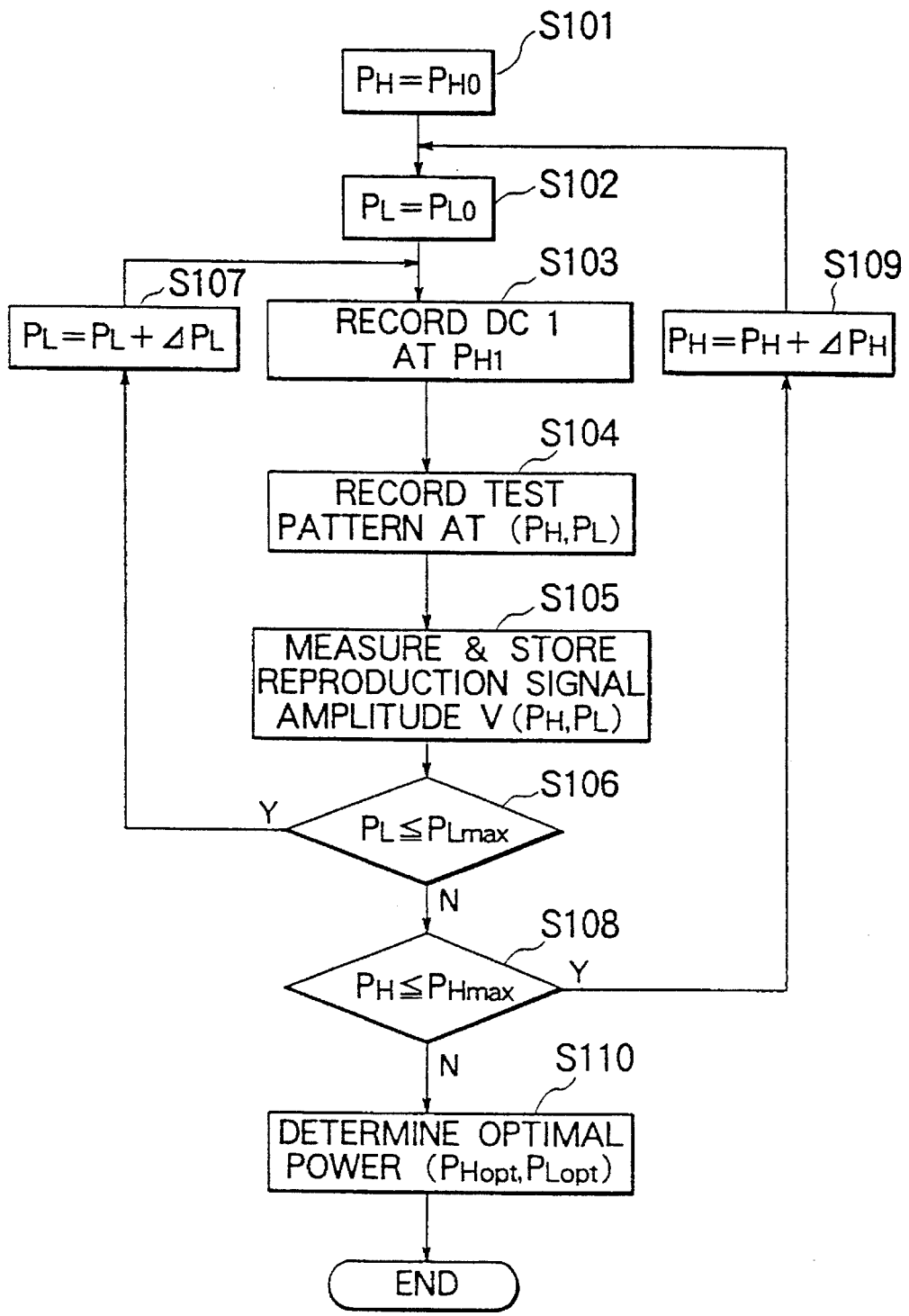
FIG. 6 is a flowchart showing the procedure of the test recording and reproduction operation.

FIG. 6 is a block diagram showing the structure of an optically modulated overwritable recording device according to the first embodiment of this invention. The drive control device 100 is capable of controlling the laser power at three distinct levels: the high recording laser power level $P_H$ for recording "1", the low recording laser power level $P_L$ for recording "0", and the reproduction laser power level $P_r$ (lower than $P_H$ and $P_L$) for reproducing the recorded information. Using the test recording/reproduction means 100b (which may be implemented by a collection of programs and data stored in a memory of the drive control device 100), test recordings are effected by the CPU 100a within the drive 100 for the magneto-optical recording medium 1, to determine the optimal recording laser power levels on the basis of the reproduced signal levels. The level of the reproduction signal detected by a sensor PIN 13a is determined by a level detector 13. In accordance with the optimal operation laser power levels determined by the test recording/reproduction means 100b, the optimal recording/reproduction means 100c controls the laser power levels radiated from a laser diode LD 16a onto the magneto-optical recording medium 1. The external magnetic field is applied on the magneto-optical recording medium 1 from the external magnetic field application circuit 15 when the bit "1" is recorded. The mode switch 16 is controlled by the CPU 100a such that the outputs of the change-over controller 16b and the read means 100d are selectively coupled to the laser diode LD 16a. Further, in response to the command signal from the CPU 100a, the change-over controller 16b selectively couples the outputs of the test recording/reproduction means 100b and the optimal recording/reproduction means 100c to the laser diode LD 16a.

When test recording is effected, the output of the test recording/reproduction means 100b is coupled to the laser diode LD 16a through the change-over controller 16b and the mode switch 16, and the laser power level of the laser diode LD 16a is controlled by the test recording/reproduction means 100b. In accordance with a test signal generated by the test recording/reproduction means 100b, the laser power level of the laser diode LD 16a is controlled such that a pattern of "1" and "0" is recorded upon the magneto-optical recording medium 1. After the test pattern is thus recorded, the information recorded upon the magneto-optical recording medium 1 is reproduced while driving the laser diode LD 16a at the reproduction laser power level $P_r$. The level of the reproduction signal detected by the sensor PIN 13a is determined by the level detector 13, and is stored in the memory within the test recording/reproduction means 100b.

FIG. 6 is a flowchart showing the procedure of the test recording and reproduction operation. First, the CPU 100a of the drive control device 100 switches the mode switch 16 to the upper contact, and outputs an instruction to the change-over controller 16b such that the output of the test recording/reproduction means 100b is coupled to the laser diode LD 16a through the mode switch 16. The drive control device 100 is thus set in the test recording mode, and the laser power level of the laser diode LD 16a is controlled by the test recording/reproduction means 100b.

At step S101, the variable $P_H$ (the high recording laser power level for recording "1") is assigned an initial value $P_{H0}$: $P_H=P_{H0}$. At step S102, the variable $P_L$ (the low recording laser power level for recording "0") is assigned an initial value $P_{L0}$: $P_L=P_{L0}$. At step S103, the DC (direct current) "1" is recorded by applying an external magnetic field by means of the external magnetic field application circuit 15 to invert the magnetic field and further by driving the laser diode LD 16a at a predetermined fixed high level $P_{H1}$. The level $P_{H1}$ is determined beforehand. The level $P_{H1}$ is at a sufficiently high level and hence it is ensured that "1" is recorded irrespective of the state of the medium before recording of "1". The level $P_{H1}$ need not be the optimal power level for recording "1".

Next, at step S104, a test pattern of "1" and "0" is recorded upon the track upon which the DC "1" has been recorded at step S103. The laser power levels for recording "1" and "0" are at $P_H$ and $P_L$, respectively, which are set at steps S101 and S102. The combination of the laser power levels for recording "1" and "0" is represented by $(P_H, P_L)$. Thus, using this notation, the test pattern of "1" and "0" is recorded at $(P_H, P_L)$. Next, at step S105, the recorded test pattern is reproduced and the reproduction signal amplitude $V(P_H, P_L)$ is measured using the level detector 13. The steps S103 through S106 are repeated, incrementing each time the low recording laser power level $P_L$ by an increment $\Delta P_L$ at step S107, until the low level $P_L$ exceeds $P_{LMAX}$ at step S106.

Further, the steps S102 through S107 are repeated, each time incrementing the high recording laser power level $P_H$ by an increment $\Delta P_H$ at step S109, until the high level $P_H$ exceeds $P_{HMAX}$ at step S108. Thus, for each value of the high level $P_H$ ranging from the initial $P_{H0}$ to the maximum $P_{HMAX}$ by a step of $\Delta P_H$ (i.e. , $P_{H0}$, $P_{H0}+\Delta P_H$, $P_{H0}+2\Delta P_H$, . . . , $P_{HMAX}$) the value of the low level $P_L$ is varied by an increment $\Delta P_L$ from the initial $P_{L0}$ to the maximum $P_{LMAX}$ (i.e., $P_{L0}$, $P_{L0}+\Delta P_L$, $P_{L0}+2\Delta P_L$, . . . , $P_{LMAX}$). Thus, a two-dimensional map of the reproduction signal amplitude $V(P_H, P_L)$ is obtained. Namely, the values of the reproduction signal amplitude $V(P_H, P_L)$ corresponding to the respective combinations $(P_H, P_L)$ are obtained for the rectangle: $P_{H0} \leq P_H \leq P_{HMAX}$ and $P_{L0} \leq P_L \leq P_{LMAX}$, and the optimal combination of laser power levels $(P_{Hopt}, P_{Lopt})$ is determined at step S110.

Figure 7:
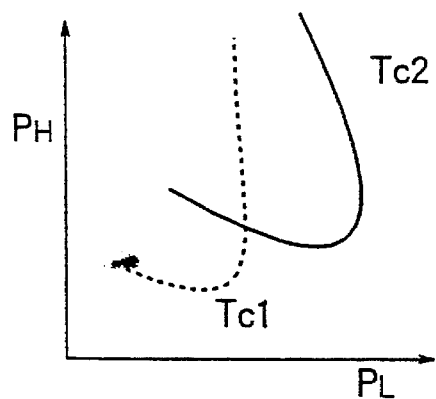
FIG. 7 is a diagram showing the curves $T_{C1}$ and $T_{C2}$ corresponding to the temperature threshold levels (the Curie points of the first and second magnetic layers) which define the region in the ($P_H$, $P_L$)-plane in which the reproduction signal amplitude exceeds a threshold level $V_{th}$.

FIG. 7 is a diagram showing the curves $T_{C1}$ and $T_{C2}$ corresponding to the temperature threshold levels (the Curie points of the first and second magnetic layers) which define the region in the $(P_H, P_L)$-plane in which the reproduction signal amplitude exceeds a threshold level $V_{th}$. The values of the reproduction signal amplitude $V(P_H, P_L)$ upon the points separated by $\Delta P_L$ and $\Delta P_H$ within the rectangle: $P_{H0} \leq P_H \leq P_{HMAX}$, $P_{L0} \leq P_L \leq P_{LMAX}$, form the two-dimensional map of the values of the reproduction signal amplitude. The region within the rectangle in which the reproduction signal amplitude exceeds the predetermined threshold level $V_{th}$ can easily be determined by the CPU 100a. The optimal combination of the recording laser power levels $(P_{Hopt}, P_{Lopt})$ is determined substantially at the center of the region in which the reproduction signal amplitude exceeds the predetermined threshold level $V_{th}$. The determination of the optimal combination is effected by the CPU 100a at step S110.

The magneto-optical recording medium 1 usually includes test recording regions (known as the manufacturer's zones) at the outside and the inside of the user region for recording data. Then, the above test recording may be effected upon these two test recording regions. The optimal recording laser power levels upon the user region are determined by interpolation with respect to the radial positions, and the recording laser power levels corresponding to the respective values of the radius thus determined by the CPU 100a are stored in the memory of the test recording/reproduction means 100b.

When the test recording is finished, the CPU 100a controls the change-over controller 16b and the mode switch 16, such that the recording and reproduction are effected by the optimal recording/reproduction means 100c and read means 100d. When recording is effected the optimal power levels $P_{Hopt}$ and $P_{Lopt}$ stored in the test recording/reproduction means 100b are read out and the laser diode LD 16a is driven at the optimal power levels $(P_{Hopt}, P_{Lopt})$ which are determined as described above.

The variation of the reproduction signal amplitude is the variation of the carrier level C of the carrier to noise ratio C/N. At the neighborhood of the reference value of the ratio C/N, the noise level is substantially constant. Thus, the variation of the ratio C/N substantially coincides with the variation of the reproduction signal amplitude. Further, in the case of the above embodiment, the test pattern is recorded after DC "1" is recorded upon the test track to reverse the magnetization direction of the first magnetic layer 4 of the magneto-optical recording medium 1. Thus, not only the recording characteristic but also the erasure characteristic of the magneto-optical recording medium 1 can be determined simultaneously. Namely, when the low recording laser power level $P_L$ exceeds the level corresponding to the threshold temperature (Curie point) $T_{C1}$ of the first magnetic layer 4, the magnetization of the first magnetic layer 4 is reversed to erase "1" and to record "0", thereby giving rise to a large value of the reproduction signal amplitude. Thus, it becomes unnecessary to measure the small remnant signals remaining after erasure. The optimal low recording laser power level $P_{Lopt}$ can be determined only by the measurement of a signal amplitude of a large magnitude. Hence not only the measurement circuit is simplified but the measurement precision is improved.

Thus, using the optically modulated overwritable recording device according to this embodiment and effecting test recording for each medium, the overwritable recording medium with deteriorated and narrowed recording laser power level margins can be used reliably. Further, since the test pattern is recorded after recording DC "1", the recording and the erasure characteristics can be determined simultaneously, and the optimal recording laser power levels for the optically modulated overwritable recording device can be determined without using an expensive spectrum analyzer.

EMBODIMENT 2

Figure 5:
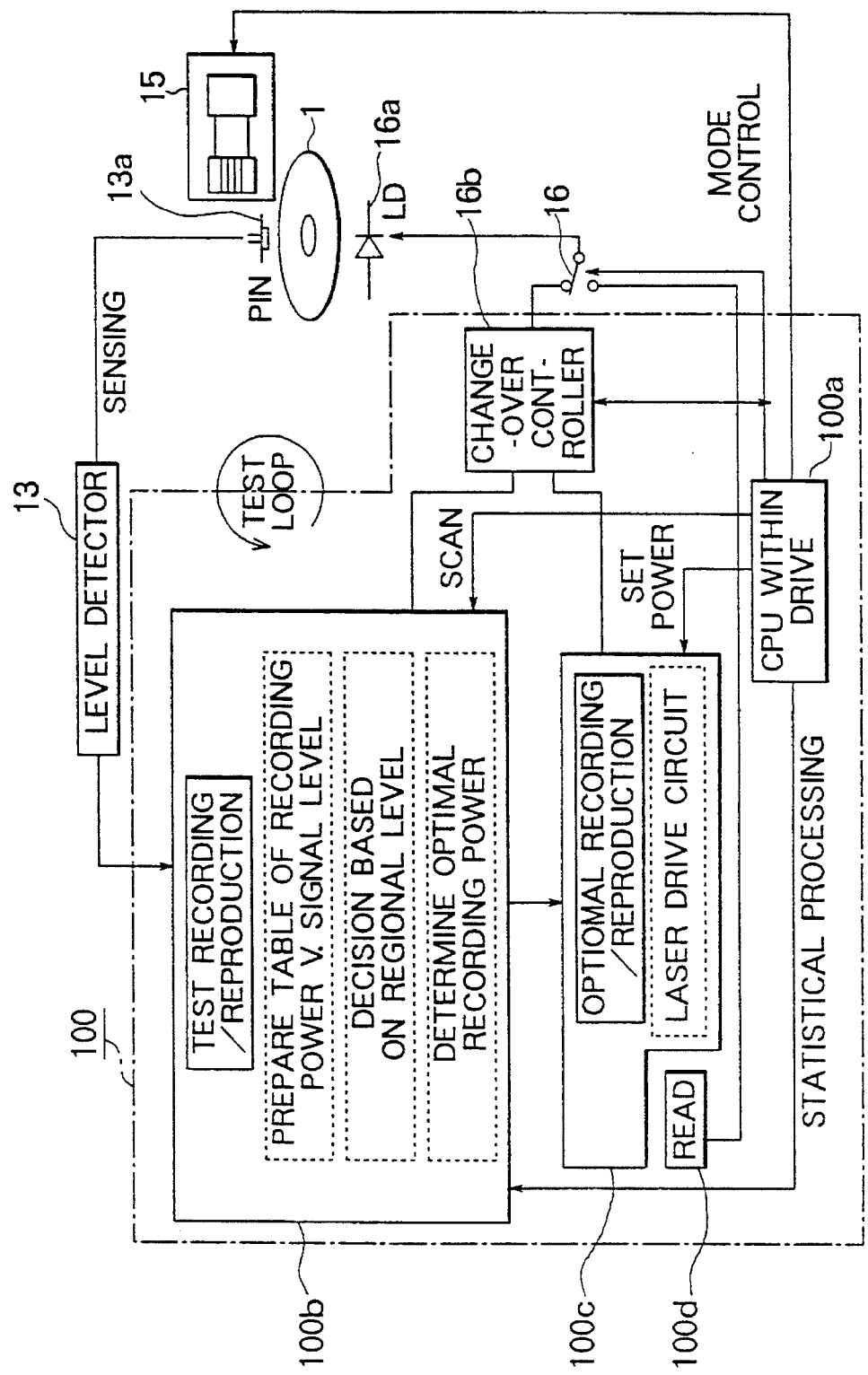
FIG. 5 is a block diagram showing the structure of an optically modulated overwritable recording device according to the first embodiment of this invention.
Figure 8:
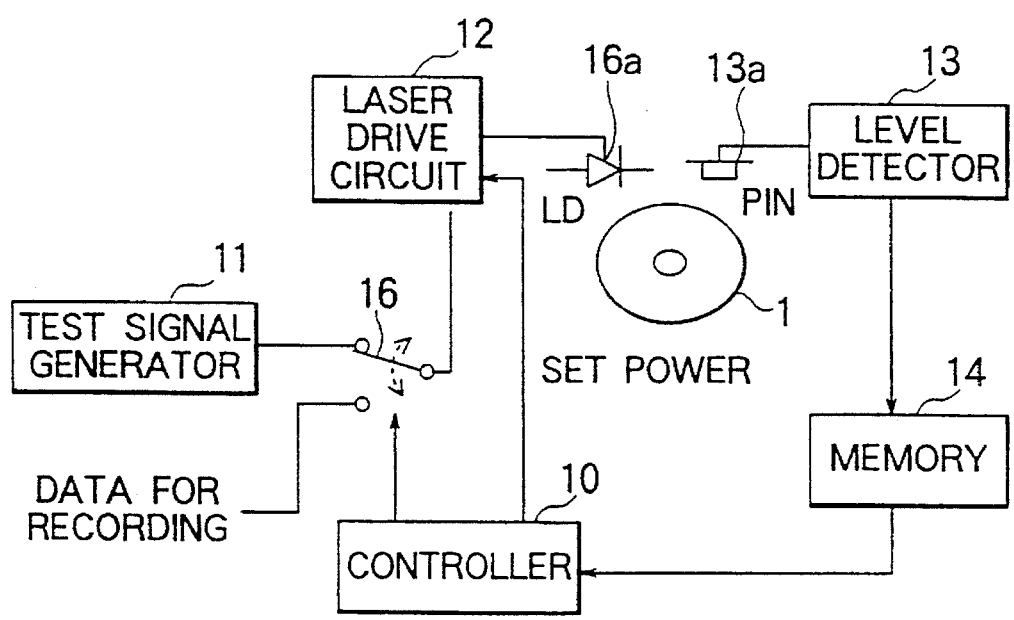
FIG. 8 is a block diagram showing the structure of an optically modulated overwritable recording device according to the second embodiment of this invention.

FIG. 8 is a block diagram showing the structure of an optically modulated overwritable recording device according to the second embodiment of this invention, by which the optimal recording power levels are detected by means of the rapid search method using the statistical processing of the reproduced signal levels. The circuit of FIG. 8 is substantially similar to the circuit of FIG. 5. However, for the purpose of easier explanation, the drive control device 100 in FIG. 5 is described as divided into the following parts in the circuit of FIG. 8: a controller 10 consisting of a CPU; a test signal generator 11 for generating a test signal $T_1$ of the shortest repetition period 3T (consisting of bits "100", where T represents the period of the bits) among the codes used as the recorded data signal; a laser drive circuit 12 which is capable of driving tho laser diode LD 16a at three distinct levels: the high recording laser power level $P_H$, the low recording laser power level $P_L$, and the reproduction laser power level $P_r$; and a memory for recording the levels detected by the level detector 13.

When the test recording is effected, the mode switch 16 is switched by the controller 10 to the test mode position such that the output of the test signal generator 11 is connected to the laser drive circuit 12. Thus, the test signal $T_1$ generated by the test signal generator 11 is supplied to the laser drive circuit 12 when test recording is effected. In response to the test signal supplied from the test signal generator 11, the laser drive circuit 12 drives the laser diode LD 16a and the pattern of "1" and "0" corresponding to the test signal $T_1$ is recorded upon the magneto-optical recording medium 1. The information recorded upon the magneto-optical recording medium 1 is detected by the sensor PIN 13a. The levels of the reproduction signal detected by the sensor PIN 13a is determined by the level detector 13 and are temporarily stored in the memory 14. The controller 10 reads out the levels thus stored in the memory 14 when needed.

The high recording laser power level $P_H$ is recorded upon the magneto-optical recording medium 1 as "1", and the low recording laser power level $P_L$ as "0". As described above, however, the permissible ranges for the levels $P_H$ and $P_L$ for correcting recording "1" and "0" are narrow. According to this second embodiment, a single test signal $T_1$ is used. After initializing the magneto-optical recording medium 1 by recording DC "0", the recording characteristic of "1" is determined by means of the test signal $T_1$. Further, after initializing the magneto-optical recording medium 1 by recording DC "1", the recording characteristic of "0" (or the erasure characteristic of "1") is determined by means of the test signal $T_1$. The high recording laser power level $P_H$ and the low recording laser power level $P_L$ are then determined by two-dimensional scanning, as described below.

The reproduction signal levels are monitored, and the reproduction signal levels are represented by linear contour lines in the two-dimensional α-K plane, where α corresponds to the high recording laser power level $P_H$ and K corresponds to the ratio of the high recording laser power level $P_H$ to the low recording laser power level $P_L$. By using the linear gradient characteristic of the reproduction signal level upon the two-dimensional coordinate plane (α-K plane), the values of the laser power levels necessary for crossing the respective boundary lines dividing the characteristic regions of the α-K plane are determined by means of the linear interpolation or extrapolation calculations. The allowable region in the two-dimensional α-K plane is thus determined and the representative point within the allowable region is selected as representing the combination ($P_H$, $P_L$) of the high and the low recording laser power levels.

Namely, since the overwriting characteristic of the magneto-optical recording medium 1 is comprehended as the recording characteristic, the reproduction signal level representing the recording characteristic can be measured precisely. On the other hand, if, as in the case the conventional device, the overwriting characteristic of the magneto-optical recording medium 1 is comprehended as the erasure characteristic, a specialized sophisticated measurement device such as a spectrum analyzer becomes necessary for the determination of the characteristic, since a quantity at the same order of levels as the noise must be measured. Such measurement cannot be effected by the disk drive by itself.

According to this embodiment, a single pattern of "1" and "0", for example, "100", is selected as the test signal $T_1$. Then, after recording DC "0" the test signal $T_1$ is recorded and the reproduction signal level is measured. Further, after recording DC "1" the test signal $T_1$ is recorded and the reproduction is signal level measured. The overwriting characteristic is comprehended as the recording characteristics of "1" and "0", and is determined by the measurements of the reproduction signal levels of "1" and "0" of the test signal $T_1$ after recording DC "0" and "1", respectively. Thus, the measurements are effected at relatively high signal levels, and hence can be done precisely and efficiently with a simple circuit.

The measurement circuit, for example, can thus be implemented by an AD converter having a quantization number of 8 bits (i.e., an AD converter with eight quantization levels). Thus, an expensive specialized measurement device becomes unnecessary. The measurements can be done by the drive by itself. Further, the test signal $T_1$ consists of a single pattern of "1" and "0". Thus, the level detector 13 can be implemented solely by a filter circuit for extracting the test signal $T_1$. The test signal generator 11 can also be implemented by a small and simple circuit for generating a signal pattern of "1" and "0" only.

Preferably, the test signal $T_1$ is of the repetition period 3T consisting of "100", where T is the duration or period of each bit. This 3T pattern is the shortest among the codes used as the data signal for recording. The reproduction signal levels are monitored and detected as described above, and on the basis of the measurements, the optimal combination of the high and the low laser power levels are determined. The high and the low laser power levels are combined to represent points upon a two-dimensional coordinate plane, as described below, and the characteristic rs regions are determined upon the coordinate plane. The mutual independence or dependence of the recording characteristic of "1" by means of the high recording laser power level and the recording characteristic of "0" by means of the low recording laser power level can thus be evaluated, and the optimal recording laser power levels can be searched and determined reliably and efficiently.

Generally, the laser power levels are positive one-dimensional quantities. Thus, the dependency thereof can be clarified by means of the two-dimensional plotting, and the scanning or searching steps are simplified when the recording characteristics of "1" and "0" are determined. The test recording time can thus be reduced. Further, since the concept of the erasure characteristic is not used directly and is measured in terms of the reproduction signal levels of the recorded signals, the measurements can be effected precisely by the drive by itself.

Next, the optimal value search method for the rapid determination of the optimal laser power levels using the two-dimensional scanning method according to the second embodiment is described.

As described above by reference to FIGS. 2 through 4, the laser beam at the high and the low recording levels $P_H$ and $P_L$ heat the magneto-optical recording medium 1 to predetermined temperatures to record "1" and "0". The Curie point $T_{C2}$ of the second magnetic layer 5 is the upper threshold temperature which determines the direction of magnetization for recording "1" or "0". Namely, above the threshold level $T_{C2}$, "1" is recorded, and below the threshold level $T_{C2}$, "0" is recorded. The Curie point $T_{C1}$ of the first magnetic layer 4 is the lower threshold temperature for recording. Namely, above the threshold level $T_1$, the former information recorded in the first magnetic layer 4 is erased and the magnetization direction of the second magnetic layer 5 is transcribed to the first magnetic layer 4. The Curie point $T_{C4}$ of the fourth magnetic layer 7, which defines the upper absolute operating temperature rating (the upper limit of the operating temperature of the magneto-optical recording medium 1), is not a parameter for determining the optimal recording laser power levels. The threshold level of the high recording laser power level $P_H$ is the laser power level $P_{th2}$ corresponding to the Curie point $T_{C2}$. The threshold level of the low recording laser power level $P_L$ is the laser power level $P_{th1}$ corresponding to the Curie point $T_{C1}$.

Figure 9:
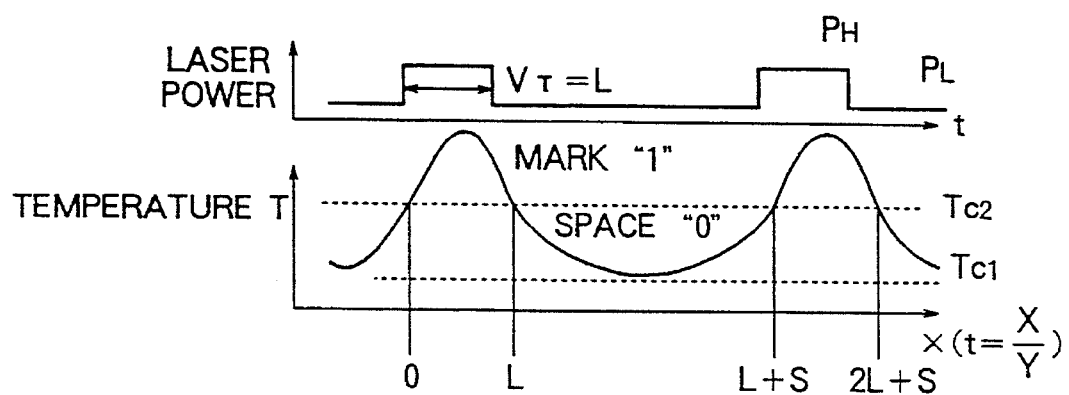
FIG. 9 shows the waveforms of the laser power levels with respect to time (in the upper half of the figure) and the temperature distribution along the track upon the recording medium (in the lower half)

FIG. 9 shows the waveforms of the laser power levels with respect to time (in the upper half of the figure) and the temperature distribution along the track upon the recording medium (in the lower half). The linear coordinate X is taken along the spiralling track upon the magneto-optical recording medium 1 (radially directed toward the center of the land portion thereof). The length or interval upon the track corresponding to the high recording laser power level $P_H$ of the test signal is given by $L=v\tau$, where v is the linear velocity of the track relative to the laser beam spot and $\tau$ is the period or the duration of the high recording laser power level $P_H$ of the test signal $T_1$. Similarly, the length or interval upon the track corresponding to the low recording laser power level $P_L$ of the test signal is represented by S. The diameter of the spot where the intensity distribution of the reproduced laser beam is $e^{-1}$ is represented by $\sigma$, and $\beta$ is defined as $\beta=1/(\sqrt{2}\cdot\sigma)$. Further, the error function with respect to the coordinate X along the track is represented by erf(x). Then, the temperature distribution with respect to the coordinate X along the track upon the magneto-optical recording medium 1 resulting from an irradiation of a pattern of the high and the low laser power levels $P_H$ and $P_L$ in accordance with the test signal $T_1$ can be expressed in terms of these parameters. Namely, the temperature distribution Tm(x) for the "mark" side corresponding to the recording characteristic of "1" and the temperature distribution Ts(x) for the "space" side corresponding to the recording characteristic of "0" are given by:

$$Tm(x)=\{(A\sqrt{\pi})/(\beta v)\}[P_L+(\tfrac{1}{2})(P_H-P_L)\{\mathrm{erf}(\beta x)+\mathrm{erf}\beta(L-x)\}] \qquad (1)$$

$$Ts(x)=\{(A\sqrt{\pi})/\beta v)\}[P_H+(\tfrac{1}{2})(P_L-P_H)\{\mathrm{erf}(\beta x)+\mathrm{erf}\beta(S-x)\}] \qquad (2)$$

where A is a constant.

For the details of the derivation of these equations (1) and (2) reference should be made to the following articles: B. Bartholomeusz, P. Bowers, and D. Genova, "Simple predictive models for the thermal response of optical data storage media", J. Appl. Phys. 66(10), pp. 4635–4639, 15 Nov. 1989, and B. J. Bartholomeusz, D. J. Genova, and D. G. Stinson, "Influence of laser read and bias power levels on the performance of thermomagnetooptic recording media", Applied Optics Vol. 29, No. 20, pp. 3030–3039, 10 Jul. 1990.

In FIG. 9, at the mark side for recording "1", the equation $Tc_2=Tm(0)=Tm(L)$ holds, where $T_{C2}$ is the Curie point of the second magnetic layer 5 which is fixed for each medium. Thus, from equation (1) is obtained:

$$T_{C2}=\{(A\sqrt{\pi})/(\beta v)\}\{P_L+(\tfrac{1}{2})(P_H-P_L).\mathrm{erf}(\beta L)\}$$

and hence $$[\{\beta v/(A\sqrt{\pi})\}T_{C2}-P_L]/(P_H-P_L)=\mathrm{erf}(\beta L)/2.$$

Substituting $$P_{th2}=T_{C2}\cdot\beta v/(A\sqrt{\pi}) \text{ and } K=P_L/P_H,$$

the following equation is obtained:

$$\{1-(P_{th2}/P_H)\}/\{1-\mathrm{erf}(\beta L)/2\}+K=1 \qquad (3)$$

On the other hand, at the space side for recording "0", the point of the lowest temperature is at $T_{C1}$, the Curie point of the first magnetic layer 4 which is fixed for each medium. Thus, from equation (2) is obtained the following:

$$\begin{aligned}T_{C1} &= Tx(S/2)\\&= \{(A\sqrt{\pi})/(\beta v)\}\{P_H+(1/2)(P_L-P_H)\{\mathrm{erf}(\beta S/2)\}\end{aligned}$$

Thus, substituting $$P_{th1}=T_{C1}\cdot\beta v/(A\sqrt{\pi}),$$

the following equation is obtained:

$$\{1-(P_{th1}/P_H)\}/\mathrm{erf}(\beta S/2)+K=1 \qquad (4)$$

Further, since the temperature distribution should be continuous across the boundaries between the mark and the space sides of the temperature distribution, the following equations are obtained from equations (3) and (4):

$$\{1-(P_{th1}/P_H)\}/\{1-\mathrm{erf}(\beta L)/2\}+K=1 \qquad (5)$$

$$\{1-(P_{th2}/P_H)\}/\mathrm{erf}(\beta S/2)+K=1 \qquad (6)$$

Thus, the contours (the lines connecting the points at the same levels) of the reproduction signal upon the α-K plane ($\alpha=1-\eta/P_H$, where η is the origin of the displayed region) are formed by the straight lines represented by the equations (3) through (6). The parameter α is substantially proportional to the high recording laser power level $P_H$, and the parameter K is the modulation factor $P_L/P_H$, which is proportional to the low recording laser power level $P_L$ provided that $P_H$ is held constant. The laser power levels are essentially positive one-dimensional quantities. However, according to this embodiment, the combination of the high and the low laser power levels $P_H$ and $P_L$ is comprehended as a point upon a two-dimensional coordinate plane and the recording characteristics thereof are obtained upon the two-dimensional plane (the α-K plane).

Figure 10:
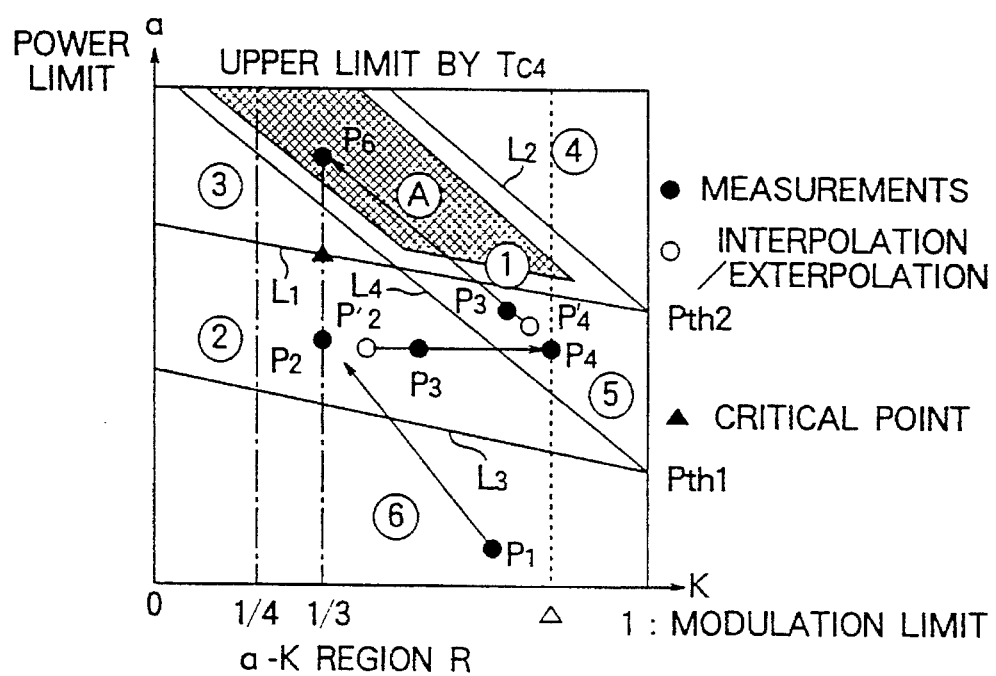
FIG. 10 is a diagram representing the contours of the reproduction signal levels upon the α-K plane.

FIG. 10 is a diagram representing the contours of the reproduction signal levels upon the α-K plane. The lines $L_1$ through $L_4$ are the contours determined by the equations (3) through (6) above, respectively. These lines $L_1$ through $L_4$ thus represent the four lines in the α-K plane on which if the reproduction signal level is selected as the characteristic exponent, the exponent level vanishes (i.e., is equal to 0). The rectangular region R in the α-K plane: $0 \leq \alpha \leq$ Max and $0 \leq K \leq 1$, where Max=(the value of α corresponding to the upper limit of the laser power level determined by the Curie point $T_{C4}$ of the fourth magnetic layer 7) and K=1 defines the modulation limit, is thus divided into six regions 1 through 6 (represented by encircled numbers ① through ⑥ in FIG. 10). These six regions are characterized as follows:

(1) region 1: the bits "1" and "0" are correctly recorded according to the pattern of "1" and "0" of the recorded signal; (2) region 2: the bit "0" is recorded at the high recording laser power level $P_H$; (3) region 3: the bit "1" is recorded, but "0" is recorded only at the periphery of the high recording laser power level $P_H$; (4) region 4: the bit "1" is recorded all along the track; (5) region 5: the bit "0" is recorded all along the track; and (6) region 6: no recording is made (the temperature remains below the Curie point $T_{C1}$ of the first magnetic layer 4).

Figure 36:
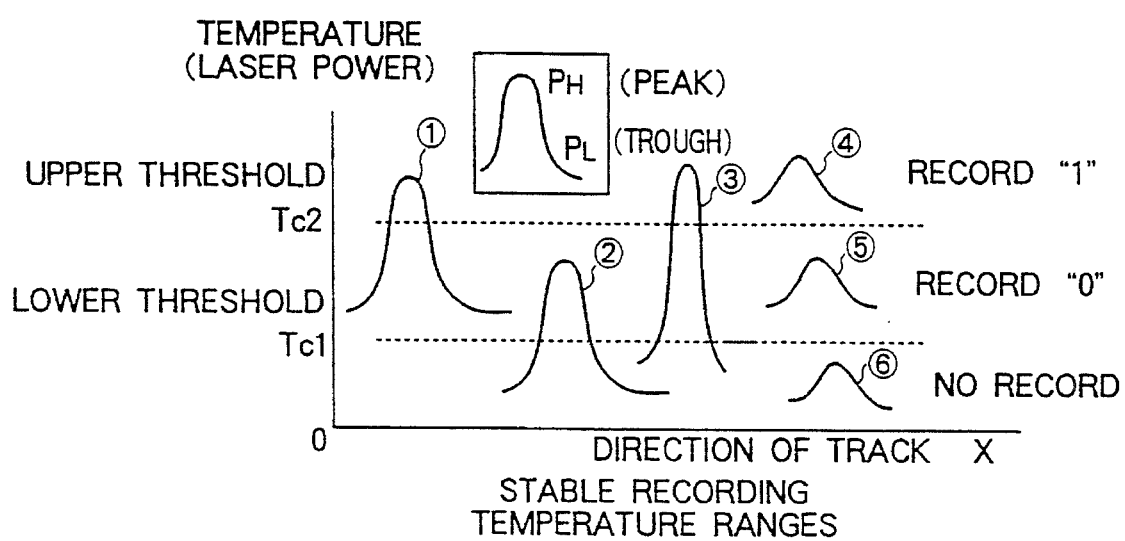
FIG. 36 is a diagram showing the recording temperature patterns 1 through 6 (with respect to the coordinate X along the track) resulting from the various combinations of the high and the low recording laser power levels corresponding to representative points selected from within the regions 1 through 6 shown in FIG. 10.
Figure 37A:
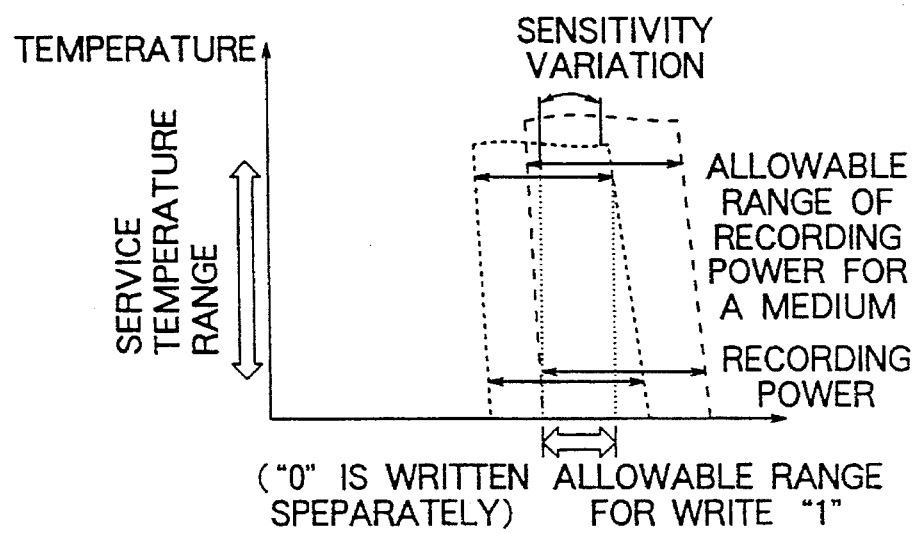
FIG. 37a shows the allowable recording power range of a non-overwritable magneto-optical recording medium.
Figure 37B:
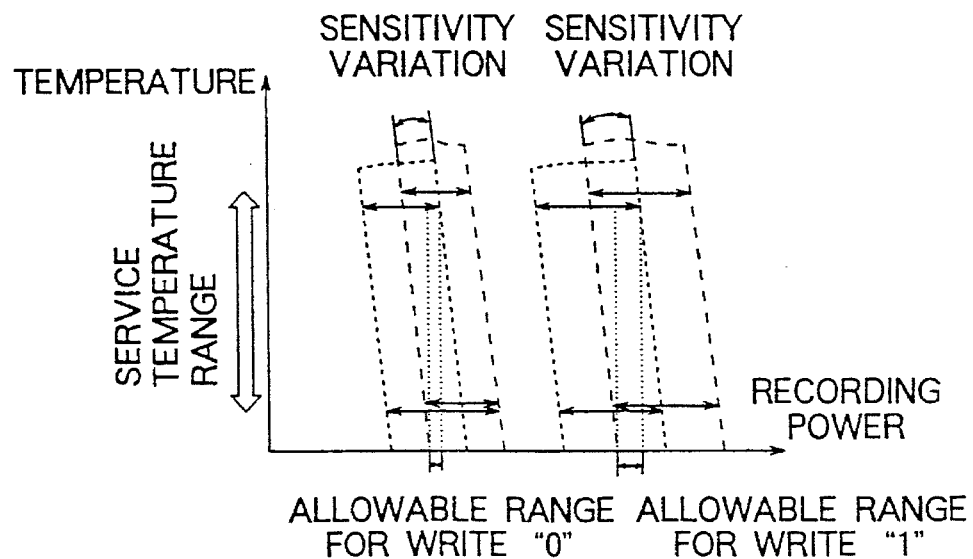
FIG. 37b shows the allowable recording power ranges of an overwritable magneto-optical recording medium.

FIG. 36 is a diagram showing the recording temperature patterns 1 through 6 (with respect to the coordinate X along the track) resulting from the various combinations of the high and the low recording laser power levels corresponding to representative points selected from within the regions 1 through 6 shown in FIG. 10. Thus, if the combination of the high and the low recording laser power levels $P_H$ and $P_L$ corresponds to a point within the region 1 in FIG. 10, the temperature varies as shown by the curve 1 in FIG. 36, and hence the bit "1" is recorded in the intervals where the temperature exceeds the upper threshold level $T_{C2}$ (the Curie point of the second magnetic layer 5). The bit "0" is recorded upon the remaining intervals along the track X. Thus, for the combination of the high and low laser power levels corresponding to a point within the region 1 in FIG. 10, the bits "1" and "0" are correctly recorded according to the recorded pattern. In the case of the temperature pattern 2 in FIG. 36, on the other hand, the peak is between the upper and lower threshold levels $T_{C2}$ and $T_{C1}$. Hence, the bit "0" is recorded around the peaks of the temperature distribution 2. No record is made at the troughs of the temperature distribution. The temperature patterns 3 through 6 corresponding to the regions 3 through 6 in FIG. 10 are to be interpreted in like manner.

Thus, the region A (cross-hatched in FIG. 10), which is defined in the α-K plane with a predetermined allowance within the region 1, is obtained as the optimal region of the combination of high and low laser power levels. The region 1 is defined by the lines $L_1$, $L_2$, and $L_4$, which are determined by the constants of the circuits of the drive and the constants of the magneto-optical recording medium 1 which define the equations 3 through 6. The optimal region A is defined within the region 1 with a predetermined allowance, such that the error rate of recording and reproduction is less than a predetermined requisite level.

The laser power levels are essentially one-dimensional quantities. According to this embodiment, however, the laser power levels $P_H$ and $P_L$ are combined and comprehended together as representing a point upon a two-dimensional α-K plane and the recording characteristics are obtained upon the α-K plane, where $\alpha=1-\eta/P_H$, $K=P_L/P_H$. The optimal region A determining the combination of the laser power levels $P_H$ and $P_L$ is defined within the region 1. The region 1 is defined by the lines whose parameters are determined by the constants of the circuits of the drive and the medium. The forms of the equations (3) through (6) are known without measurements. Thus, the fact that the region 1 is defined by these lines is known a priori (i.e., without any measurements). The actual positions of these boundary lines within the α-K plane defining the characteristic regions 1 through 6 can be determined by scanning the two-dimensional region (the rectangle R in the α-K plane in FIG. 10) of the combination of the laser power levels by means of the laser drive. When these boundary lines are thus determined, the optimal region A of the combination of the laser power levels can also be decided.

The regions 1 through 6 are defined by the boundary lines $L_1$ through $L_4$ upon which the reproduction signal level is equal to 0. Assume that the scanning or searching of the two-dimensional region in the α-K plane is started from a point $P_1$ corresponding to the combination of laser power levels $P_H$ and $P_L$ both equal to the reproduction laser power level $P_r$. Then, as shown in FIG. 10, the point $P_1$ is in the region 6. It is thus necessary to cross the three lines $L_3$, $L_4$, and $L_1$ to move from point $P_1$ to a representative point $P_6$ within the optimal region A in the region 1. Thus, as described in detail below, the point $P_6$ can be reached from point $P_1$ by scanning six (=3×2) measurement points.

Next, the rapid search method for determining the recording optimal power levels is described in detail. The rectangular region R in the α-K plane of FIG. 10 is divided into six regions 1 through 6 by boundary lines $L_1$ through $L_4$. Of these four boundary lines $L_1$ through $L_4$, line $L_4$ (corresponding to equation (4) above) is primarily dependent upon the threshold laser power level $P_{th1}$ (determined by the Curie point $T_{C1}$ of the first magnetic layer 4 serving as the memory layer) and the low recording laser power level $P_L$, and defines the boundary in the α-K plane above which the minimum point (the bottom of the trough) of the temperature distribution curve of FIG. 9 exceeds the threshold temperature $T_{C1}$. Thus, above the boundary line $L_4$ (i.e., in the regions 1, 4, 5 in FIG. 10), the temperature distribution curve of FIG. 9 stays above the threshold level $T_{C1}$. Below the boundary line $L_4$ (i.e., in the regions 2, 3, 6 in FIG. 10), the temperature distribution curve falls below the threshold level $T_{C1}$, at least at the minimal points thereof. On the other hand, the line $L_1$ (corresponding to equation (3) above) is primarily dependent upon the threshold laser power level $P_{th2}$ (determined by the Curie point $T_{C2}$ of the second magnetic layer 5 serving as the recording layer) and the high recording laser power level $P_H$. The line $L_1$ defines the boundary in the α-K plane above which the peaks of the temperature distribution curve shown in FIG. 9 substantially exceeds the upper threshold temperature $T_{C2}$. Thus, above the boundary line $L_1$ (i.e., in the regions 1, 3, 4 in FIG. 10) the peaks of the temperature distribution curve of FIG. 9 rise substantially above the upper threshold level $T_{C2}$. Below the boundary line $L_1$ (i.e., in the regions 2, 5, 6 in FIG. 10), the temperature distribution curve does not rise substantially above the threshold level $T_{C2}$. Thus, the intersection of these lines $L_4$ and $L_1$ is the critical point of the magneto-optical recording medium 1 including the four magnetic layers 4 through 7. At the critical point (i.e., the intersection of lines $L_4$ and $L_1$) meet four regions: the stable recording region 1 in which "1" and "0" are recorded correctly; the inversion recording region 2 in which "0" is recorded near the peaks of the temperature curve; the self-inversion recording region 3 in which "1" is recorded at the peaks but "0" is recorded only near the high recording laser power level $P_H$; and the null recording region 5 in which "0" is recorded throughout.

Next the range of the value of the factor K of the critical point is determined. With respect to the track lengths L and S corresponding to the durations of the high and low laser power levels in FIG. 9, the following equations are obtained from equations (3) and (4):

$$\alpha 2/\{1-\text{erf}(\beta L)/2\} + K = 1 \quad (7)$$

$$\alpha 1/\{\text{erf}(\beta S/2)\} + K = 1 \quad (8)$$

where $$\alpha 2 = 1 - (P_{th2}/P_H),$$

$$\alpha 1 = 1 - (P_{th1}/P_H).$$

Solving these equations with respect to $\alpha$ and K the following equations are obtained:

$$\alpha 1 = (P_{th2} - P_{th1})/(P_{th2} - A \cdot P_{th1})$$

$$\alpha 2 = A \cdot \alpha 1$$

$$K = \{b \cdot P_{th1} - (1-S) \cdot P_{th2}\}/\{b \cdot P_{th1} - (1-S) \cdot P_{th2} + (P_{th2} - P_{th1})\}$$

where A, b, and S represent:

$$A = (1 - \text{erf}(\beta L)/2)/\text{erf}(\beta S/2),$$

$$b = \text{erf}(\beta L)/2,$$

$$S = \text{erf}(\beta S/2).$$

The typical value of K is obtained from the above expression of K as follows. For the 3T pattern used as the recording data for the most dense recording; the ratio of L to S is L:S=1:4, and "1" is recorded at the half-value width or the full-width at half maximum (FWHM) of the laser power level. Thus:

$$\beta = 1/(\sqrt{2\sigma}),$$

$$\beta L = \sqrt{2 \times 0.598} = 0.846,$$

$$\beta S = 4 \times \beta L = 1.69 \times 2.$$

Thus, using the ratio of threshold power level $P_{th1}$ of the first magnetic layer 4 serving as the memory layer and the threshold power level $P_{th2}$ of the second magnetic layer 5 serving as the recording layer, the factor K is expressed as:

$$K = \{0.385 \times (P_{th1}/P_{th2}) - 0.017\}/\{0.983 - 0.615 \times (P_{th1}/P_{th2})\}$$

Thus, since the ratio $P_{th1}/P_{th2}$ is usually about ½, K is approximately equal to 0.26:

$$K \approx 0.26.$$

On the other hand, in the case of the longest 8T pattern signal according to the return-to-zero (RZ) recording method, $\beta S$ can be regarded as sufficiently great: $\beta S = \infty$. Thus, K is given by:

$$K = \{\text{erf}(\beta L)/2\}/\{(P_{th2}/P_{th1}) - 1 + \text{erf}(\beta L)/2\} \approx 0.28$$

Further, since the linear velocity of the laser beam spot relative to the magneto-optical recording medium 1 is twice as great at the outer periphery of the magneto-optical recording medium i as at the interior thereof, $$\beta L = 2 \times \sqrt{2 \times 0.598} = 1.69$$

such that $$\text{erf}(1.69)/2 = 0.49 \approx 0.5,$$

and hence $$K \approx 0.5/1.5 = \frac{1}{3}.$$

Further, since the value of the error function is equal to 0.99 when the value of the independent variable thereof is 1.83, the above equation is also satisfied when the value of $\beta L$ exceeds this value (namely, in the case of the NRZ (non-return-to-zero) recording method), and the value of K is at the upper limit ⅓ when $P_{th2}/P_{th1}$ is equal to ½.

On the other hand, the lower limit of the value of K at the critical point is obtained, in the case of the RZ recording method, as follows. The relation: $\beta S \gg 1$ holds even when the laser wavelength or the NA (numerical aperture) of the lens is doubled such that $\beta L \sim \frac{1}{2}$. Thus, using the approximate relationships:

$$\text{erf}(\beta L)/2 \approx \beta L/\sqrt{\sqrt{\pi}} 1 - \text{erf}(\beta S) \approx 1$$

K is given by:

$$K = \{0.564 \times \beta L\}/\{(P_{th2}/P_{th1}) - 1 + 0.564 \times \beta L\} \approx 0.22$$

Thus, in summary, the range of the possible value of K at the critical point is:

$$0.22 < K < \frac{1}{3}, \text{ or } \frac{1}{4} < K < \frac{1}{3}.$$

The optimal region of the laser power levels extends to the upper right corner (the range of the directions in which both the levels $P_H$ and $P_L$ increase) of the critical point. Thus, for the purpose of determining the optimal laser power levels according to the rapid search method, the levels of laser power are to be increased stepwise along the value of K ($=P_L/P_H$) of the critical point. Generally, the position of the critical point is not known beforehand due to the error of the setting precision of the drive ALPC circuit, etc. However, the values of $P_{th1}$ and $P_{th2}$ are determined by the material constants, the linear velocity, and the reflectivity of the medium, and thus are known beforehand. In particular, the ratio thereof is not dependent upon the linear velocity, and is a stable constant which is not affected by the various error-causing factors.

Further, the right scanning limit $\Delta$ of the possible value of K in FIG. 10 is determined as follows. As the equation of the boundary line defining the region having $P_{th1}$ as its apex in the $\alpha$-K plane is used the above equation:

$$\{1 - \eta/P_{th1}\}/\text{erf}(\beta S/b\ 2) + K = 1$$

together with $$K = \frac{1}{3}.$$

Further, since the initial point $P_1$ starts at the reproduction laser power level $P_r$, $$K = 3 \cdot P_r - \{1/\text{erf}(\beta S/2)\} \cdot (3 \cdot P_r - P_{th1}) = \Delta.$$

This value $\Delta$ of K is at a position a predetermined positive length toward K=0 from $P_{th1}$, in the rectangular region R in the $\alpha$-K plane of FIG. 10.

Figure 11:
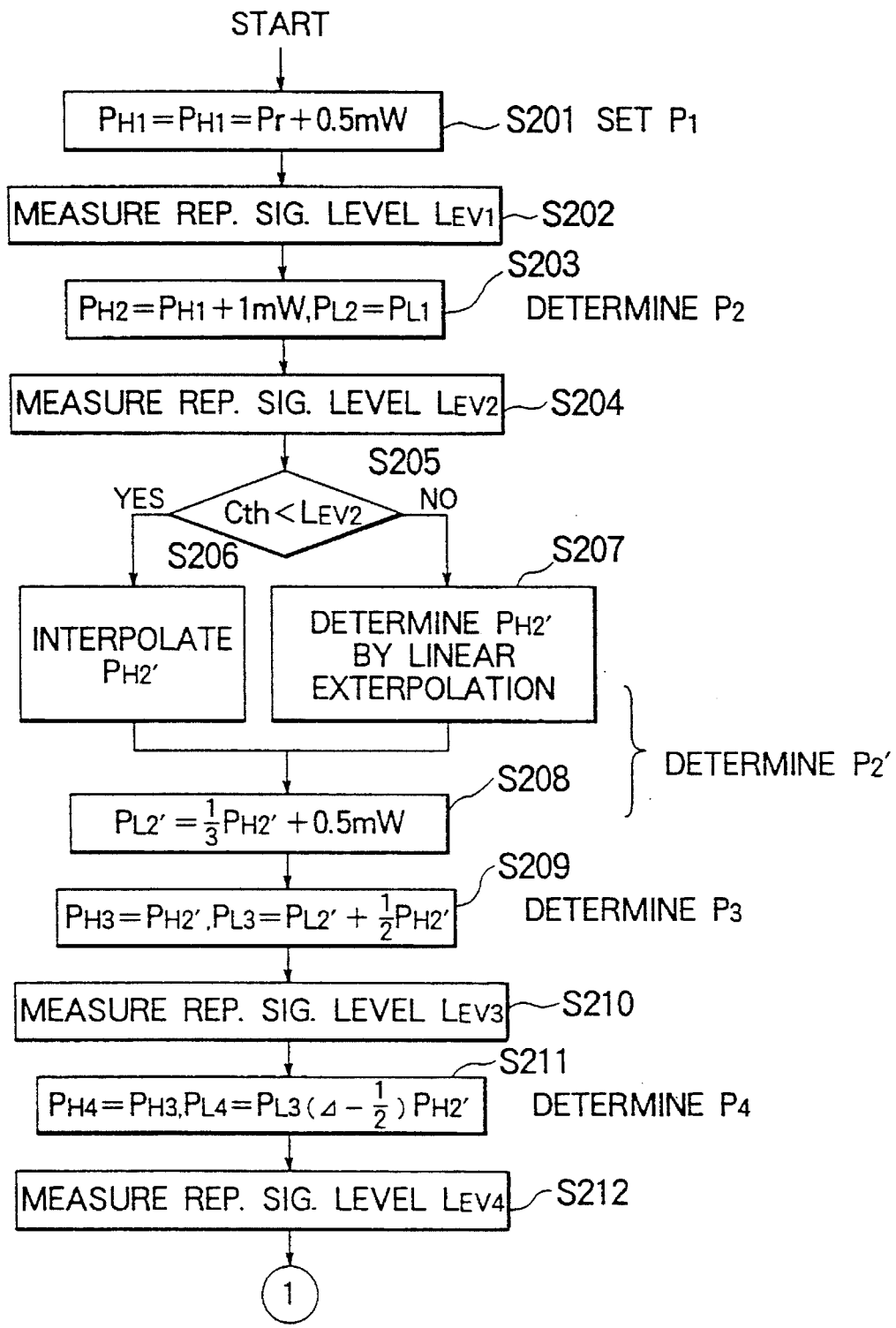
FIG. 11 is a flowchart showing the first half of the procedure for determining the optimal combination of the high and the low recording laser power levels according to the second embodiment.
Figure 12:
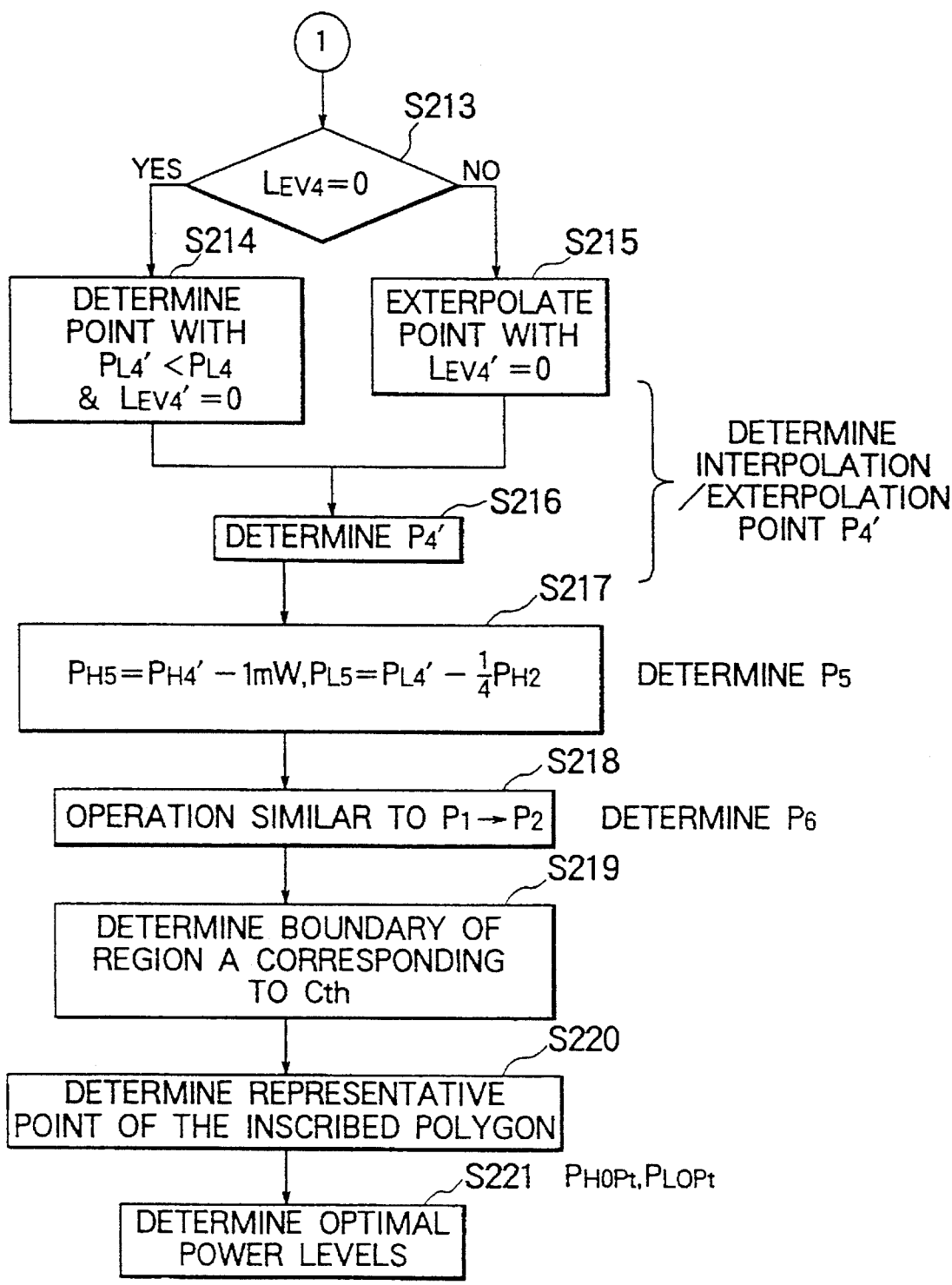
FIG. 12 is a flowchart showing the second half of the procedure the first half of which is shown in FIG. 11.

FIG. 11 is a flowchart showing the first half of the procedure for determining the optimal combination of the high and the low recording laser power levels according to the second embodiment. FIG. 12 is a flowchart showing the second half of the procedure the first half of which is shown in FIG. 11. In accordance with the procedure of FIGS. 11 and 12, the point ($P_{Hopt}$, $P_{Lopt}$) corresponding to the combination of optimal laser power levels is determined in a scanning sequence of six measurement points: $P_1 \to P_2 \to \ldots \to P_6$, referring to the possible range of the factor K as given above. By using the linear gradient characteristic of the reproduction signal level upon the two-dimensional coordinate plane ($\alpha$-K plane), the values of the laser power levels ($P_H$, $P_L$) necessary for crossing the respective boundary lines dividing the characteristic regions of the α-K plane are determined by means of the linear interpolation or extrapolation. The allowable region 1 in the two-dimensional α-K plane is thus determined and the representative point within the allowable region is selected as representing the combination ($P_{Hopt}$, $P_{Lopt}$) of the optimal high and low recording laser power levels.

First, at step S201, the initial point $P_1$ is set at the point corresponding to the combination ($P_{H1}$, $P_{L1}$) of laser power levels where $P_{H1}=P_{L1}=Pr+0.5$ mW. Thus, the laser power levels $P_{H1}$ and $P_{L1}$ of the point $P_1$ is greater than the reproduction laser power level by an increment $\Delta P=0.5$ mW, for example, equal to one step movement of the scanning point in the α-K plane. After initializing the predetermined region of the magneto-optical recording medium 1 by recording DC "0", the test signal of repetition period 3T is recorded upon the region of the magneto-optical recording medium 1, and the recorded signal is reproduced. The reproduction signal level $L_{EV1}$ is measured by the level detector 13 at the step S202.

Next, at step S203, the point $P_2$ is determined at a point at the value of K of the critical point, $K=\frac{1}{3}$, above the boundary line $L_3$. The point $P_2$ corresponds to the combination ($P_{H2}$, $P_{L2}$) where $P_{H2}=P_{H1}+1$ mW and $P_{L2}=P_{L1}$. Thus, the high laser power level $P_{H2}$ of point $P_2$ is greater than the $P_{H1}$ of $P_1$ by $\Delta P=1$ mW corresponding to two steps. The low laser power level $P_{L2}$ of point $P_2$ is the same as the level $P_{L1}$ of $P_1$. The test signal is recorded at the combination ($P_{H2}$, $P_{L2}$) of the laser power levels, and the reproduction signal level $L_{EV2}$ is measured at step S204.

At step S205, it is judged whether or not the reproduction signal level $L_{EV2}$ is above a predetermined threshold level $C_{th}$. The threshold level $C_{th}$ is determined a priori from the Curie point $T_{C1}$ of the first magnetic layer 4 serving as the memory layer and defines the threshold level of $L_{EV2}$ above which the error rate less than a predetermined acceptable error rate is ensured. If the judgment is affirmative at step S205 (i.e., if $C_{th}<L_{EV2}$), the execution proceeds to step S206 where the high recording laser power level $P_{H2}'$ at which the reproduction signal level is at $C_{th}$ is interpolated (i.e., determined by interpolation) from reproduction levels $L_{EV1}$ and $L_{EV2}$. If the judgment is negative at step S205 (i.e., if $C_{th} \geq L_{EV2}$), the execution proceeds to step S207, where the high recording laser power level $P_{H2}'$ exceeding the threshold level $C_{th}$ is determined by means of the linear extrapolation from the reproduction signal levels $L_{EV1}$ and $L_{EV2}$.

After the step S206 or S207, the execution proceeds step S208, where the low recording laser power level $P_{L2}'$ is determined as: $P_{L2}'=(\frac{1}{3})P_{H2}'+0.5$ mW. The previous point $P_2$ is upon $K=\frac{1}{3}$ in FIG. 10. The point $P_2'$ is moved one step (e.g., $\Delta P=0.5$ mW) toward $K=\Delta$ from $K=\frac{1}{3}$. The point $P_2'$ corresponds to the combination ($P_{H2}'$, $P_{L2}'$), and hence $P_{L2}'$ is made greater than $(\frac{1}{3})P_{H2}'$ by an increment of one step, for example, $\Delta P=0.5$ mW ($P_{L2}'=(\frac{1}{3})P_{H2}'+0.5$ mW).

Next, at step S209, the point $P_3$ corresponding to a combination of levels ($P_{H3}$, $P_{L3}$) is determined, where $P_{H3}=P_{H2}'$ and $P_{L3}=P_{L2}'+(\frac{1}{2})P_{H2}'$. Namely, the high recording laser power level $P_{H3}$ of point $P_3$ is the same as the level $P_{H2}'$ of the previous point $P_2$. The low recording laser power level $P_{L3}$ thereof is greater than $P_{L2}'$ by $(\frac{1}{2})P_{H2}'$, such that the point $P_3$ lies approximately upon $K=\frac{1}{2}$, between $K=\frac{1}{3}$ and $K=\Delta$ (which is near $K=1$). At step S210, the test signal is recorded at the combination ($P_{H3}$, $P_{L3}$), and the reproduction signal level $L_{EV3}$ is measured.

Further, at step S211, the point $P_4$ corresponding to a combination ($P_{H4}$, $P_{L4}$) of the laser power levels is determined, where $P_{H4}=P_{H3}=P_{H2}'$ and $P_{H4}=P_{L3}+(\Delta-\frac{1}{2})P_{H2}'$. The point $P_4$ is to be set at a point which is reached from the point $P_3$ after crossing the boundary line $L_4$. Namely, the points $P_3$ and $P_4$ should lie on the opposite sides of the line $L_4$. Thus, the point $P_4$ is to be set, for example, approximately upon $K=\Delta$. Namely, the high recording laser power level $P_{H4}$ is set at $P_{H3}$, $P_{H4}=P_{H3}$, and the low recording laser power level $P_{L4}$ is set greater than $P_{L3}$ by $(\Delta-\frac{1}{2})P_{H2}'$ such that the point $P_4$ lies approximately upon $K=\Delta$. The test signal is recorded at the combination ($P_{H4}$, $P_{L4}$) and the reproduction signal level $L_{EV4}$ is measured at step S212.

Next, at step S213, it is judged whether or not the level $L_{EV4}$ is equal to zero ($L_{EV4}=0$). If the judgment is affirmative at step S213, the execution proceeds to step S214, where the point $P_4'$ with a low recording laser power level $P_{L4}'$ smaller than $P_{L4}$ ($P_{L4}'<P_{L4}$) at which the reproduction signal level $L_{EV4}$, vanishes ($L_{EV4}'=0$) is determined. On the other hand, if the judgment is negative at step S213, the execution proceeds to step S215 where the point $P_4'$ at which the reproduction signal level vanishes ($L_{EV4}'=0$) is extrapolated from the reproduction signal level $L_{EV3}$ and $L_{EV4}$. At step S216, the point $P_4'$ is thus determined by interpolation or extrapolation.

Next at step S217, the point $P_5$ corresponding to a combination ($P_{H5}$, $P_{L5}$) of the high and low laser power levels is determined, where $P_{H5}=P_{H4}'-1$ mW and $P_{L5}=P_{L4}'-(\frac{1}{4})P_{H2}'$. Namely, the high recording laser power level $P_{H5}$ of the point $P_5$ is less than $P_{H4}'$ by a decrement corresponding to two steps, e.g., 1 mW. The low recording laser power level $P_{L5}$ of the point $P_5$, on the other hand, is less than $P_{L4}'$ by $(\frac{1}{4})P_{H2}'$. Further, at step S218, the point $P_6$ is determined by a procedure similar to that by which point $P_2$ is determined from the point $P_1$ at steps S201 through S204.

Next at step S219, the boundary line of the region (the region A in FIG. 10) corresponding to the threshold level $C_{th}$ (which is determined a priori from the Curie point $T_{C1}$ of the first magnetic layer 4 serving as the memory layer and which ensures the error rate of the reproduction signal level $L_{EV6}$ less than a predetermined permissible level) is determined by interpolation. At step S220, a representative point within a polygon (rectangle) inscribing the boundary line of the region A is determined. At step S221, the combination of the optimal laser power levels $P_{Hopt}$ and $P_{Lopt}$ corresponding to the representative point is determined, thereby terminating the procedure of FIGS. 11 and 12.

If the combination of laser power levels is scanned (i.e., searched) in the linear order upon the two-dimensional linear coordinate plane ($P_H-P_L$ plane) of the high recording laser power level $P_H$ and the low recording laser power level $P_L$, an extremely long time, in the order of the second power of the scanning steps, is required for completing the test recording. However, according to this embodiment, the recording characteristics are represented upon the α-K plane on which the characteristic exhibits a linear gradient. The number of measurement points necessary for completing the scanning and thereby determining a point in the allowable region A is as few as two times the number of required crossing movements of the scanning point across the boundary lines. The smallest number of measurement points for completing the search is thus six ($=2\times3$). Further, the adjustments of the scanning points relative to the measurement points can be effected by linear interpolation or extrapolation. These linear calculations can be effected by means of the table lookup method, which can be easily be implemented by firmware. The number of steps for determining the optimal combination of laser power levels, and hence the time required for the test recording effected upon the magneto-optical recording medium 1 are thus radically reduced.

Furthermore, the test can be effected by a simple hardware which can be incorporated in the drive of the magneto-optical medium.

EMBODIMENT 3

In the case of the optically modulated overwritable recording device disclosed in Japanese Laid-Open Patent (Kokai) No. 3-116566, the optimal laser power levels are determined from the relationships among the reproduction amplitudes of the recorded signal. However, since the final quality of the reproduction signal ie determined by the error rate thereof, the laser power levels determined on the basis of the signal amplitudes may be deviated from the optimal levels. For example, the change in the reflectivity of the recording medium gives rise to a variation in the amplitude of the reproduction signal. The error rate, however, does not depend on the reflectivity. This implies that the laser power levels determined on the basis of the amplitude of the reproduction signal is not necessarily the optimal. Further, since the laser power level is varied one-dimensionally, the effect of thermal interference cannot be detected. This has adverse effects upon the precision of the laser power level determination. The third embodiment aims at solving these problems.

Figure 13:
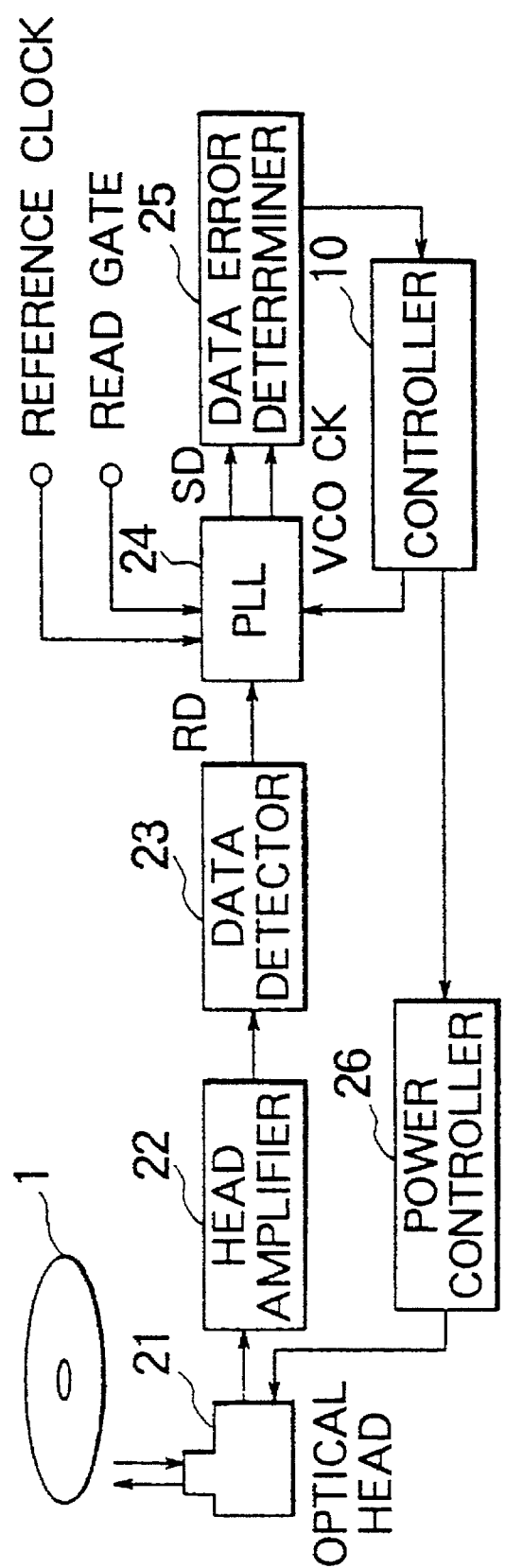
FIG. 13 is a block diagram showing the structure of an optically modulated overwritable recording device according to the third embodiment of this invention.

FIG. 13 is a block diagram showing the structure of an optically modulated overwritable recording device according to the third embodiment of this invention. A controller 10 consisting of a microcomputer calculates the error rate of the bits of the reproduction signal on the basis of the read-out data supplied from a phase-locked loop (PLL) circuit 24 and the error rate data supplied from a data error determiner circuit 25. For the purpose of determining the combination of the high and the low laser power levels for ensuring an error rate less than a predetermined permissible reference level, the controller 10 supplies combinations of the high and the low laser power levels successively to a power controller circuit 26, and thereby controls the laser power levels of the test recording in accordance with the two-dimensional scanning method as described below. Further, when measuring the error rate, the controller 10 also issues a control signal to the phase-locked loop (PLL) circuit 24 to narrow the detection window of the reproduced data.

An optical head 21 radiates a laser beam upon the magneto-optical recording medium 1, to record a signal thereupon and to reproduce it therefrom. The optical head 21 also includes a photodetector for detecting the reproduced signal. A head amplifier 22 coupled to the photodetector amplifies the reproduced signal. A data detector circuit 23 detects the reproduced signal amplified by the head amplifier 22 and converts it into a two-level digital signal, thereby restoring the original recorded data. The data detector circuit 23 thus outputs the reproduced data RD corresponding to the original recorded data.

The phase-locked loop (PLL) circuit 24 generates reproduction clock VCOCK on the basis of the reference clock, read gate and reproduced data RD, and, if there is a reproduction error, outputs the error signal. Further, the phase-locked loop (PLL) circuit 24 outputs synchronous data SD synchronized with the reproduction clock VCOCK. On the basis of the synchronous data SD supplied from the phase-locked loop (PLL) circuit 24, the data error determiner circuit 25, implemented by a circuit upon an IC of the magneto-optical recording device, determines the data error and outputs the number of errors contained in the synchronous data SD to the controller 10. The power controller circuit 26 supplies the test signal to the optical head 21 corresponding to the high and low recording laser power levels set by the controller 10.

Figure 14:
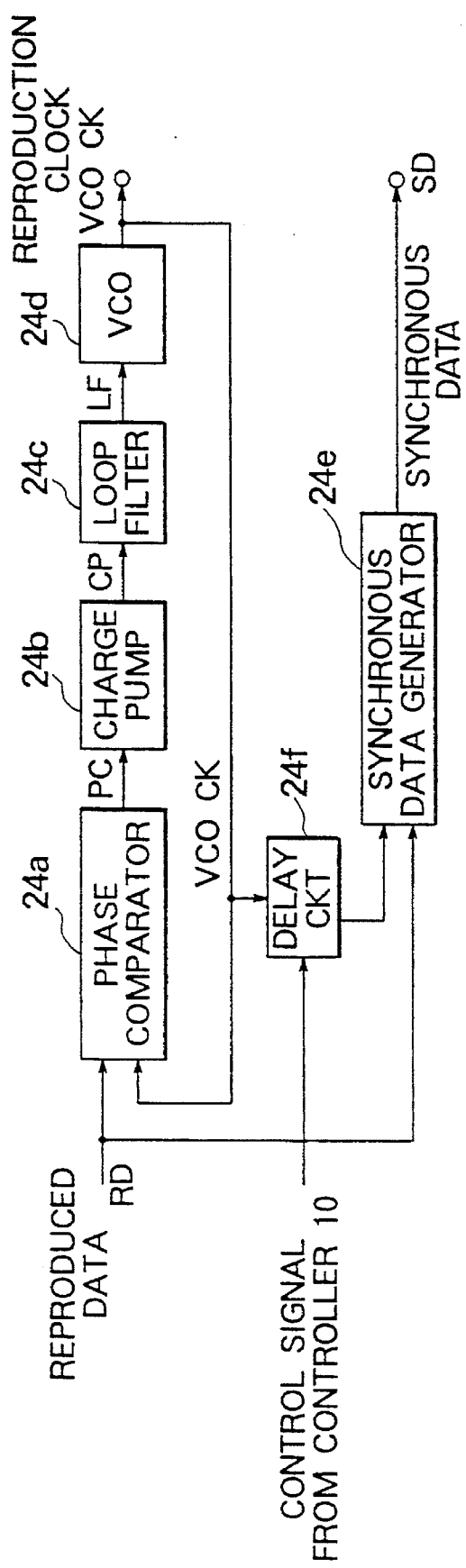
FIG. 14 is a block diagram showing the structure of the phase-locked loop circuit of FIG. 13.

FIG. 14 is a block diagram showing the structure of the phase-locked loop circuit of FIG. 13. A phase comparator 24a compares the reproduced data RD with the reproduction clock VCOCK and outputs the difference signal PC corresponding to the phase difference therebetween. In response to the difference signal PC supplied from the phase comparator 24a, a charge pump 24b drives the current duping the pulse width of the difference signal PC to charge and discharge a loop filter 24c. The loop filter 24c converts the current signal CP for the charge and discharge operation to a corresponding smoothed voltage signal LF, which is supplied to a voltage controlled oscillator (VCO) 24d.

The voltage controlled oscillator (VCO) 24d outputs a reproduction clock VCOCK having a frequency corresponding to the voltage signal LF. Further, receiving the reproduction clock VCOCK from the voltage controlled oscillator (VCO) 24d through a delay circuit 24f, a synchronous data generator 24e shapes the waveform of the reproduced data RD such that the center of the pulse of the synchronous data SD output from the synchronous data generator 24e substantially agrees with the rising edge of the reproduction clock VCOCK. The synchronous data generator 24e thus obtains and outputs the synchronous data SD as the result of the waveform shaping.

The delay circuit 24f is inserted between the voltage controlled oscillator (VCO) 24d and the synchronous data generator 24e. In response to the control signal from the controller 10, the delaying operation by the delay circuit 24f is turned on and off, The delay operation of the delay circuit 24f is usually off, and the delay circuit 24f outputs the reproduction clock VCOCK directly to the synchronous data generator 24e without any delay. However, when test recording is effected, the delay operation of the delay circuit 24f is turned on in response to the command from the controller 10. Then the reproduction clock VCOCK delayed by the delay circuit 24f is supplied to the synchronous data generator 24e, such that the detection window of the reproduced data is rendered narrower.

Figure 15:
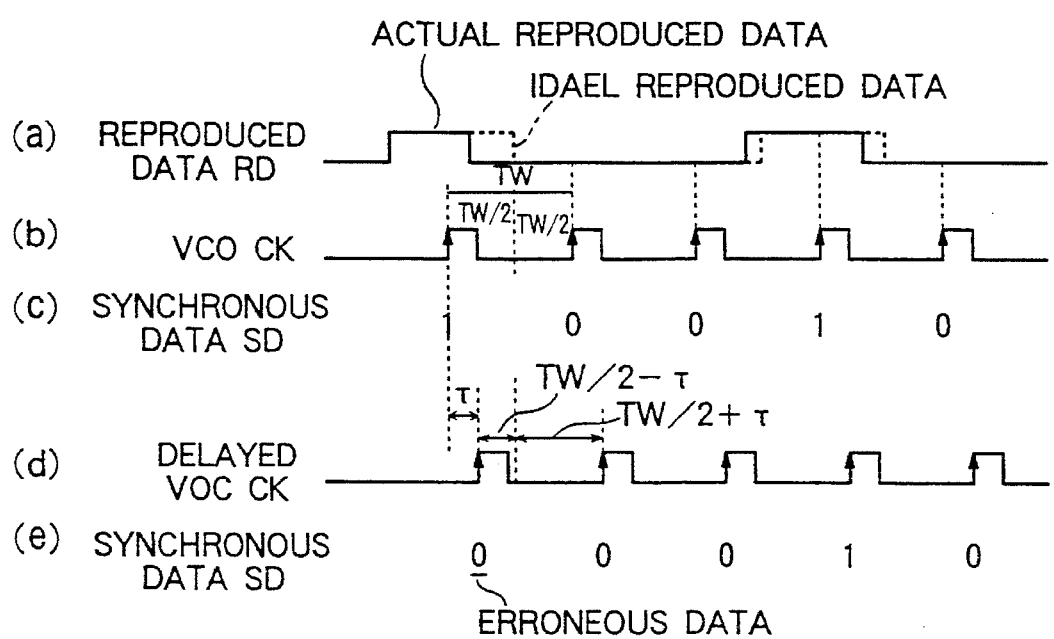
FIG. 15 shows waveforms within the phase-locked loop (PLL) circuit when the detection window for the reproduced data is narrowed.

FIG. 15 shows waveforms within the phase-locked loop (PLL) circuit when the detection window for the reproduced data is narrowed. Assume that a test recording is effected upon the magneto-optical recording medium 1 using a test signal $T_1$ of the shortest repetition period 3T (i.e., of the greatest repetition frequency) of the bit pattern "100" among the codes used as the recorded data signal.

The reproduced data RD supplied to the phase comparator 24a and the synchronous data generator 24e corresponds to the recorded data, and, as shown by a dotted waveform at (a) in FIG. 15, if the recording and the reproduction are effected ideally, the reproduced data RD exhibits the same waveform as the recorded data signal $T_1$. If, however, a sensitivity variance or defect is present upon the magneto-optical recording medium 1 during the reproduction of data, the rising and/or the falling edges of the reproduced data are displaced. For example, as represented by a solid curve at (a) in FIG. 15, the actual reproduced data RD exhibits fluctuations with respect to the ideal data, and the falling edges thereof are displaced from those of the ideal reproduced data shown by a dashed curve.

The reproduction clock VCOCK output from the voltage controlled oscillator (VCO) 24d has the waveform (b) in FIG. 15. Namely, the reproduction clock VCOCK is a train of short pulses each having a rising edge substantially synchronized with the center of a duration of a bit of the ideal reproduced data RD. Assume that the reproduction clock VCOCK as shown at (b) in FIG. 15 are supplied from the voltage controlled oscillator (VCO) 24d to the synchronous data generator 24e without delay. Then, upon receiving the reproduced data RD having the waveform (a), the synchronous data generator 24e outputs the synchronous data SD as shown at (c). Thus, the reproduction errors are not generated and hence are not detected. The synchronous data generator 24e outputs "1" when the reproduced data RD is at "1" at the rising edge of the output of the delay circuit 24f; the synchronous data generator 24e outputs "0" when the reproduced data RD is at "0" at the rising edge of the output of the delay circuit 24f. The pattern of "1" and "0" output from the synchronous data generator 24e constitutes the synchronous data SD. Thus, if the reproduction clock VCOCK is not delayed by the delay circuit 24f, the detection window for detecting "1" of the reproduced data RD is the interval $T_W/2$ beginning with each rising edge of the reproduction clock VCOCK (b), assuming that the falling edge of the reproduced data RD is advanced (but not delayed) with respect to the ideal position thereof, where $T_W$ represents the interval between one rising edge to the next of the reproduction clock VCOCK (b). So long as the fluctuation of the falling edge of the actual reproduced data RD (a) in the advancing direction (i.e., to the left, in FIG. 15) is within the detection window $T_W/2$, the synchronous data SD corresponds to the original data "100".

According to this embodiment, however, the controller 10 issues a delay control command to the delay circuit 24f when the test reproduction is effected. Thus, the delay circuit 24f delays the reproduction clock VCOCK (b) by a predetermined delay time τ to obtain the delayed reproduction clock VCOCK (d), which is supplied to the synchronous data generator 24e (see FIG. 15 for the waveforms). In response thereto, the synchronous data generator 24e outputs "1" when the reproduced data RD is at "1" at the rising edge of the output of the delay circuit 24f; the synchronous data generator 24e outputs "0" when the reproduced data RD is at "0" at the rising edge of the output of the delay circuit 24f. Thus, the detection window for obtaining the synchronous data SD from the reproduced date RD is narrowed from the original interval $T_W/2$ to the interval $T_W/2-\tau$ as shown at waveform (d) in FIG. 15. Namely, if the falling edge of the reproduced data RD (a) is outside of the detection window $T_W/2-\tau$ beginning from a rising edge of the delayed reproduction clock VCOCK (d), the synchronous data generator 24e outputs "0" as a corresponding bit of the synchronous data SD (e). Namely, the erroneous date pattern "000" is output from the synchronous data generator 24e at the fluctuation of the reproduced data RD.

Thus, since the reproduction clock VCOCK delayed by the delay circuit 24f is supplied to the synchronous data generator 24e to define the detection window during the test reproduction operation according to this embodiment, the fluctuation or jitter margin for the reproduction is reduced and hence a small fluctuation of the rising and the falling edges of the reproduced data RD results in erroneous bit patterns of synchronous data SD. As a result, the number of erroneous bits that can be detected increases, and hence the number of tracks needed for the measurement of the error rates and the test time required therefor can be reduced.

Figure 16:
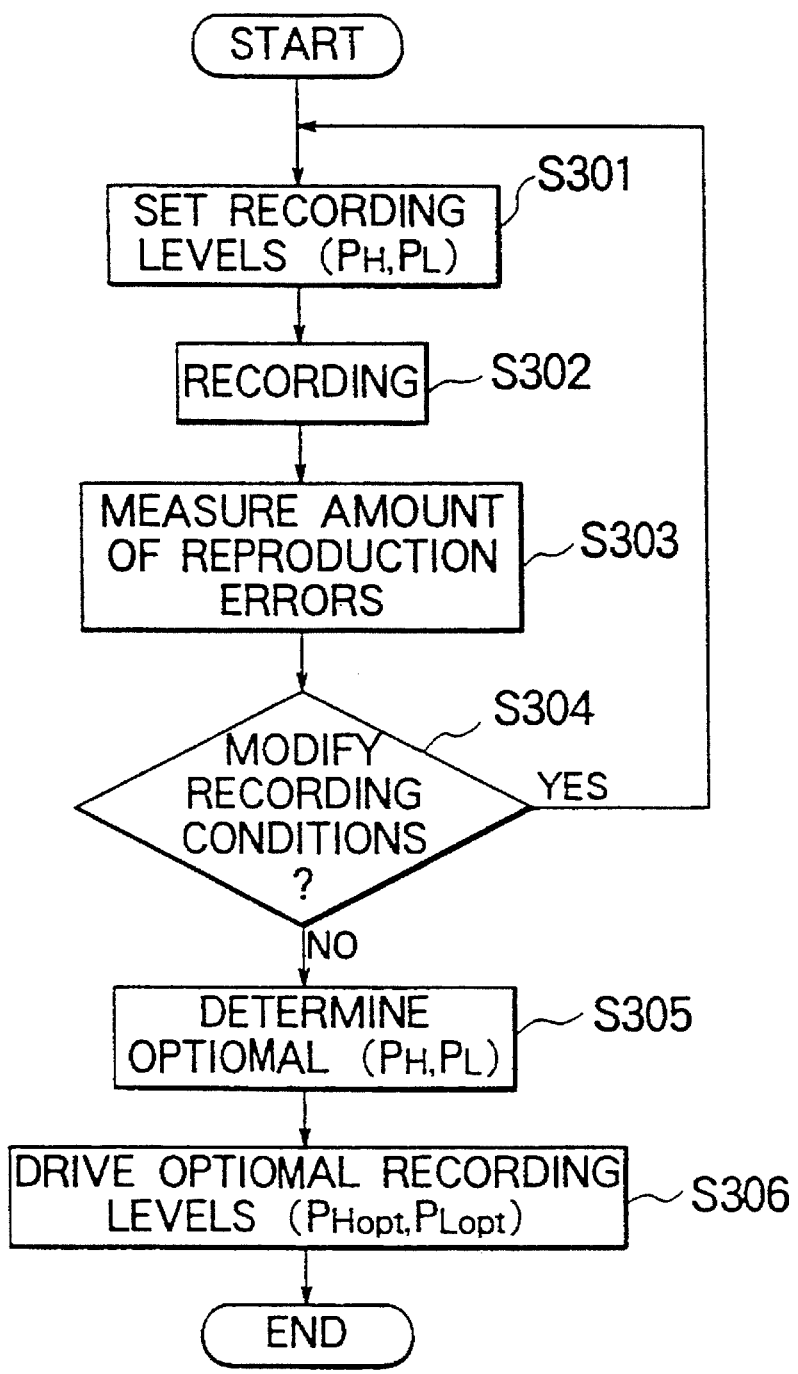
FIG. 16 is a flowchart showing the procedure for determining the optimal recording laser power levels using the optically modulated overwritable recording device of FIG. 13.
Figure 17:
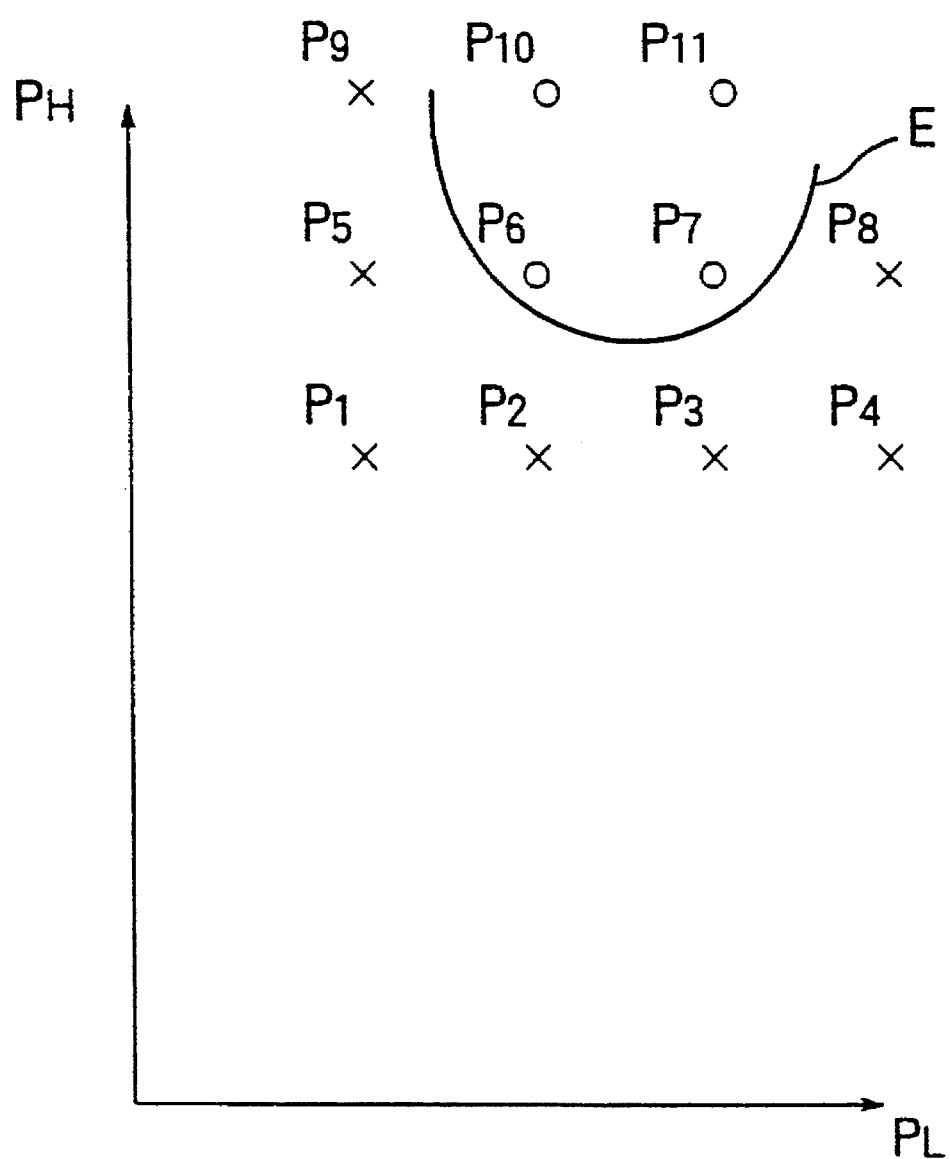
FIG. 17 is a diagram showing the dependence of the error rate upon the recording laser power levels $P_H$ and $P_L$.

FIG. 16 is a flowchart showing the procedure for determining the optimal recording laser power levels using the optically modulated overwritable recording device of FIG. 13. FIG. 17 is a diagram showing the dependence of the error rate upon the recording laser power levels $P_H$ and $P_L$.

The procedure for determining the optimal combination of high and low recording laser power levels $P_{Hopt}$ and $P_{Lopt}$ is described by reference to FIGS. 16 and 17. One cycle of the test recording and reproduction according to the procedure scans eleven measurement points as shown in FIG. 17.

First, the optical head 21 is driven at a predetermined laser power level to erase the past information recorded upon a track within the test recording region of the magneto-optical recording medium 1. Next, at step S301, the combination of the high and low recording laser power levels $P_H$ and $P_L$, as represented by point $P_1=(P_{H1}, P_{L1})$ in FIG. 17, is set: $P_H=P_{H1}$ and $P_L=P_{L1}$. At step S302, the test signal $T_1$ of the shortest repetition frequency 3T, consisting of the bit pattern "100", is recorded on the track of the magneto-optical recording medium 1.

At step S303, the amount of reproduction errors is determined as follows. The test data recorded upon the track of the magneto-optical recording medium 1 is reproduced by means of the optical head 21, and the reproduction signal is amplified by the head amplifier 22 and then is converted into two-level digital signal by the data detector circuit 23. The reproduced data RD output from the data detector circuit 23 is supplied to the phase-locked loop (PLL) circuit 24. In response thereto, the phase-locked loop (PLL) circuit 24 outputs the synchronous data SD. The synchronous data SD output from the phase-locked loop (PLL) circuit 24 includes erroneous bits if the waveform of the reproduced data RD exhibits fluctuations exceeding a predetermined level as described above. In response to the synchronous data SD supplied from the phase-locked loop (PLL) circuit 24, the data error determiner circuit 25 determines the amount of error (the number of occurrences of erroneous bits) contained in the synchronous data SD. The data error determiner circuit 25 outputs the amount of reproduction errors to the controller 10. The controller 10 calculates the error rate from the number of reproduction errors.

At step S304, the controller 10 judges if the recording conditions are still to be modified. Namely, it is judged whether or not the eleven points $P_1$ through $P_{11}$ are already scanned, If the judgment is negative, the execution returns to step S301, where the controller 10 changes the combination of the high and low recording laser power levels $P_H$ and $P_L$ according to a predetermined modification schedule. The steps S301 through S303 are performed for each combination of high and low recording laser power levels set at step S301. Before each recording operation, the data recorded upon the track of the magneto-optical recording medium 1 is erased at a predetermined laser power level, and at each step S302, the high and low recording laser power levels of the optical head 21 is controlled by the power controller circuit 26 according to the command from the controller 10. Thus, the combination $(P_H, P_L)$ of the high and low recording laser power levels is successively modified as represented by points $P_1$ through $P_{11}$ upon the $P_H$–$P_L$ plane shown in FIG. 17. For each point $P_1=(P_{H1}, P_{L1})$ through $P_{11}=(PH_{11}, P_{L11})$, the error rate is determined by the controller 10 at step S303.

In the controller 10 is set a predetermined error rate limit $10^{-6}$. The curve E in FIG. 17 represents the locus of the combination or point $(P_H, P_L)$ of the high and low recording laser power levels (i.e., the contour) at the error rate limit $10^{-6}$. At Step S305, the controller 10 determines the optimal combination $(P_{Hopt}, P_{Lopt})$ of the high and low recording laser power levels as follows, First the controller 10 determines whether or not the error rates at the point $P_1$ through $P_{11}$ are under the predetermined error rate limit. In FIG. 17, the cross X indicates the points at which the error rate is above the error rate limit E; the small circle o indicates the points at which the error rate is below the error rate limit E. The controller 10 selects the combination of smallest laser power levels (the point $P_6=(P_{H6}, P_{L6})$ in FIG. 17) from among the points below the predetermined error rate limit (the points $P_6$, $P_7$, $P_{10}$, and $P_{11}$ marked with a circle in FIG. 17). The combination ($P_{Hopt}$, $P_{Lopt}$) of the optimal high and low recording laser power levels is obtained by multiplying the $P_{H6}$ and $P_{L6}$ of the point $P_6$ selected above by predetermined factors $K_H$ and $K_L$, respectively. Namely, the optimal levels $P_{Hopt}$ and $P_{Lopt}$ are calculated as: $P_{Hopt}=K_H \cdot P_{H6}$ and $P_{Lopt}=K_L \cdot P_{L6}$. The factors $K_H$ and $K_L$ are set above 1.10, for example. It is assumed that the variation of the laser power level of the drive (optically modulated overwritable magneto-optical recording device) of FIG. 13 is under about 10 percent. Then, if the optical head 21 is driven at the laser power levels $P_{Hopt}$ and $P_{Lopt}$ as determined above, the actual high and low recording laser power levels do not fall below the power levels $P_{H6}$ and $P_{L6}$, respectively, approximately upon the contour E.

In accordance with the modification schedule $P_1$ through $P_{11}$ shown in FIG. 17, the erasure of the recorded data upon the test track of magneto-optical recording medium 1 effected before the test recording at each step S302 can be dispensed with. Namely, according to the modification schedule shown FIG. 17, the measurement points $P_1$ through $P_{11}$ are scanned successively in a two-dimensional pattern, from the lowest laser power point $P_1$ to the highest laser power point $P_{11}$ in an increasing order of laser power levels: $P_1, P_2, P_3, P_5, P_6, P_7, P_8, P_9, P_{10}, P_{11}$. Thus, interval upon the track on which "1" is recorded increasingly widens as the recording laser power levels are modified. Hence, the erasure operation can be dispensed with without adverse effects upon the measurement.

According to the third embodiment, during the test reproduction, the width of the detection window is narrowed by the delay operation of the reproduction clock VCOCK by the delay circuit 24f. Thus, the small fluctuations of the reproduced data RD can be detected and counted as errors, and hence the number of test tracks for determining the error rates can be reduced, and the measurement time required for the test can be minimized. Furthermore, the optimal combination of high and low recording laser power levels is obtained by multiplying by predetermined factors the combination of the lowest laser power levels exhibiting the error rate below the predetermined error rate limit E. Thus, by driving the optical head 21 at the optimal high and low recording laser power levels obtained in accordance with this embodiment, accurate and reliable reproduction of data below the predetermined error rate limit is ensured even if the laser power levels vary due to indeterminate factors.

EMBODIMENT 4

Figure 18:
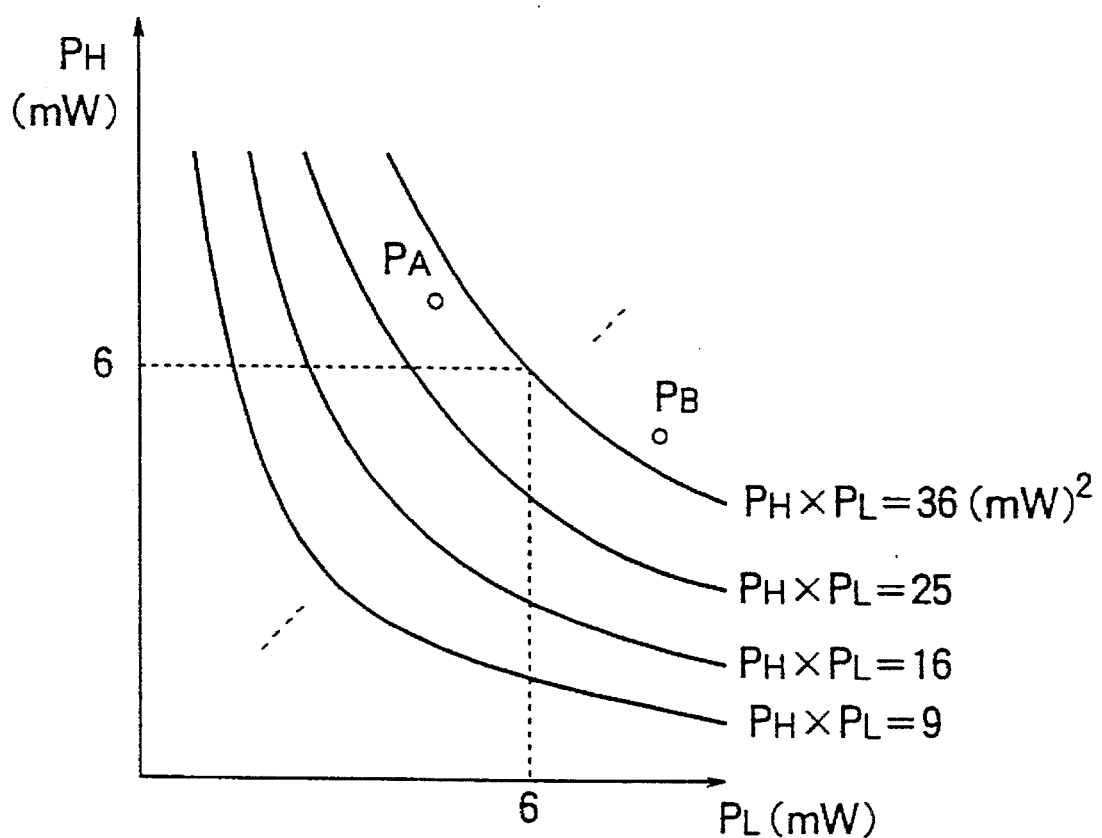
FIG. 18 is a diagram showing the contours of the product of the high and low recording laser power levels $P_H$ and $P_L$ upon the $P_H$–$P_L$ plane.

According to the third embodiment described above, the combination of the high and low recording laser power levels at the lowest laser power level (the point $P_6$ in FIG. 17) has been selected in determining the optimal combination of the high and low recording laser power levels. In such selection, the product of the high and low recording laser power levels may be used as the index of the laser power level of the combination of high and low recording laser power levels. FIG. 18 is a diagram showing the contours of the product of the high and low recording laser power levels $P_H$ and $P_L$ upon the $P_H$–$P_L$ plane. In FIG. 18, the contours or the equal-value curves corresponding to the values of the product $P_H \times P_L$ at 36 mW², 25 mW², 16 mW², and 9 mW² are shown. Assume that points $P_A$ and $P_B$ are two candidates for the optimal combination of the high and low recording laser power levels. Then, the product $P_H \times P_L$ of the high and low recording laser power levels corresponding to the point $P_A$ is below the curve 36 mW², while that corresponding to point $P_B$ is above the curve 36 mW². Thus, the point $P_A$ is selected as the optimal combination. Thus, according to this embodiment, the controller 10 selects as the combination at the lowest laser power level the combination of high and low recording laser power levels exhibiting the smallest value of the product $P_H \times P_L$ of the high and low recording laser power levels, such that the optimal combination can be selected precisely and swiftly. It goes without saying that the controller 10 may multiply the high and low recording laser power levels of the selected combination by predetermined factors to obtain the actual optimal high and low recording laser power levels at which the optical head 21 is driven during the user's recording operation.

EMBODIMENT 5

Figure 19:
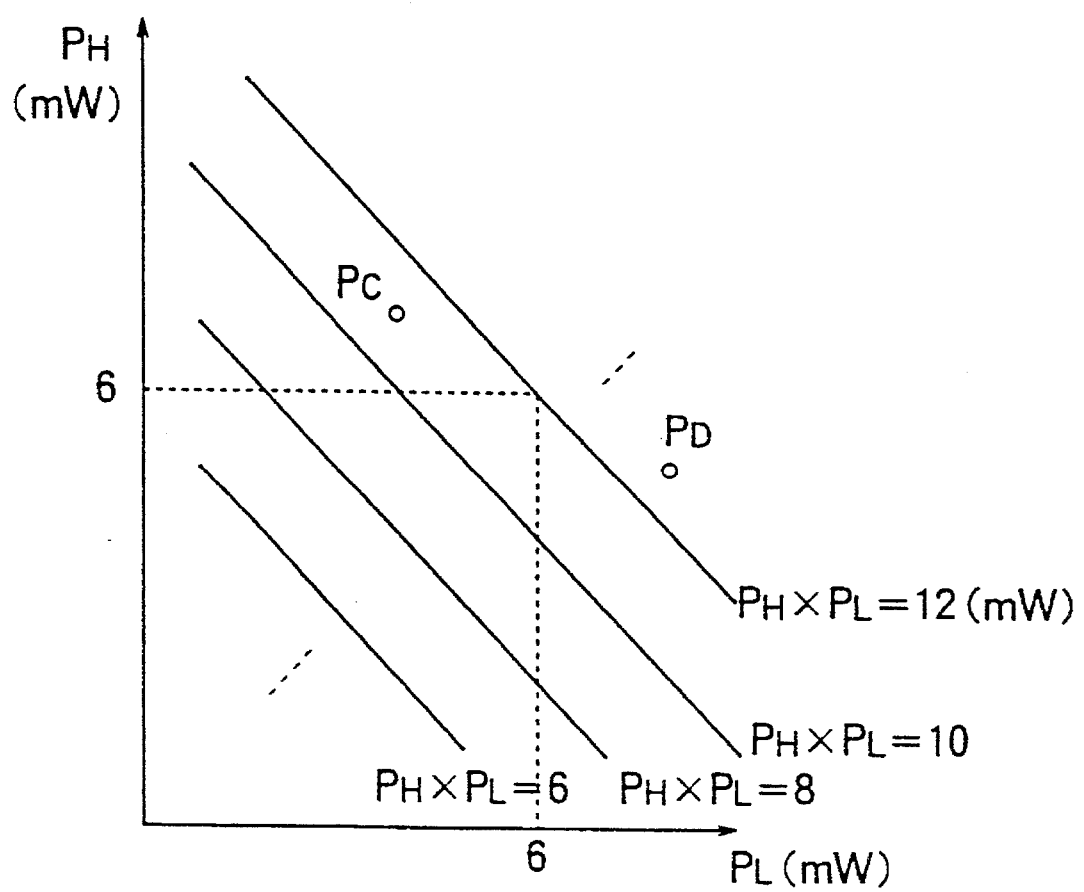
FIG. 19 is a diagram showing the contours of the sum of the high and low recording laser power levels $P_H$ and $P_L$ upon the $P_H$–$P_L$ plane.

Alternatively, the sum of the high and low recording laser power levels may be used as the index of the laser power level of the combination of high and low recording laser power levels. FIG. 19 is a diagram showing the contours of the sum of the high and low recording laser power levels $P_H$ and $P_L$ upon the $P_H$–$P_L$ plane. In FIG. 19, the contours or the curves corresponding to the sum $P_H+P_L$ at 12 mW, 10 mW, 8 mW, and 6 mW are shown. Assume that points $P_C$ and $P_D$ are two candidates for the optimal combination of the high and low recording laser power levels. Then, the sum $P_H+P_L$ of the high and low recording laser power levels corresponding to the point $P_C$ is below the curve 12 mW, while that corresponding to point $P_D$ is above the curve 12 mW. Thus, the point $P_C$ is selected as the optimal combination. Thus, according to this embodiment, the controller 10 selects as the combination at the lowest laser power level the combination of high and low recording laser power levels exhibiting the smallest sum of the high and low recording laser power levels $P_H$ and $P_L$, such that the optimal combination can be selected precisely and swiftly. It goes without saying that the controller 10 may multiply the high and low recording laser power levels of the selected combination by predetermined factors to obtain the actual optimal high and low recording laser power levels at which the optical head 21 is driven during the user's recording operation.

EMBODIMENT 6

Figure 20:
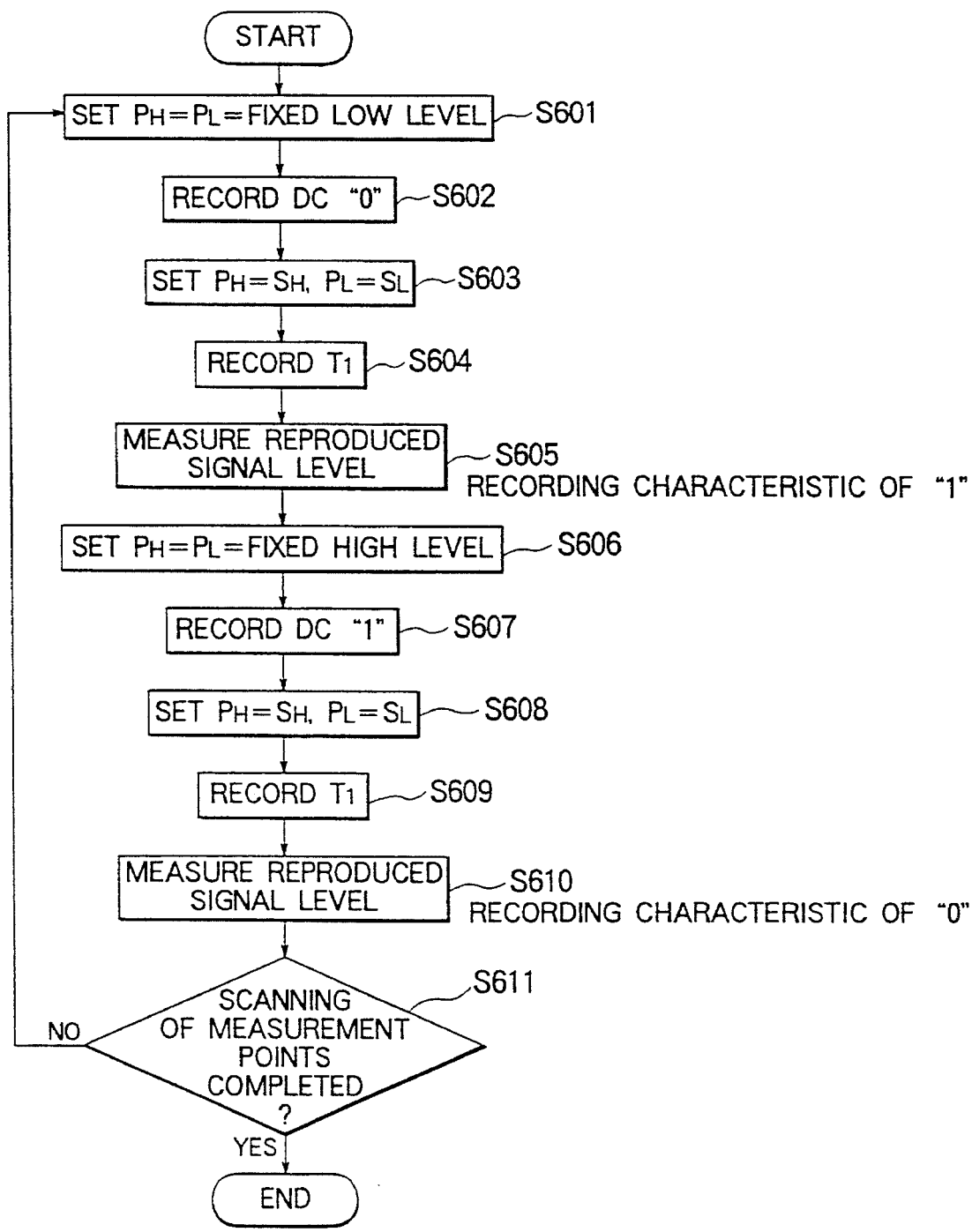
FIG. 20 is a flowchart showing the procedure for determining the optimal high and low recording laser power levels $P_H$ and $P_L$ according to the optimal levels search method of the sixth embodiment.
Figure 21:
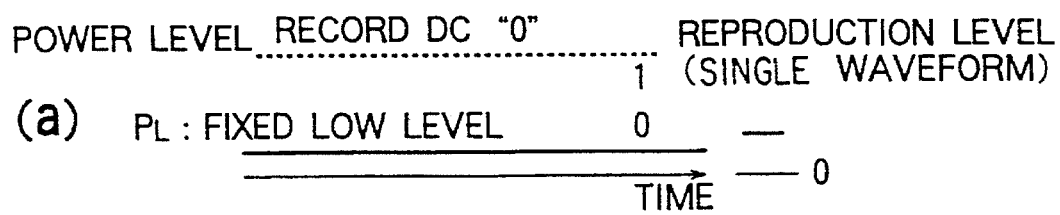
FIG. 21 shows recording and reproduction waveforms associated with the procedure of FIG. 20.
Figure 21:
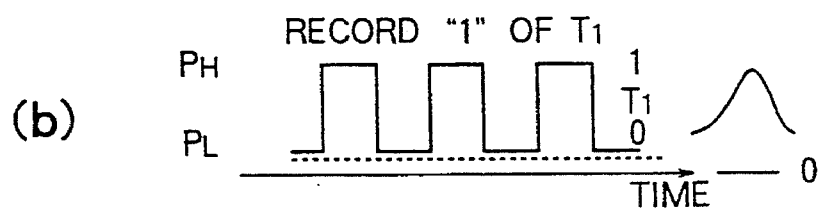
Figure 21:
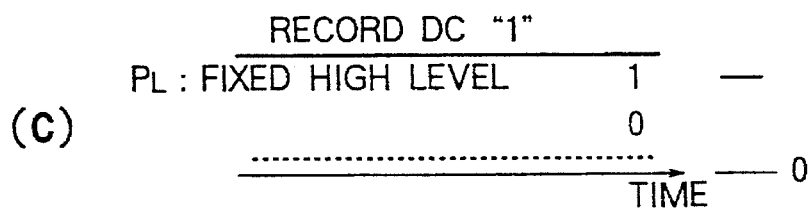
Figure 21:
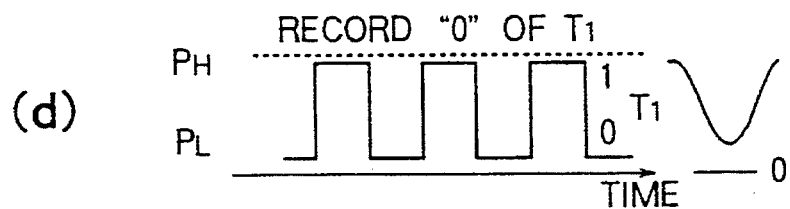

FIG. 20 is a flowchart showing the procedure for determining the optimal high and low recording laser power levels $P_H$ and $P_L$ according to the optimal levels search method of the sixth embodiment. FIG. 21 shows recording and reproduction waveforms associated with the procedure of FIG. 20. The optically modulated overwritable recording device used for the procedure has the same structure as that shown in FIG. 8. The procedure of FIG. 20 is executed by the controller 10 of FIG. 8.

At step S601, the high and low recording laser power levels $P_H$ and $P_L$ are set at the same fixed low laser power level at which "0" is recorded on the track of the magneto-optical recording medium 1. At step S602, DC "0" is recorded upon the track of the magneto-optical recording medium 1 to initialize the track. As shown at waveform (a) in FIG. 21, the recording of DC "0" is effected at a fixed low level.

Next, at step S603, the high and low recording laser power levels $P_H$ and $P_L$ are assigned the values $S_H$ and $S_L$, respectively, where $S_H \geq S_L$. At step S604, the test signal $T_1$ of the shortest repetition period 3T "100" is recorded upon the track of the magneto-optical recording medium 1 at the high and low recording laser power levels $P_H = S_H$ and $P_L = S_L$. At step S605, the recorded data is reproduced, and the reproduction signal level is measured by means of the level detector 13. The waveform of the recording laser power level and a single waveform corresponding to "1" of the reproduction signal level are shown at (b) in FIG. 21. The waveforms of FIG. 21 are schematic, and the durations of "1" and "0" of the waveforms are not proportional to the actual durations thereof. Since the track is initialed to "0" at step S602, the magnetization of intervals of the track upon the magneto-optical recording medium 1 corresponding to "1" of the test signal $T_1$ are inverted to record "1" at step S604. Thus, at step S605, the recording characteristic of "1" is determined.

At step S606, the high and low recording laser power levels $P_H$ and $P_L$ are set at the same fixed high laser power level at which "1" is recorded on the track of the magneto-optical recording medium 1. At step S607, DC "1" is recorded upon the track of the magneto-optical recording medium 1 to initialize the track. As shown at waveform (c) in FIG. 21, the recording of DC "1" is effected at a fixed high level.

Next, at step S608, the high and low recording laser power levels $P_H$ and $P_L$ are assigned again the values $S_H$ and $S_L$, respectively. At step S609, the test signal $T_1$ of the shortest repetition period 3T "100" is recorded upon the track of the magneto-optical recording medium 1 at the high and low recording laser power levels $PH = S_H$ and $P_L = S_L$. At step S610, the recorded data is reproduced, and the reproduction signal level is measured by means of the level detector 13. The waveform of the recording laser power level and a single waveform corresponding to "0" of the reproduction signal level are shown at (d) in FIG. 21. Since the track is initialed to "1" at step S607, the magnetization of intervals of the track upon the magneto-optical recording medium 1 corresponding to "1" of the test signal $T_1$ are inverted to record "1" at step S609. Thus, at step S610, the recording characteristic of "1" is determined. Further at step S610, the reproduction signal levels of "1" and "0" determined at steps S605 and S610 corresponding to the combination ($S_H$, $S_L$) of the high and low recording laser power levels are stored in the memory 14.

The steps S601 through 610 are repeated three times, each time modifying the values $S_H$ and $S_L$ assigned at steps S603 and S608, such that points $S_1$, $S_2$, and $S_3$ upon the $P_H$–$P_L$ plane corresponding to the combinations ($S_{H1}$, $S_{L1}$), ($S_{H2}$, $S_{L2}$), and ($S_{H3}$, $S_{L3}$), respectively, are scanned successively (see FIG. 22a), Namely, during the first execution cycle described above, the reproduction signal levels are measured at the point $S_1$ corresponding to the combination ($S_{H1}$, $S_{L1}$); during the second execution cycle, at the point $S_2$ corresponding to the combination ($S_{H2}$, $S_{L2}$); and during the third execution cycle, at the point $S_3$ corresponding to the combination ($S_{H3}$, $S_{L3}$).

Thus, at step S611, it is judged whether or not the two-dimensional scanning of the measurement points $S_1$, $S_2$, and $S_3$ upon the $P_H$–$P_L$ plane is completed. Namely, it is judged whether the values $S_H$ and $S_L$ assigned to $P_H$ and $P_L$ at steps S603 and S608 are equal to final values $S_{H3}$ and $S_{L3}$, respectively. If the judgment is negative at step S611, the execution returns to step S601 to repeat the steps S601 through S611 with new assignment values $S_H$ and $S_L$. If the judgment is affirmative at step S611, the procedure of FIG. 20 is terminated.

Figure 22A:
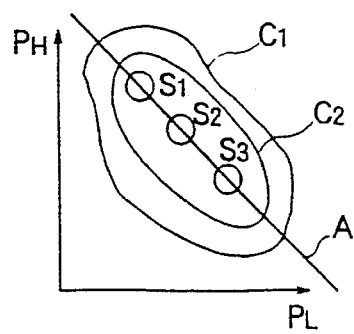
FIG. 22a is a diagram showing the three collinear measurement points step S1, step S2, and step S3 plotted upon the $P_H$–$P_L$ plane scanned by the procedure of FIG. 20.
Figure 22B:
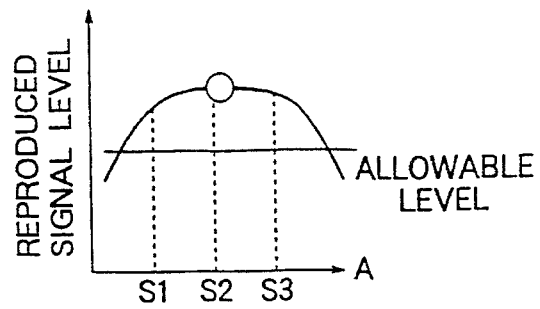
FIG. 22b is a diagram showing a distribution curve of the reproduction signal level along line A of FIG. 22a upon which the measurement points step S1, step S2, and step S3 lie.
Figure 22C:
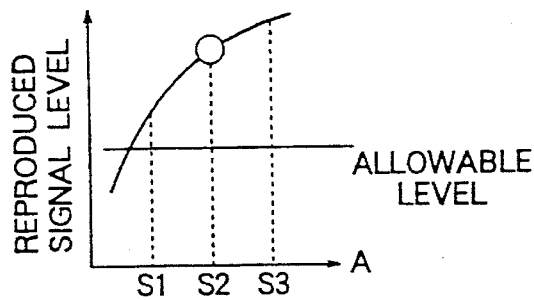
FIG. 22c is a diagram similar to FIG. 22b, but showing another example of the distribution curve.
Figure 22D:
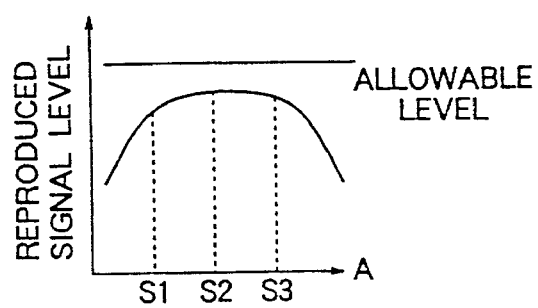
FIG. 22d is a diagram similar to FIG. 22b, but showing still another example of the distribution curve.
Figure 22E:
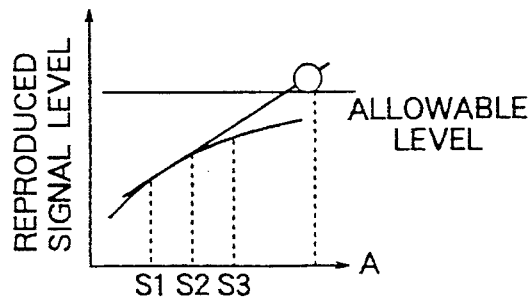
FIG. 22e is a diagram similar to FIG. 22b, but showing further example of the distribution curve.

FIG. 22a is a diagram showing the three collinear measurement points step $S_1$, step $S_2$, and step $S_3$ plotted upon the $P_H$–$P_L$ plane scanned by the procedure of FIG. 20. The curves $C_1$ and $C_2$ represent contours upon which the reproduction signal level is constant. The measurement points $S_1$, $S_2$ and $S_3$ lie on a straight line A. After the scanning procedure according to the flowchart of FIG. 20 is terminated, the reproduction signal levels corresponding to points $S_1$ through $S_3$ are determined and stored. The optimal combination ($P_{Hopt}$, $P_{Lopt}$) can be determined upon the line A on the basis of the reproduction signal levels at the three points $S_1$, $S_2$, and $S_3$ lying on the line A. Assume that the reproduction signal levels at $S_1$, $S_2$, and $S_3$ all exceed the allowable level as shown in FIG. 22b or 22c. Then, the central point $S_2 = (S_{H2}, S_{L2})$ is selected as the optimal combination of the high and low recording laser power levels. Assume, on the other hand, that the reproduction signal levels at the points $S_1$, $S_2$, and $S_3$ are all below the allowable level. Then, the distribution curve of the reproduction signal level along the line A is extended beyond $S_1$ and $S_3$ by means of linear or quadratic extrapolation, and, as shown in FIG. 22e, a point (indicated by a circle) upon the extrapolated distribution curve at which the reproduction signal exceeds the allowable level is determined as the point corresponding to the combination of the optimal high and low recording laser power levels. If the extrapolated curve does not rise above the allowable level as shown in FIG. 22d, the procedure of FIG. 20 may be repeated, after selecting a new set of measurement points $S_1$ through $S_3$ lying on a new line A.

According to the procedure of FIG. 20, the recording characteristic of "1" and "0" can be determined by measurements of reproduction signal level of a large magnitude. Thus, the measurement precision is enhanced. Further, the test signal consists of a single pattern "100". Thus, the level detector 13 can be implemented solely by a filter circuit for extracting the test signal $T_1$. The test signal generator 11 can also be implemented by a small and simple circuit for generating a signal pattern of "1" and "0" only.

Figure 23A:
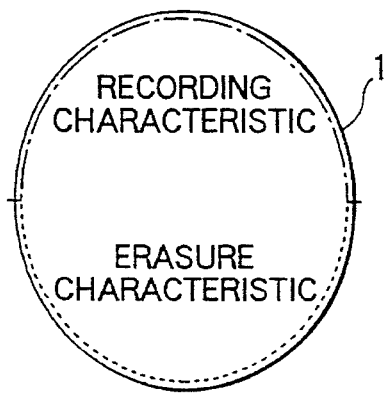
FIG. 23a is a schematic plan view of the magneto-optical recording medium showing a test track of magneto-optical recording medium divided into two semicircles for determining the recording and erasure characteristics.

For the determination of the recording characteristic of "1" and the erasure characteristic (the recording characteristic of "0"), a test signal is recorded at a combination ($P_H$, $P_L$) of the high and low recording laser power levels. Such determination of the recording characteristics at the high and low recording laser power levels $P_H$ and $P_L$ can be effected as follows:

(1) As shown in FIG. 23a, the test track of magneto-optical recording medium 1 may be divided into two semicircles (shown by a dot-and-dash curve and a dotted curve, respectively) for determining the recording and erasure characteristics, respectively. Then, the determinations of the recording and erasure characteristics may be effected as follows. First, DC "1" is recorded upon the semicircle for determining the recording characteristic, and DC "0" is recorded upon the semicircle for determining the erasure characteristic. Next, the test signal is recorded along the whole circle of the track and then the reproduction signal level is determined. Thus, a single recording operation of the test signal upon the test track is sufficient for determining the recording and erasure characteristics at each combination of high and low recording laser power levels $P_H$ and $P_L$.

Figure 23B:
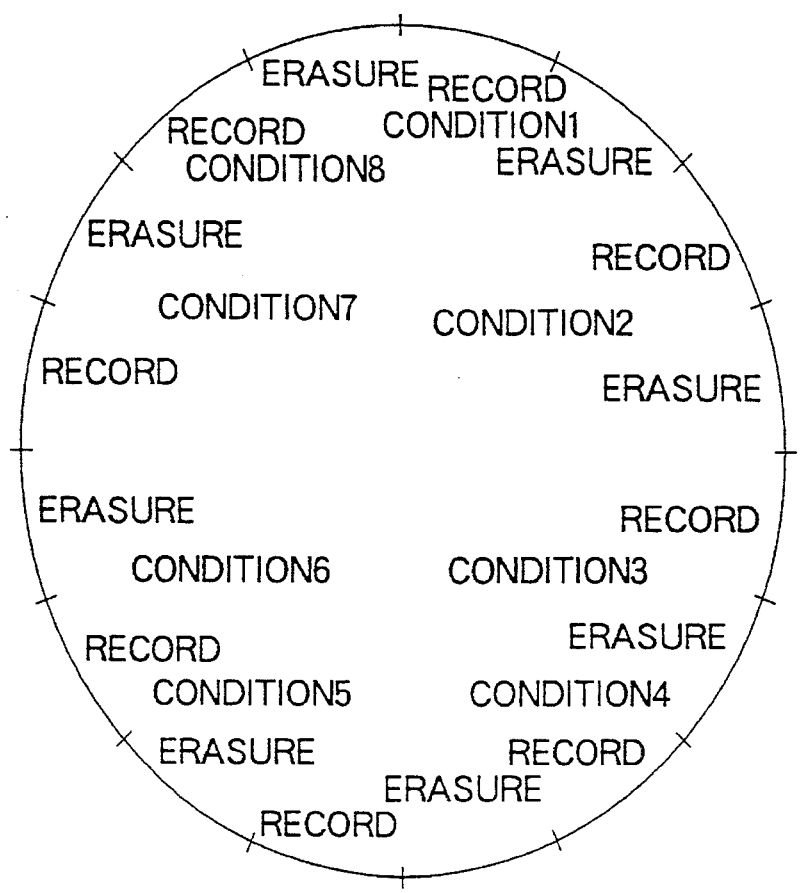
FIG. 23b is a schematic plan view of the magneto-optical recording medium showing a test track of magneto-optical recording medium divided into a plurality of segment area for determining the recording and erasure characteristics.

(2) As shown in FIG. 23b, the test track of magneto-optical recording medium 1 may be divided into a plurality of segment arcs for determining the recording and erasure characteristics. The arcs for determining the recording characteristic alternate with the arcs for determining the erasure characteristic. The determination of the recording and erasure characteristics at seven distinct combinations of high and low recording laser power levels, for example, can be effected as follows. First, the arcs for determining the recording and the erasure characteristics are initialized by DC "0" and "1", respectively. Then, the test signal is recorded upon the test track at high and low recording laser power levels $P_H$ and $P_L$, successively modifying the high and low recording laser power levels $P_H$ and $P_L$ at which the test signal is recorded. Namely, at a first combination of the high and low recording laser power levels (corresponding to the first condition), the test signal is recorded upon the first pair of adjacent arcs for the recording and the erasure characteristics. At a second combination of the high and low recording laser power levels (corresponding to the second condition), the test signal is recorded upon the second pair of adjacent arcs for the recording and the erasure characteristics. Similarly, the test signal is recorded at third through seventh combinations upon the third through seventh pairs of arcs, respectively. Thus, a single recording operation of the test signal upon the test track is sufficient for determining the recording and erasure characteristics at the seven distinct combinations of high and low recording laser power levels $P_H$ and $P_L$. The efficiency of the measurement can thus be greatly enhanced.

Using the measurement technique shown in FIG. 23b in the procedure of FIG. 20, the recording and the measurement of the reproduction signal level at three combinations $S_1$, $S_2$, and $S_3$ of the high and low recording laser power levels can be completed within a single turn of the magneto-optical recording medium 1.

Before the procedure of FIG. 20, the optimal region of the combination of high and low recording laser power levels corresponding to the region A in the $\alpha$-K plane of FIG. 10 may be determined in accordance with the procedure of second embodiment. Namely, it is known that the region 1 in FIG. 10 is defined by boundary lines $L_1$, $L_2$ and $L_4$. As described above, the position of these lines upon the $\alpha$-K plane may be determined by measurements of the reproduction signal levels at a small number of points. Then, in FIG. 10, the region A is determined within the region 1 with a predetermined margin. The points $S_1$, $S_2$, and $S_3$ are then selected from within the region in FIG. 22a (enclosed, for example, by the contour curve $C_1$ or $C_2$) corresponding to the region A in the $\alpha$-K plane of FIG. 10, and the optimal combination of the high and low recording laser power levels $P_H$ and $P_L$ is determined on the basis of the measurements at the points $S_1$ through $S_3$.

For the purpose of determining a representative point in the region A, the following points may be noted.

(a) It is desirable that the high recording laser power level $P_H$ is as low as possible. The reasons are as follows. The life of the laser diode LD 16a depends upon the maximum output power. Further, smaller consumption of power by the recording device is desirable, Furthermore, assuming that the magneto-optical recording medium 1 consists of four magnetic layers as shown in FIG. 1, it is desirable that the maximum temperature is well below the Curie point $T_{C4}$ of the fourth magnetic layer 7.

(b) It is desirable that the margin at the side of the low recording laser power level $P_L$ (the margin above the line $L_4$ in FIG. 10, or, in terms of temperature, the margin of the minimum point of the temperature distribution curve of FIG. 9 above the Curie point $T_{C1}$ of the first magnetic layer 4) is as wide as possible. The reason is as follows. The recording at the low recording laser power level $P_L$ is done at a low temperature close to the ambient room temperature, and hence is prone to be affected by the variation in the ambient temperature. Thus, a wide margin is desirable to ensure a reliable recording operation.

(c) The margin for the high recording laser power level $P_H$ need not be greater than the margin taken at the side of the low recording laser power level $P_L$.

EMBODIMENT 7

Figure 24:
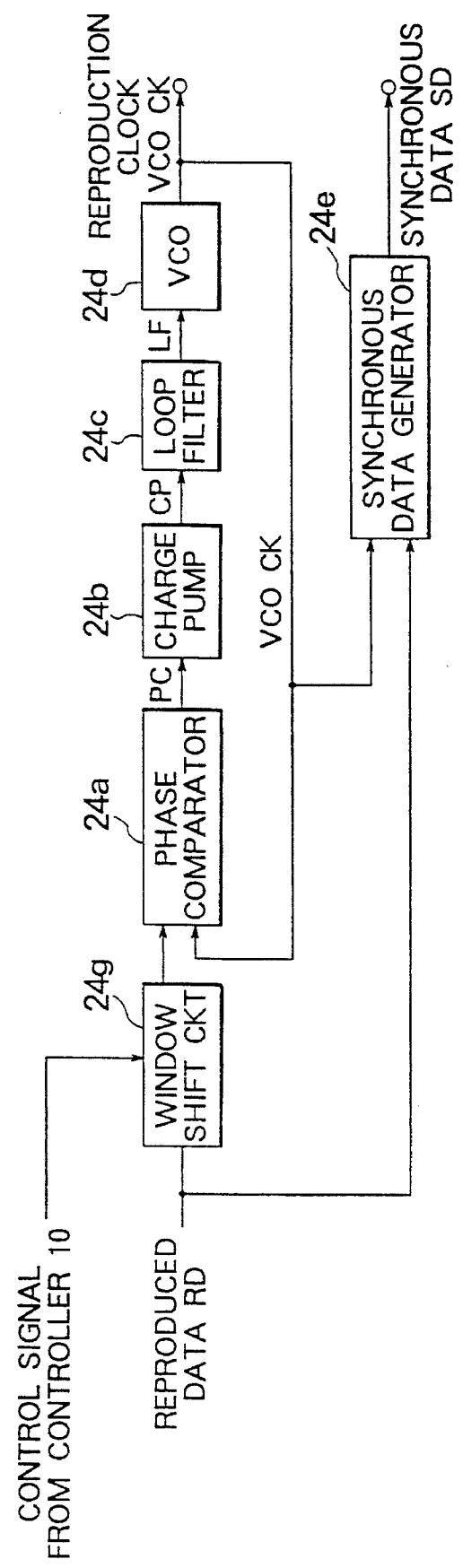
FIG. 24 is a block diagram showing another structure of the phase-locked loop circuit of FIG. 13.

FIG. 24 is a block diagram showing another structure of the phase-locked loop circuit of FIG. 13. Thus, the structure of the recording device according to thin embodiment is similar to that according to the third embodiment except for the following points.

According to this embodiment, the rising edges of the reproduced data RD are used in obtaining the synchronous data SD. Thus, the reproduced data RD output from the data detector circuit 23 may consist of short pulses corresponding to the bit "1" as shown by the waveform (b) in FIG. 25. Further, instead of the delay circuit 24f of the circuit of FIG. 14, the phase-locked loop (PLL) circuit 24 of FIG. 24 includes a window shift circuit 24g. In response to the command signal from the controller 10, the window shift circuit 24g shifts the reproduced data RD positively or negatively and outputs the shifted reproduced data RD to the phase comparator 24a. The phase comparator 24a, the charge pump 24b, the loop filter 24c and the voltage controlled oscillator (VCO) 24d are similar to those of FIG. 14. The reproduction clock VCOCK output from the voltage controlled oscillator (VCO) 24d, however, is directly supplied to synchronous data generator 24e. Assuming that no shifting of the reproduced data RD is performed by the window shift circuit 24g and that the reproduced data RD is ideally reproduced, each rising edge of the reproduction clock VCOCK may substantially be synchronized with the center of a corresponding bit "1" or "0" of the ideally reproduced data RD.

Figure 25:
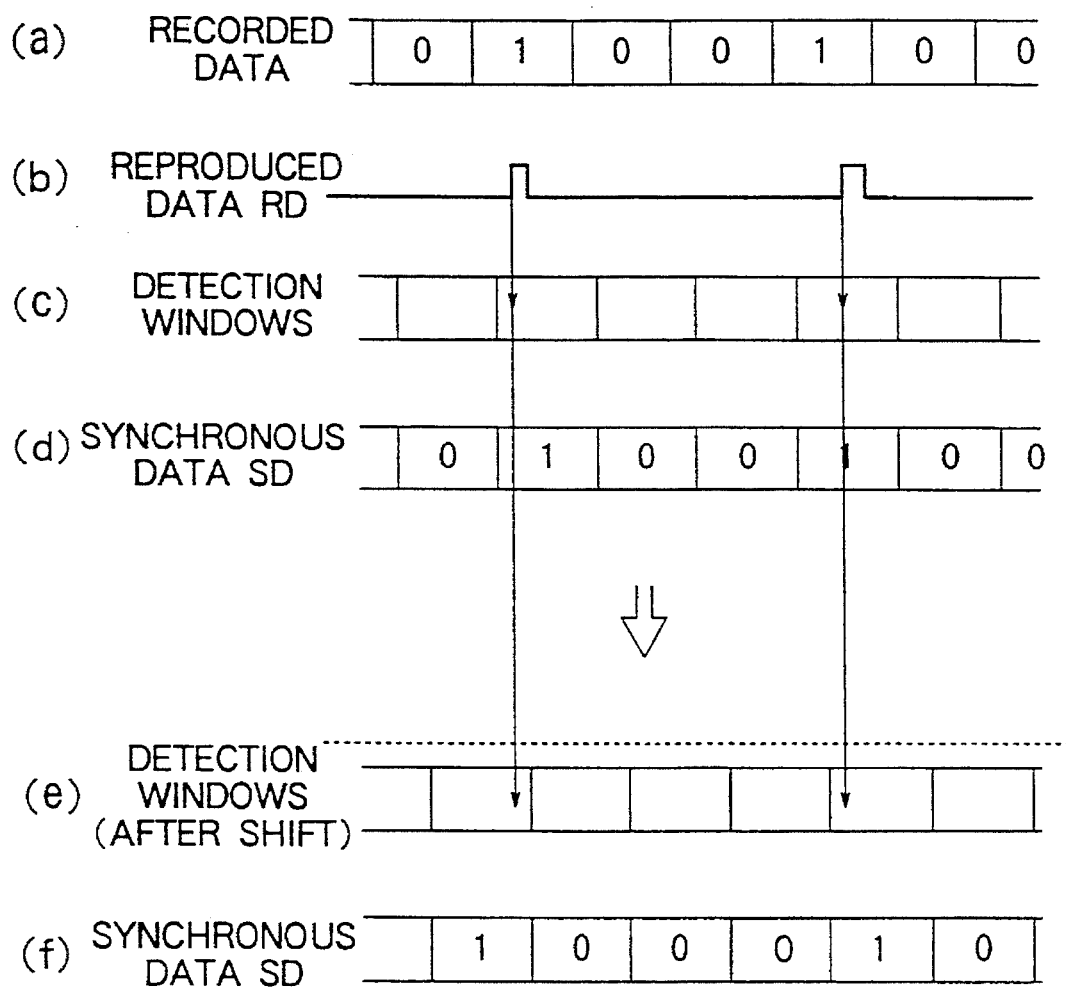
FIG. 25 is a diagram showing the patterns of recorded and reproduced data together with the detection window for reproduction in the circuit of FIG. 24.

The operation of the synchronous data generator 24e is somewhat different from that of FIG. 14, Namely, on the basis of the reproduction clock VCOCK supplied from the voltage controlled oscillator (VCO) 24d, the synchronous data generator 24e determines the detection windows (see FIG. 25 (c)) for determining the rising edge of the reproduced data RD. The leading edge of each window may be defined by a rising edge of the reproduction clock VCOCK. When a rising edge of the reproduced data RD shown at (b) shown in FIG. 25 is detected within a detection window shown at (c), the synchronous data generator 24e outputs "1" for such detection window. Otherwise, the synchronous data generator 24e outputs "0" for the detection window. The synchronous data generator 24e thus obtains the synchronous data SD shown at (d).

When the recorded data is reproduced accurately, the rising edge of the reproduced data RD is substantially at the center of the corresponding detection window, and hence the bit pattern of the synchronous data SD is identical to that of the recorded data. However, due to the sensitivity variance or defects in the magneto-optical recording medium 1, or due to waveform interferences, noises, or fluctuations in the rotation of the magneto-optical recording medium 1, the rising edges of the reproduced data RD shown at (b) are deviated from the center of the corresponding detection windows. In spite of this jitter or fluctuation of the reproduced data RD, the synchronous data SD correctly corresponding to the recorded data is output from the 24e so long as the the rising edges of the reproduced data RD (b) remain within respective detection windows (c). Thus, the correct pattern "100" corresponding to the recorded pattern is obtained as the synchronous data SD (d).

However, in response to the command from the controller 10, the detection windows are shifted during the test procedure as shown at (e) in FIG. 25. Then, the deviated rising edge of the reproduced data RD may move into an adjacent window of the shifted detection windows (e), such that the synchronous data SD (f) including an erroneous pattern "000" may be output from the synchronous data generator 24e. In response to the command from the controller 10, the window shift circuit 24g shifts the detection window in the positive or the negative direction by a predetermined shift amount which is less than one half of the period of the detection windows (i.e., the repetition period of the reproduction clock VCOCK).

Figure 26:
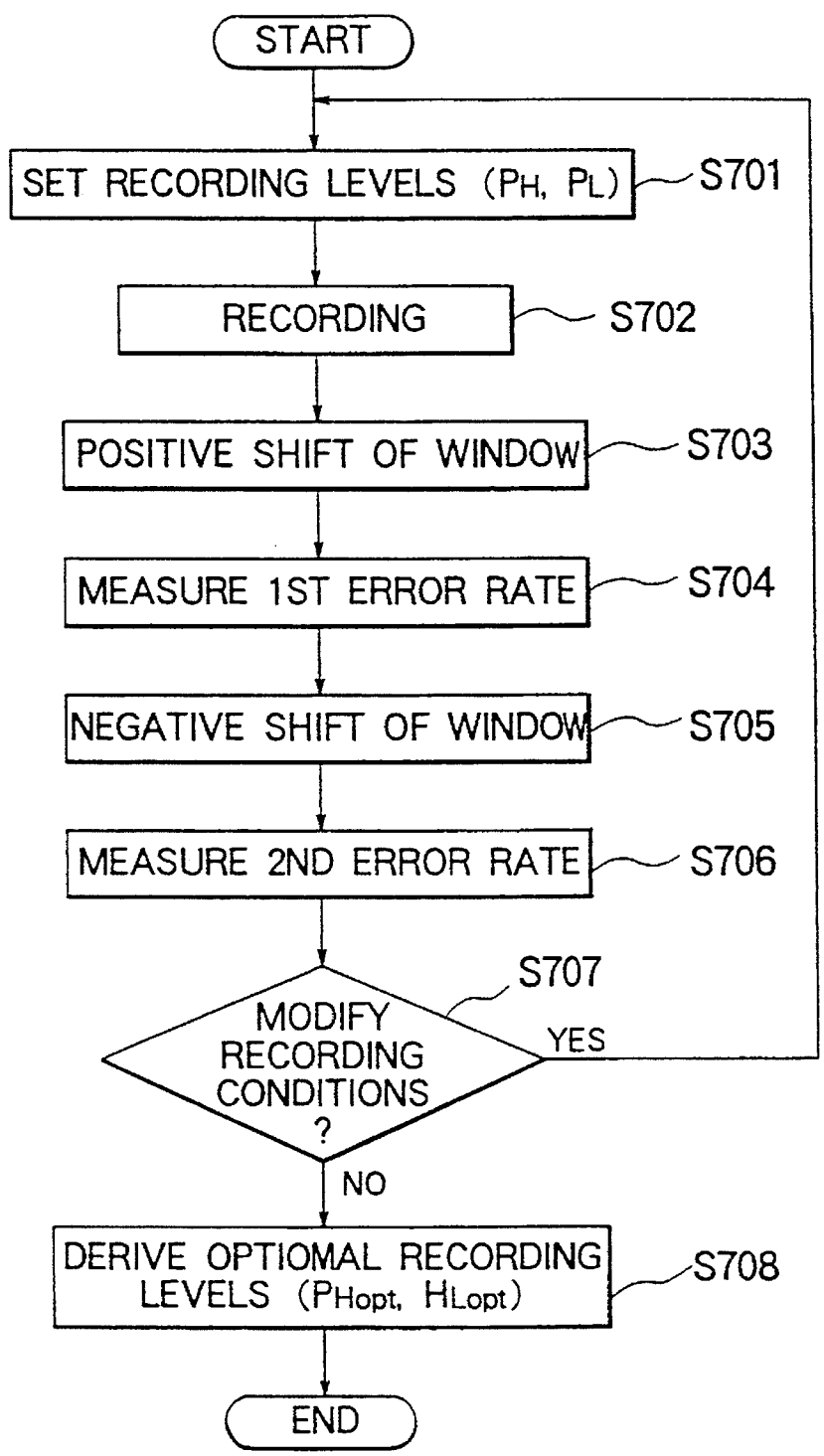
FIG. 26 is a flowchart showing a procedure for determining the optimal combination of high and low recording laser power levels using the optically modulated recording device including the circuit of FIG. 24.

FIG. 26 is a flowchart showing a procedure for determining the optimal combination of high and low recording laser power levels using the optically modulated recording device including the circuit of FIG. 24. First, a laser beam at a predetermined level is radiated upon the test track of the magneto-optical recording medium 1 to erase the data thereon. Next, at step S701, the high and low recording laser power levels $P_H$ and $P_L$ are assigned a set of values. At step S702, the test signal $T_1$ of the pattern "100", for example, is recorded upon the test track.

Next, at step S703, the detection window is shifted positively by a predetermined magnitude $W_M$. At step S704, the first error rate is measured. Namely, the data recorded upon the track of the magneto-optical recording medium 1 is reproduced by means of the optical head 21, amplified by the head amplifier 22 and then is converted into a two-level signal by the data detector circuit 23. The reproduced data RD output from the data detector circuit 23 is supplied to the phase-locked loop (PLL) circuit 24, In response to the command signal from the controller 10, the window shift circuit 24g of the phase-locked loop (PLL) circuit 24 shifts the detection window by $+W_M$, and the synchronous data generator 24e of the phase-locked loop (PLL) circuit 24 outputs the synchronous data SD, which includes erroneous bits as described above. The data error determiner circuit 25 determines the number of errors contained in the synchronous data SD and outputs the result to the controller 10. On the basis of the number of errors output from the data error determiner circuit 25, the controller 10 determines the error rate of the synchronous data SD (the first error rate). The first error rate is stored in an internal memory.

Further, at step S705, the detection window is is shifted negatively by a predetermined magnitude $W_M$, and at step S706, the second error rate is measured. Namely, in response to the command from the controller 10, the detection window is shifted by $-W_M$ by the window shift circuit 24g, and the number of errors contained in the synchronous data SD output from the synchronous data generator 24e of the phase-locked loop (PLL) circuit 24 is determined by the data error determiner circuit 25. On the basis of the output of the data error determiner circuit 25, controller 10 determines and stores the second error rate.

The steps S701 through S706 are repeated for various recording conditions or the combinations ($P_H$, $P_L$) of high and low recording laser power levels. Thus, at step S707, it is judged whether or not the recording conditions is still to be modified. Namely, it is determined whether or not a predetermined region upon the $P_H$–$P_L$ plane has been scanned by the combination ($P_H$, $P_L$) of the high and low recording laser power levels set at step S701. If the judgment is affirmative (i.e., if there remains areas not yet scanned in the predetermined region upon the $P_H$–$P_L$ plane) at step S707, the execution proceeds to step S701 to repeat the steps S701 through step S706. Otherwise the execution proceeds to step S708.

Thus, after the steps S701 through S706 are repeated for the various combinations ($P_H$, $P_L$) of the high and low recording laser power levels to effect the two-dimensional scan of the predetermined region upon the $P_H$–$P_L$ plane, the execution proceeds to step S708. At step S708, the optimal high and low recording laser power levels $P_{Hopt}$ and $P_{Lopt}$ are determined as follows.

Figure 27:
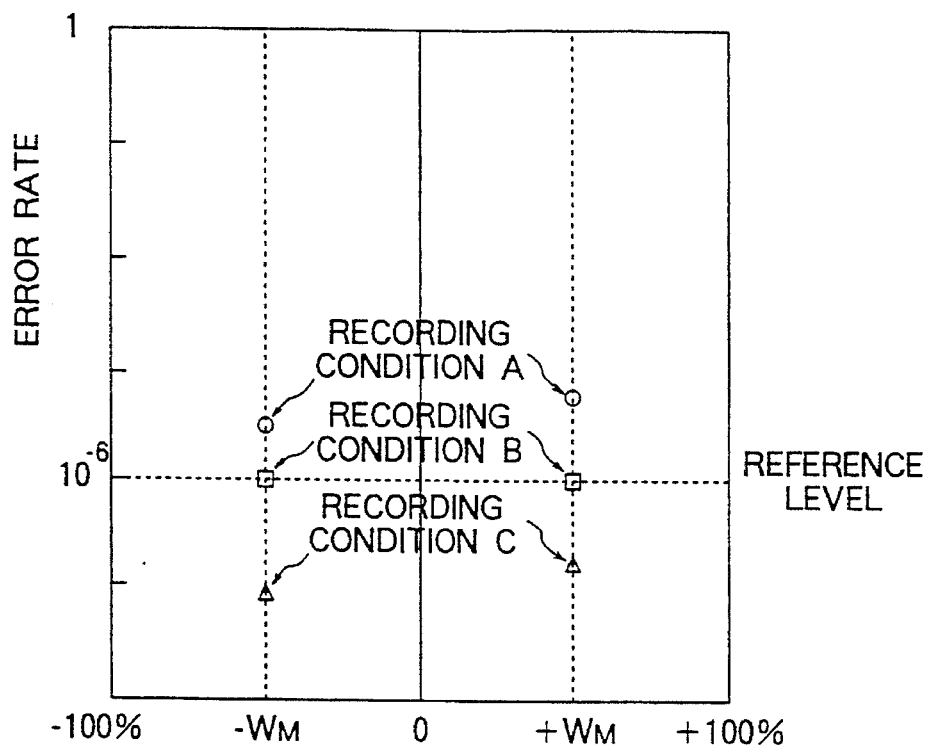
FIG. 27 is a diagram showing the error rates under various recording conditions when a positive and a negative shift of the detection window for detecting the rising edge of the reproduced data RD is made in accordance with the procedure of FIG. 26.

FIG. 27 is a diagram showing the error rates under various recording conditions when a positive and a negative shift of the detection window for detecting the rising edge of the reproduced data RD is made in accordance with the procedure of FIG. 26. Along the abscissa is plotted the magnitude of the shift of the detection window, measured in percentage relative to the one half $T_W/2$ of the width $T_W$ of each detection window. The error rates obtained with shifts $-W_M$ and $+W_M$ under recording conditions A, B, and C are represented by dots having the form of a small circle, a square, and a triangle, respectively. The recording conditions A, B, and C correspond to the respective combinations of high and low recording laser power levels $P_H$ and $P_L$. Under recording condition A, the error rates with the positive and the negative shifts are both above the reference level, which is set at $10^{-6}$. Under recording condition B, the error rates with the positive and the negative shifts are both at the reference level, $10^{-6}$. Under recording condition C, the error rates with the positive and the negative shifts are both below the reference level, $10^{-6}$.

Figure 28:
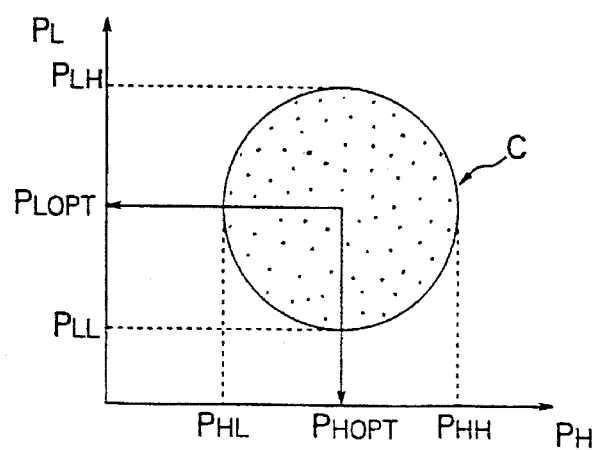
FIG. 28 is a diagram showing the closed curve C upon the $P_H$–$P_L$ plane within which the error rates occurring with a positive and a negative shift of the detection window is under the reference level in accordance with the procedure of FIG. 26.

First at step S708, the combinations ($P_H$, $P_L$) of the high and low recording laser power levels at which both the first and the second error rates determined at step S704 and step S706, respectively, are under the reference level $10^{-6}$ are determined. Each combination ($P_H$, $P_L$) corresponds to a point upon the $P_H$–$P_L$ plane. FIG. 28 is a diagram showing the closed curve C upon the $P_H$–$P_L$ plane within which the error rates occurring with a positive and a negative shift of the detection window is under the reference level in accordance with the procedure of FIG. 26. The point corresponding to the condition A in FIG. 27, for example, lies outside of the curve C. The point corresponding to the condition B in FIG. 27 lies upon the curve C. The point corresponding to the condition C in FIG. 27 lies within the curve C. Further, the maximum Pus and the minimum $P_{HL}$ of the high recording laser power level $P_H$ of the points ($P_H$, $P_L$) within the curve C (i.e., the combination ($P_H$, $P_L$) at which both the first and the second error rates are under the reference level) are determined. Similarly, the maximum $P_{LH}$ and the minimum $P_{LL}$ of the low recording laser power level $P_L$ of the points ($P_H$, $P_L$) within the curve C are determined. The $P_{Hopt}$ and $P_{Lopt}$ are obtained as the average of the maximum and the minimum of the high and low recording laser power levels, respectively: $P_{Hopt}=(P_{HH}+P_{HL})/2$ and $P_{Lopt}=(P_{LH}+P_{LL})/2$.

EMBODIMENT 8

Figure 29:
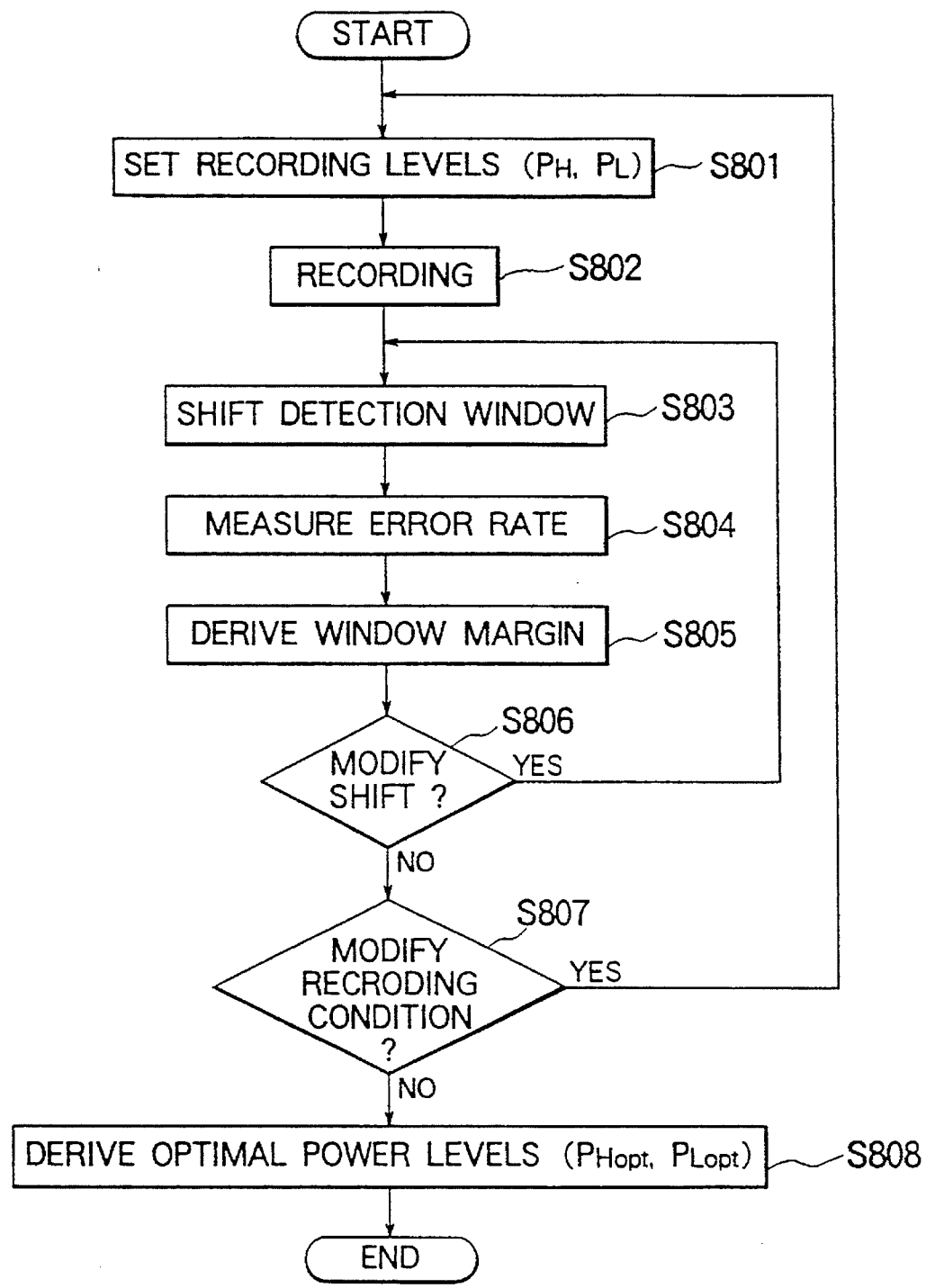
FIG. 29 is a flowchart showing an alternative procedure for determining the optimal combination of high and low recording laser power levels using the optically modulated recording device including the circuit of FIG. 24.

FIG. 29 is a flowchart showing an alternative procedure for determining the optimal combination of high and low recording laser power levels using the optically modulated recording device including the circuit of FIG. 24.

First, a laser beam at a predetermined level is radiated upon the test track of the magneto-optical recording medium 1 to erase the data thereon. Next, at step S801, the high and low recording laser power levels $P_H$ and $P_L$ are assigned a set of values. At step S802, the test signal $T_1$ of the pattern "100", for example, is recorded upon the test track at the high and low recording laser power levels $P_H$ and $P_L$.

At step S803, the detection window is shifted, and at step S804, the error rates are measured. Namely, the detection window is first shifted by $+W_M$ by means of the window shift circuit 24g, and the error rate (the first error rate) of the synchronous data SD is measured. Next, the detection window is shifted by $-W_M$ by means of the window shift circuit 24g, and the error rate (the second error rate) of the synchronous data SD is measured. As described below, the value of the variable $W_M$ is modified successively in each execution cycle of steps S803 through S806.

At step S805, the window margin X corresponding to $W_M$ is determined. The window margin X corresponding to $W_M$ is calculated in accordance with the following formula:

$$X=\{W_M/(T_W/2)\}\times 100$$

where $T_W$ is the width of the detection window.

At step S806, it is judged whether or not the magnitude of shift $W_M$ is still to be modified. If the judgment is affirmative at step S806, the execution return to step S803, where the shift amount $W_M$ is modified and the steps S803 through S805 are executed for the new value of $W_M$.

Figure 30:
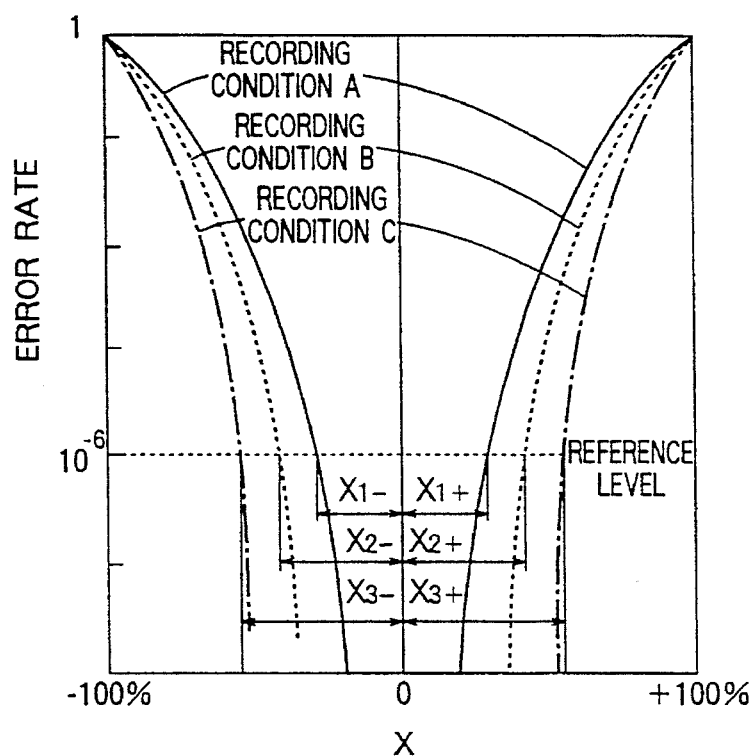
FIG. 30 is a diagram showing the curves representing the error rates under various recording conditions in relation to the positive and the negative shifts of the detection window in accordance with the procedure of FIG. 29.

FIG. 30 is a diagram showing the curves representing the error rates under various recording conditions in relation to the positive and the negative shifts of the detection window in accordance with the procedure of FIG. 29. Along the abscissa is plotted the window margin X; along the ordinate is plotted the error rate. By repeating the steps S803 through S806 of FIG. 29, a curve representing the change of the error rate relative to the window margin X is obtained. Thus, for recording condition A, for example, the positive and the negative window margin $X_1+$ and $X_1-$ at which the curve A crosses the reference level (e.g., $10^{-6}$) are determined. The smaller of the two values $X_1+$ and $X_1-$ is selected as the window margin $X_1$ for the recording condition A.

After the window margin X is thus determined for the recording condition ($P_H$, $P_L$) set at step S801, the execution proceeds to step S807, where it is judged whether or not the recording condition is still to be modified. Namely, it is judged whether a predetermined two-dimensional region upon the $P_H$–$P_L$ plane has not yet been scanned fully by the point corresponding to the combination ($P_H$, $P_L$) set at step S801. If the judgment is affirmative (i.e., if there still remains area to be scanned), the execution returns to step S801 to repeat the steps S803 through S806 for the new recording condition or the combination ($P_H$, $P_L$) of the high and low recording laser power levels. It is noted that the test track is erased each time before step S802.

Thus, after the steps S801 through S807 is completed, the window margin X corresponding to the combination ($P_H$, $P_L$) is obtained for each point within the predetermined region upon the $P_H$–$P_L$ plane. For example, for the recording conditions B and C shown in FIG. 30, the window margin $X_2$ and $X_3$ are obtained as the smaller of the positive and the negative shifts $X_2+$ and $X_2-$ (for $X_2$) and $X_3+$ and $X_3-$ (for $X_3$) at the reference error rate. Thus, the value of window margin X is obtained for each point within the predetermined region upon the $P_H$–$P_L$ plane.

Figure 31:
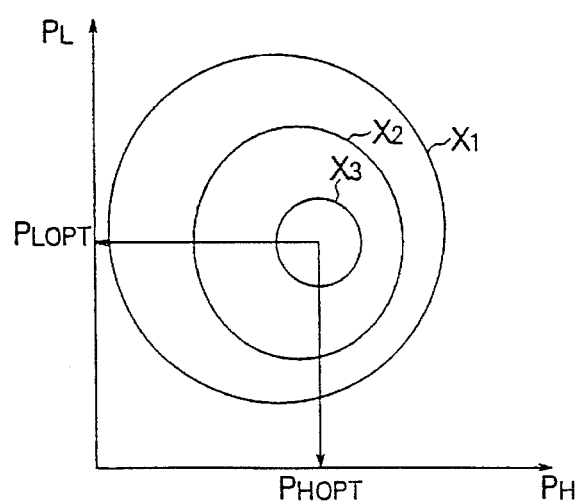
FIG. 31 is a diagram showing the equal-value curves or contours at shift margins $X_1$, $X_2$, and $X_3$ upon the $P_H$–$P_L$ plane.

FIG. 31 is a diagram showing the equal-value curves or contours at shift margins $X_1$, $X_2$, and $X_3$ upon the $P_H$–$P_L$ plane. The curve corresponding to the window margin X shrinks as the value of X increases. The optimal combination ($P_{Hopt}$, $P_{Lopt}$) corresponds to the point into which the curve X shrinks when the value of X is increased gradually. The optimal point ($P_{Hopt}$, $P_{Lopt}$) is the point at which the window margin X is at the maximum. Thus the optimal point may be determined by means of the linear interpolation by selecting several points within a curve X of predetermined magnitude.

EMBODIMENT 9

Figure 32:
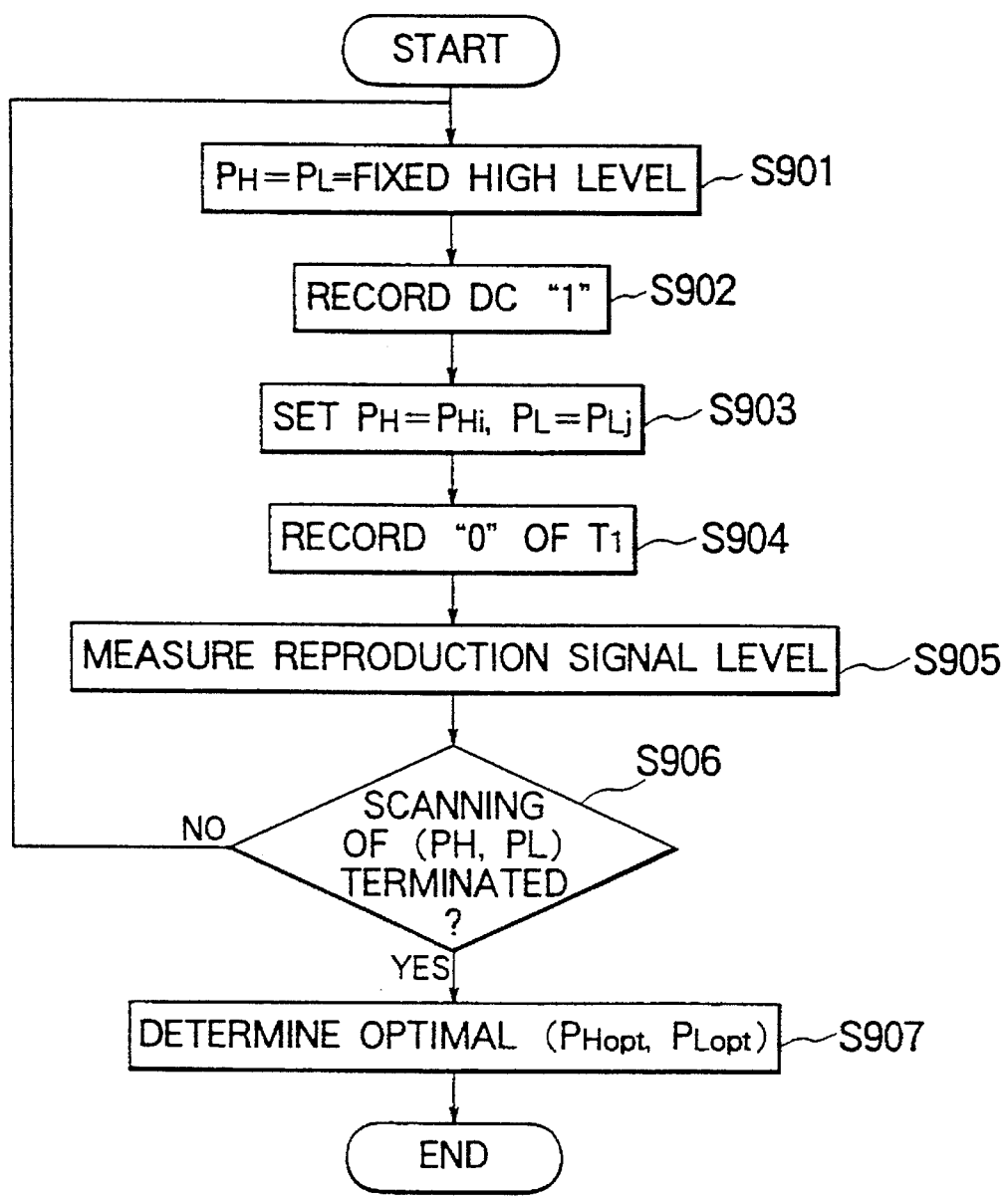
FIG. 32 is a flowchart showing the procedure for determining the optimal high and low recording laser power levels according to the ninth embodiment.

FIG. 32 is a flowchart showing the procedure for determining the optimal high and low recording laser power levels according to the ninth embodiment. The optically modulated overwritable magneto-optical recording device having the structure shown in FIG. 8 is used for the procedure. By means of the control by the controller 10, the optimal high and low recording laser power levels $P_{Hopt}$ and $P_{Lopt}$ are obtained on the basis of the recording of a single test signal $T_1$. The procedure is described referring to the waveforms of FIG. 33 where necessary.

Figure 33:
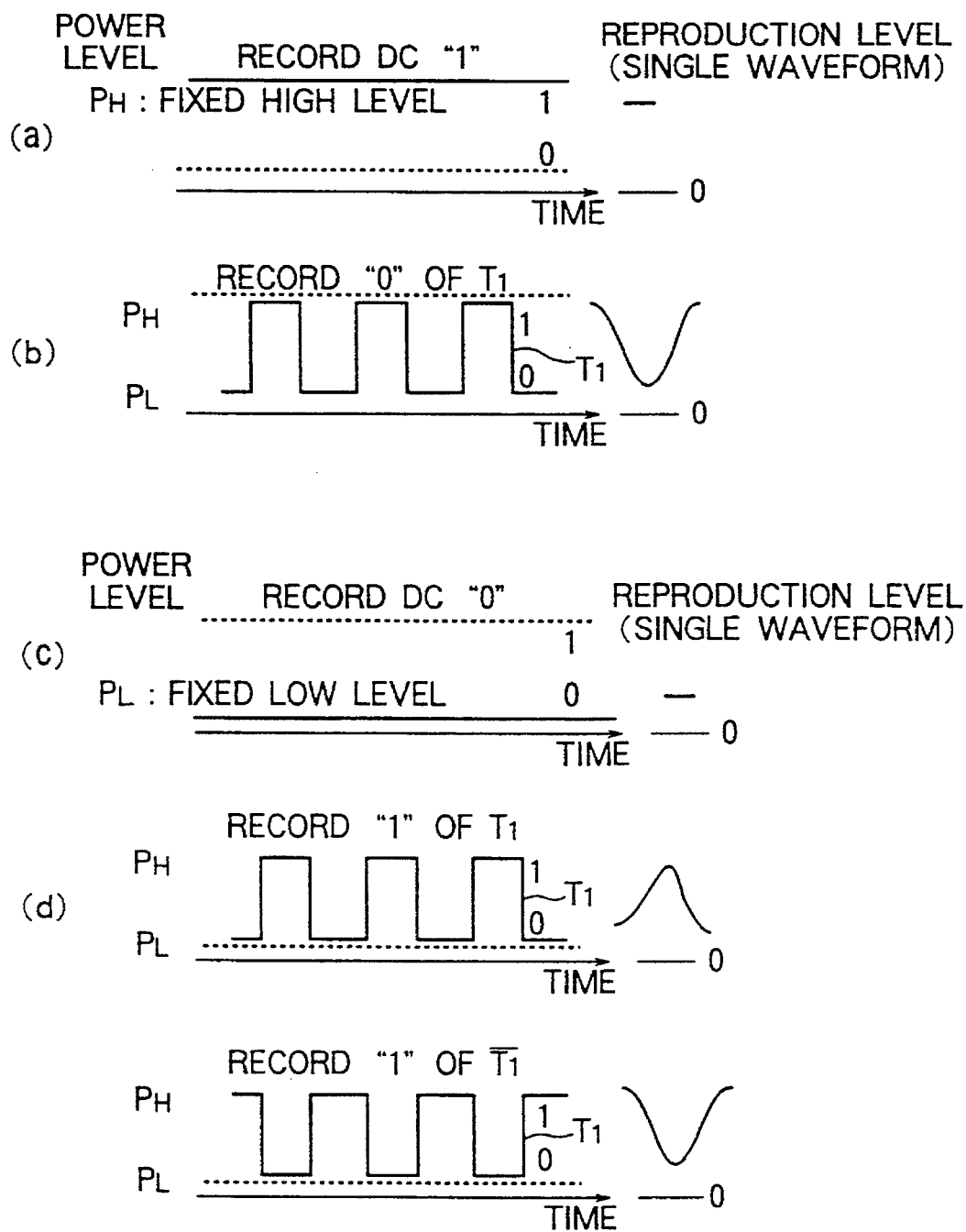
FIG. 33 shows the recording and reproduction waveforms of the DC and the test signals.

First, at step S901, the high recording laser power level $P_H$ and the low recording laser power level $P_L$ are both set at a predetermined fixed laser power level, and at step S902, a predetermined track upon the magneto-optical recording medium 1 is initialized by recording the DC "1" (see waveform at (a) in FIG. 33).

Next, at step S903, the $P_H$ and $P_L$ are assigned the values $P_{Hi}$ and $P_{Lj}$, respectively, where the combination ($P_{Hi}$, $P_{Lj}$) is going to scan a predetermined region upon the $P_H$–$P_L$ plane as described below. At step S904, the test signal $T_1$ of the shortest repetition period 3T, consisting of the pattern "100", is recorded upon the track of the magneto-optical recording medium 1 at the high and low recording laser power levels $P_H=P_{Hi}$ and $P_L=P_{Lj}$ (see waveform at (b) in FIG. 33). At step S905, the reproduction signal level is measured by means of the level detector 13. The reproduction signal levels corresponding to the high and low recording laser power levels $P_H$ and $P_L$ are stored in the memory 14, and are used as data values for searching the optimal high and low recording laser power levels. When the cycle of the steps S901 through S905 is completed, a new set of values $P_{Hi}$ and $P_{Lj}$ are assigned to high and low recording laser power levels $P_H$ and $P_L$, respectively, at step S901, and the steps S901 through S906 are repeated and the resulting reproduction signal levels are stored in the memory 14 in each execution cycle, until, at step S906, the index i and j reach a predetermined magnitude (a predetermined positive integer) and the two-dimensional scanning of ($P_H$, $P_L$) is completed.

Thereafter, at step S907, on the basis of the measurements by means of the two-dimensional scanning, the optimal high and low recording laser power levels $P_{Hopt}$ and $P_{Lopt}$ are determined using the linear gradient method. When the optimal high and low recording laser power levels are determined on the basis of the measurements by means of the two-dimensional scanning using the linear gradient method, it is sufficient to search for the combination of high and low recording laser power levels $P_H$ and $P_L$ upon the linear combination of a plurality of predetermined points, since the combination of the optimal levels is the maximum point of the reproduction signal level, as shown in FIG. 22. Thus, the combination of the optimal levels can be determined, for example, on the basis of three points.

Namely, from the result of two-dimensional scanning shown in FIGS. 32 and 33, the contours of reproduction signal levels shown in FIG. 22a is obtained. The combinations of high and low recording laser power levels ($P_H$, $P_L$) at three points $S_1$, $S_2$, and $S_3$ determine the linear combination of the high and low recording laser power levels as represented by line A in FIG. 22a. If the reproduction signal levels at the three points all exceed the allowable level, the central point is selected as representing the combination ($P_{Hopt}$, $P_{Lopt}$) of the optimal high and low recording laser power levels.

Figure 34:
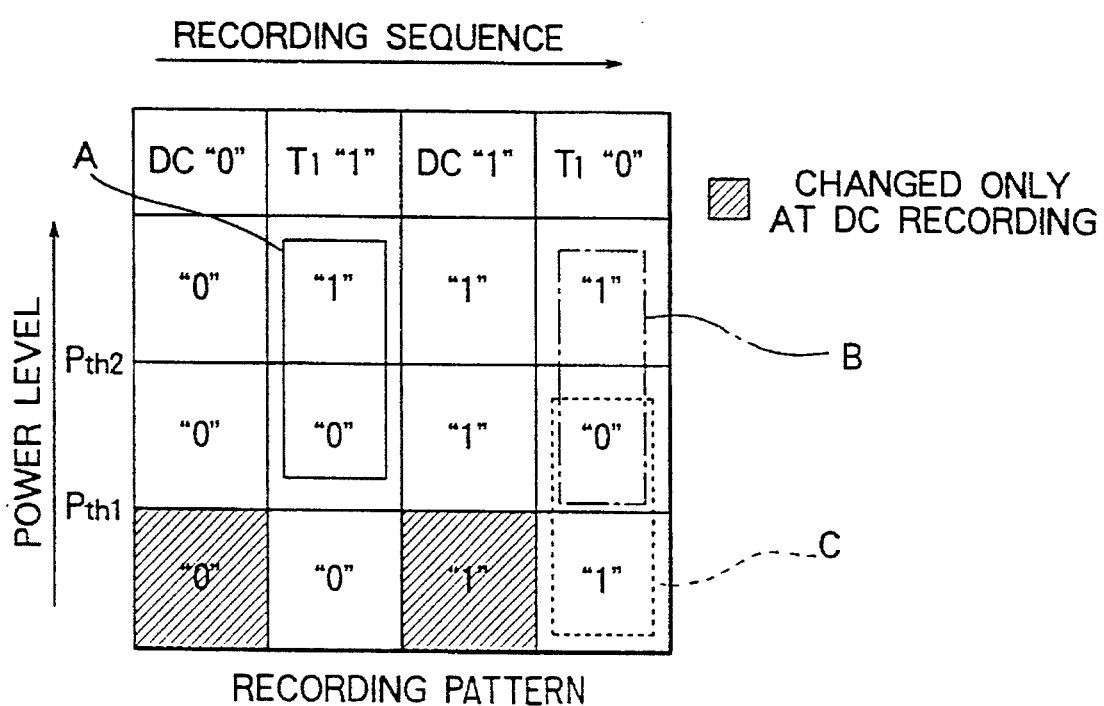
FIG. 34 is a diagram showing the recording pattern or scheme of test recording.

FIG. 34 is a diagram showing the recording pattern or scheme of test recording. The high and low recording laser power levels $P_H$ and $P_L$ radiated upon the magneto-optical recording medium 1 is converted into heat and thereby records "1" or "0". The optically modulated overwritable magneto-optical recording medium 1 consists of four magnetic layers exhibiting distinct Curie points. The Curie point $T_{C2}$ of the second magnetic layer 5 shown in FIG. 4 is the high threshold level for determining the spin direction "1" or "0". The Curie point $T_{C1}$ of the first magnetic layer 4 is the low threshold level at which the transcription to the first magnetic layer 4 is effected. The first magnetic layer 4 is the memory layer from which the information is read out. The Curie point $T_{C4}$ of the fourth magnetic layer 7 is not a parameter for determining the optimal recording laser power levels and gives the absolute rating at the higher range. Namely, the threshold level of the high recording laser power level $P_H$ is the laser power level $P_{th2}$ determined by Curie point $T_{C2}$. The threshold level at the low recording laser power level $P_L$ is the laser power level $P_{th1}$ determined by the Curie point $T_{C1}$.

As shown in FIG. 34, for determining the optimal high and low recording laser power levels, the above threshold levels $P_{th2}$ and $P_{th1}$ may be obtained as follows. First, the DC "0" is recorded and then test signal $T_1$ is recorded to record "1" (i.e., the recording of "1" of $T_1$), to determine the above threshold level $P_{th2}$. Thereafter, DC "1" is recorded and then "0" of test signal $T_1$ is recorded to determine the above threshold level $P_{th1}$.

However, according to this embodiment, the recording of DC "0" and the recording of "1" of $T_1$ thereafter can be dispensed with. Namely, provided that the combination shown within the dot-and-dash box B is recorded, the threshold level $P_{th2}$ can be determined. Thus, after recording DC "1", "0" of test signal $T_1$ is recorded, and the two recording processes of recording DC "0" and the recording "1" of signal $T_1$ and the subsequent reproduction process may be omitted. In spite of this omission, by two-dimensional scanning of the combination of high and low recording laser power levels $P_H$ and $P_L$, the combination at which the sign of the recording signal is inverted corresponding to the above threshold levels $P_{th2}$ and $P_{th1}$ can be determined. The recording time can thus be greatly reduced.

Namely, according to this embodiment, after recording DC "1" at a fixed laser power level, the inverted sign of the above recording signal is recorded using the single test signal as the data signal for recording. The combination of the high and low recording laser power levels is subjected to two-dimensional scanning, and the resulting reproduction signal levels are monitored. On the basis of the reproduction signal levels thus obtained, the optimal combination of high and low recording laser power levels for the magneto-optical recording medium 1 is determined. Thus, the test recording of the optically modulated overwritable magneto-optical recording device can be effected swiftly and accurately.

EMBODIMENT 10

Figure 35:
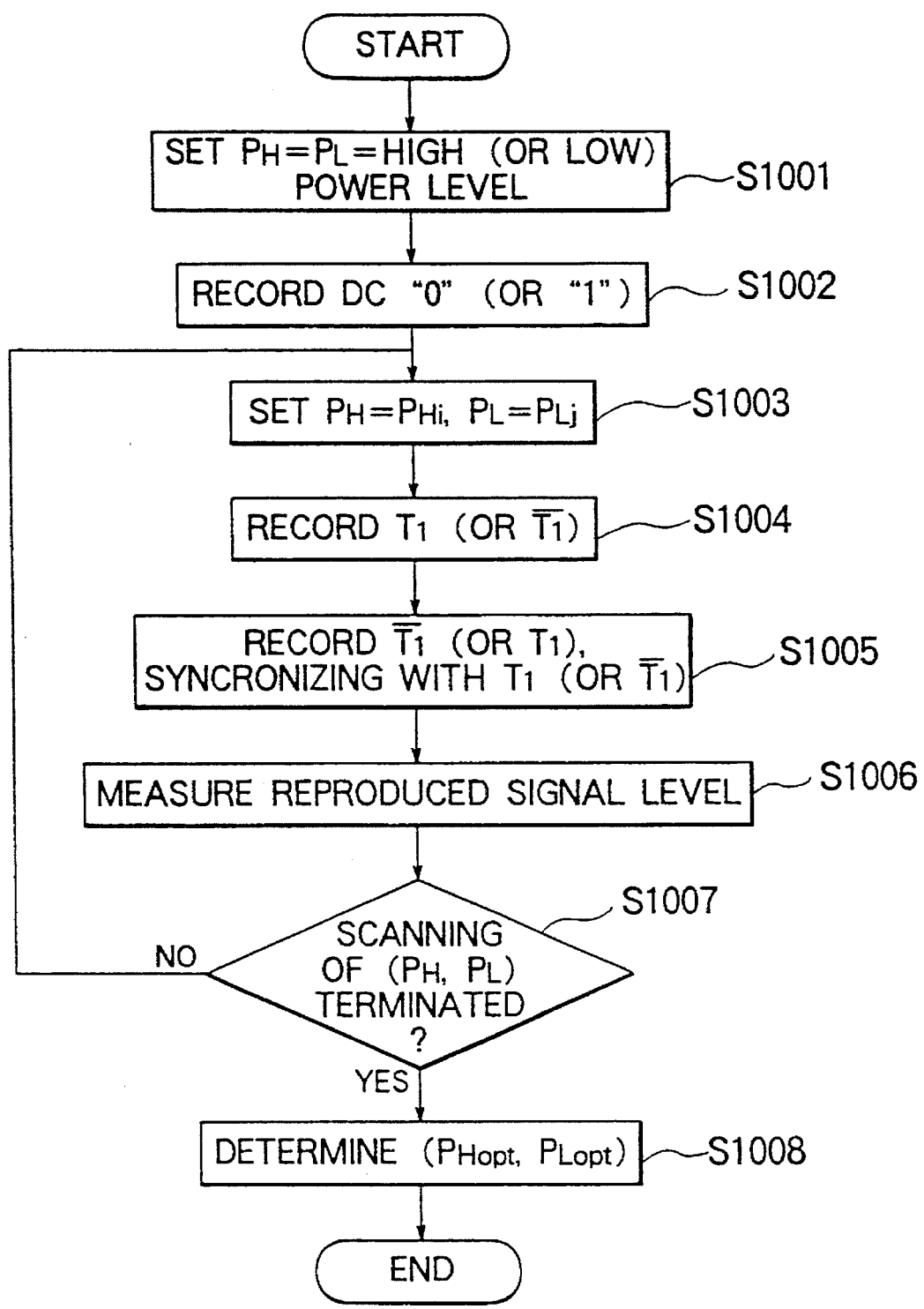
FIG. 35 is a flowchart showing the procedure for determining the optimal high and low recording laser power levels according to the tenth embodiment.

FIG. 35 is a flowchart showing the procedure for determining the optimal high and low recording laser power levels according to the tenth embodiment. The optically modulated overwritable magneto-optical recording device having the structure shown in FIG. 8 is used for the procedure. By means of the control by the controller 10, the optimal high and low recording laser power levels $P_{Hopt}$ and $P_{Lopt}$ are determined on the basis of a single test signal $T_1$. The procedure is described referring to the waveforms of FIG. 33 where necessary.

At step S1001, the high and low recording laser power levels is set at a fixed high or low laser power level, and at step S1002, DC "0" or DC "1" is recorded (see waveform (c) in FIG. 33). Next, at step S1003, the high and low recording laser power levels $P_H$ and $P_L$ are assigned the values $P_{Hi}$ and $P_{Lj}$, respectively, and at step S1004, the single test signal $T_1$ as the data signal for recording, or the complementary signal (represented in the flowchart by a bar over $T_1$) given by inversion of the sign of the test signal $T_1$, is recorded (see waveform (d) in FIG. 33).

Further, at step S1005, if the signal $T_1$ is recorded at step S1004, the complementary signal (represented in the flowchart by a bar over $T_1$) synchronized with the test signal $T_1$ is recorded (see waveform (e) in FIG. 33). If, on the other hand, the complement of $T_1$ (bar over $T_1$) is recorded at step S1004, the test signal $T_1$ complementary thereto and synchronized therewith is recorded. At step S1006, the reproduction signal levels are monitored and measured. The steps S1003 through S1007 are repeated to effect the two-dimensional scanning of the high and low recording laser power levels, until the scanning is terminated at step S1007. Thereafter at step S1008, the combination of optimal high and low recording laser power levels ($P_{Hopt}$, $P_{Lopt}$) is determined by means of the linear gradient method as in the case of the ninth embodiment.

Thus, according to this embodiment, the initial recording needs to be effected only at step S1001. As shown in FIG. 34 and described above in the case of the ninth embodiment, the high and low recording laser power levels $P_H$ and $P_L$ at which the sign of the recording signal is inverted corresponding to the threshold levels $P_{th2}$ and $P_{th1}$ can be determined. Thus, the test recording for the optically modulated overwritable recording can be effected swiftly and accurately.

By the way, in the case of the ninth and the tenth embodiment, the steps of recording at the high and low recording laser power levels $P_H$ and $P_L$ in FIGS. 32 and 35 can each be effected for one track, a half track, or one sector of a track, thereby reducing the test recording time. Further, besides the test signal of 3T, the test signal $T_0$ of a 8T repetition period, "10000000", the longest among the signals used as the data signal for recording, can be used as the data signal for recording.

As described above, since the recording characteristics of "1" and "0" are in the high level region, the measurement precision is enhanced. Further, since the test signal consists of a single pattern, the level detector can be constituted by a filter circuit for extracting the test signal $T_1$, and a simple test signal generator can be used for generating the test signal. The size of the overall circuit is thus reduced.

As described above, according to this embodiment, when the optimal high and low recording laser power levels are determined by means of the test recording, a single test signal is used, such that the searching time is reduced and the hardware structure is simplified. Further, since the optimal combination of recording levels is the maximum point of the reproduction signal level, the combination can be determined by searching the linear combination of the high and low recording laser power levels and hence on the basis of a set of points or combinations. The combination can thus be determined on the basis of the recording and reproduction within one turn of the magneto-optical recording medium.

Further, the combination of optimal high and low recording laser power levels can be determined rapidly on the basis of the two-dimensional scanning of the laser power levels as follows. As in the case of the sixth embodiment, the representative point in the cross-hatched region A within the region 1 upon the α-K plane of FIG. 12 is determined, wherein, paying due consideration to the points (a) through (c) for the selection of a representative point within the region A as described above, using the single test signal, the high and low recording laser power levels $P_H$ and $P_L$ are scanned to determine the recording and the erasure characteristics, and, from the combinations of the recording laser power levels of three points combined linearly upon monitoring the reproduction signal levels, the central point is selected as representing the combination of the optimal high and low recording laser power levels for the magneto-optical recording medium, in the case where the reproduction signal levels at the three points all exceed the allowable level. The optimal laser power levels can thus be determined rapidly. By the way, the region A in FIG. 12 corresponds to a region within a contour (the equal level curve) of the reproduction signal level as obtained from the two-dimensional coordinates of the high and low recording laser power levels $P_H$ and $P_L$ based on the test signal $T_1$ shown in FIG. 33.

The laser power levels are essentially one-dimensional quantities. However, the laser power levels $P_H$ and $P_L$ are combined and comprehended together as representing a point upon a two-dimensional α-K plane and the recording characteristics are obtained upon the α-K plane, where $\alpha = 1 - \eta/P_H$, $K = P_L/P_H$. The characteristic region for determining the optimal laser power levels is known a priori from the constants determined by the magneto-optical recording medium and the constants of the circuits. Further, the equations for the boundary lines determining the region are known a priori, such that, determining the parameters of the boundary lines by scanning the laser power levels by means of the drive (the magneto-optical recording device), the optimal laser power levels determining the optimal region can be determined.

These sequence of operations can be effected by the recording device itself without the help of an exterior specialized measurement device during the quasi-real time operation such as upon insertion of the magneto-optical recording medium. A highly reliable recording can be thus effected upon the recording medium of a narrow recording laser power level margin. Further, this embodiment is applicable to media of various degrees of sensitivity.

In the case of the above embodiments, this invention has been described as applied to the overwritable magneto-optical recording medium including the four magnetic layers. It is noted, however, this invention can be applied to media of other types such as the phase-change type recording media.

What is claimed is:

1. A recording device for recording information upon an optically modulated overwritable magneto-optical recording medium, said recording device comprising:

laser output means for radiating a laser beam upon said recording medium at a high and a low recording laser power level and at a reproduction laser power level which is lower than said high and low recording laser power levels;

level detector means for detecting a signal level reproduced from said recording medium; and driver and controller means for driving said laser output means for recording and reproduction of a two-value signal, wherein said driver and controller means drives said laser output means at said high and low recording laser power levels to record said two-value signal upon said recording medium, said driver and controller means setting drive levels of said high and low recording laser power levels of said laser output means and supplying said signal to be recorded upon said recording medium to said laser output means;

wherein said driver and controller means includes test recording and reproduction means and determines an optimal combination of said high and low recording laser power levels by means of said test recording and reproduction means which comprises:

means for driving said laser output means at a fixed high recording laser power level to record a DC high level signal upon a track of said recording medium;

means for driving said laser output means at test levels of said high and low recording laser power levels to record a test signal upon said track of said recording medium, a combination of test levels of said high and low recording laser power levels being successively modified to scan a two-dimensional region of said high and low recording laser power levels;

means for driving said laser output means at said reproduction laser power level to reproduce said test signal from said track;

means for storing reproduction signal levels corresponding to successive combinations of said test levels of said high and low recording laser power levels detected by means of said level detector; and means for determining said optimal combination of said high and low recording laser power levels on the basis of said stored reproduction signal levels.

2. A recording device for recording information upon an optically modulated overwritable magneto-optical recording medium, said recording device comprising:

laser output means for radiating a laser beam upon said recording medium at a high and a low recording laser power level and at a reproduction laser power level which is lower than said high and low recording laser power levels;

level detector means for detecting a signal level reproduced from said recording medium; and driver and controller means for driving said laser output means for recording and reproduction of a two-value signal, wherein said driver and controller means drives said laser output means at said high and low recording laser power levels to record said two-value signal upon said recording medium, said driver and controller means setting drive levels of said high and low recording laser power levels of said laser output means and supplying said signal to be recorded upon said recording medium to said laser output means;

wherein said driver and controller means includes test recording and reproduction means and determines an optimal combination of said high and low recording laser power levels by means of said test recording and reproduction means which comprises:

means for driving said laser output means at test levels of said high and low recording laser power levels to record a test signal upon said track of said recording medium, wherein a combination of said test levels of said high and low recording laser power levels is successively modified to scan a two-dimensional region of said high and low recording laser power levels;

means for driving said laser output means at said reproduction laser power level to reproduce said test signal recorded upon said track at said high and low recording laser power levels, wherein a reproduction signal level corresponding to each combination of said test levels of said high and low recording laser power levels is determined by means of said level detector means;

means for representing reproduction signal levels corresponding to said combinations of test levels of said high and low recording laser power levels upon a two-dimensional coordinate plane of a first coordinate corresponding to said high recording laser power level and a second coordinate corresponding to a ratio of said low recording laser power level to said high recording laser power level, said two-dimensional coordinate plane being divided into a plurality of characteristic regions of reproduction signal levels by means of a plurality of boundary lines;

means for determining an allowable region within one characteristic region of said plurality of regions upon said two-dimensional coordinate plane, said one characteristic region corresponding to combinations of said high and low recording laser power levels at which said signal is reproduced correctly; and means for determining a representative point within said allowable region, a combination of said coordinates of said representative point determining said optimal combination of said high and low recording laser power levels.

3. A recording device as claimed in claim 2, wherein said means for determining said allowable region first determines an initial point substantially corresponding to a combination of said high and low recording laser power levels both set equal to said reproduction laser power level, and then successively crosses said boundary lines by means of linear calculations based on linear gradient characteristic of said reproduction signal levels upon said two-dimensional coordinate plane to reach within said one characteristic region.

4. A recording device for recording information upon an optically modulated overwritable magneto-optical recording medium, said recording device comprising:

laser output means for radiating a laser beam upon said recording medium at a high and a low recording laser power level and at a reproduction laser power level which is lower than said high and low recording laser power levels; and driver and controller means for driving said laser output means for recording and reproduction of a two-value signal, wherein said driver and controller means drives said laser output means at said high and low recording laser power levels to record said two-value signal upon said recording medium, said driver and controller means setting drive levels of said high and low recording laser power levels of said laser output means and supplying said signal to be recorded upon said recording medium to said laser output means;

wherein said driver and controller means includes test recording and reproduction means and determines an optimal combination of said high and low recording laser power levels by means of said test recording and reproduction means including:

means for driving said laser output means at test levels of said high and low recording laser power levels to record a test signal upon a track of said recording medium, a combination of test levels of said high and low recording laser power levels being successively modified to scan a two-dimensional region of said high and low recording laser power levels;

means for driving said laser output means at said reproduction laser power level to reproduce said test signal from said track;

means for determining error rates of said reproduced test signal corresponding to successive combinations of said test levels of said high and low recording laser power levels;

means for determining combinations of said test levels of said high and low recording laser power levels at which said error rate of said reproduced signal is less than a predetermined reference level; and means for selecting a combination of a lowest laser power level as said optimal combination of said high and low recording laser power levels, from among combinations selected by said means fop determining combinations.

5. A recording device as claimed in claim 4, wherein said error rates determining means of said test recording and reproduction means includes: means for defining detection windows within which respective bits of said two-value signal are detected; and means for narrowing a width of said detection windows during reproduction of said test signal.

6. A recording device as claimed in claim 4, wherein said test recording and reproduction means further includes means fox multiplying by a predetermined factor said high and low recording laser power levels of said optimal combination selected by said selecting means, thereby obtaining an operating optimal combination of said high and low recording laser power levels.

7. A recording device as claimed in claim 5, wherein said test recording and reproduction means further includes means for multiplying by a predetermined factor said high and low recording laser power levels of said optimal combination selected by said selecting means, thereby obtaining an operating optimal combination of said high and low recording laser power levels.

8. A recording device as claimed in claim 4, wherein said selecting means selects as said combination of lowest laser power level a combination of said high and low recording laser power levels exhibiting a smallest product of said high and low recording laser power levels.

9. A recording device as claimed in claim 5, wherein said selecting means selects as said combination of lowest laser power level a combination of said high and low recording laser power levels exhibiting a smallest product of said high and low recording laser power levels.

10. A recording device as claimed in claim 6, wherein said selecting means selects as said combination of lowest laser power level a combination of said high and low recording laser power levels exhibiting a smallest product of said high and low recording laser power levels.

11. A recording device as claimed in claim 7, wherein said selecting means selects as said combination of lowest laser power level a combination of said high and low recording laser power levels exhibiting a smallest product of said high and low recording laser power levels.

12. A recording device as claimed in claim 4, wherein said selecting means selects as said combination of lowest laser power level a combination of said high and low recording laser power levels exhibiting a smallest sum of said high and low recording laser power levels.

13. A recording device as claimed in claim 5, wherein said selecting means selects as said combination of lowest laser power level a combination of said high and low recording laser power levels exhibiting a smallest sum of said high and low recording laser power levels.

14. A recording device as claimed in claim 6, wherein said selecting means selects as said combination of lowest laser power level a combination of said high and low recording laser power levels exhibiting a smallest sum of said high and low recording laser power levels.

15. A recording device as claimed in claim 7, wherein said selecting means selects as said combination of lowest laser power level a combination of said high and low recording laser power levels exhibiting a smallest sum of said high and low recording laser power levels.

16. A recording device for recording information upon an optically modulated overwritable magneto-optical recording medium, said recording device comprising:

laser output means for radiating a laser beam upon said recording medium at a high and a low recording laser power level and at a reproduction laser power level which is lower than said high and low recording laser power levels;

level detector means for detecting a signal level reproduced from said recording medium; and driver and controller means for driving said laser output means means for recording and reproduction of a two-value signal, wherein said driver and controller means drives said laser output means at said high and low recording laser power levels to record said two-value signal upon said recording medium, said driver and controller means setting drive levels of said high and low recording laser power levels of said laser output means and supplying said signal to be recorded upon said recording medium to said laser output means;

wherein said driver and controller means includes test recording and reproduction means and determines an optimal combination of said high and low recording laser power levels by means of said test recording and reproduction means which comprises:

means for driving said laser output means at test levels of said high and low recording laser power levels to record a test signal upon said track of said recording medium, a combination of said test levels of said high and low recording laser power levels being successively modified to scan at least three points lying on a line within a two-dimensional region of said high and low recording laser power levels;

means for driving said laser output means at said reproduction laser power level to reproduce said test signal from said track;

means for determining respective reproduction signal levels of said test signal recorded at said test levels of said high and low recording laser power levels corresponding to said three points, respectively, lying upon said line;

means for approximating a distribution of said reproduction signal level along said line on the basis of said reproduction signal levels corresponding to said three points; and means for determining said optimal combination of high and low recording laser power levels on the basis of said distribution of said reproduction signal level upon said line.

17. A recording device as claimed in claim 15, wherein said optimal combination determining means determines a central point of said three points as representing said optimal combination of said high and low recording laser power levels, if said reproduction signal levels corresponding to said three points all exceed a predetermined allowable level.

18. A recording device for recording information upon an optically modulated overwritable magneto-optical recording medium, said recording device comprising:

laser output means for radiating a laser beam upon said recording medium at a high and a low recording laser power level and at a reproduction laser power level which is lower than said high and low recording laser power levels;

driver and controller means for driving said laser output means for recording and reproduction of a two-value signal, wherein said driver and controller means drives said laser output means at said high and low recording laser power levels to record said two-value signal upon said recording medium, said driver and controller means setting drive levels of said high and low recording laser power levels of said laser output means and supplying said signal to be recorded upon said recording medium to said laser output means; and wherein said driver and controller means includes test recording and reproduction means and determines an optimal combination of said high and low recording laser power levels by means of said test recording and reproduction means which includes:

means for driving said laser output means at test levels of said high and low recording laser power levels to record a two-value test signal upon a track of said recording medium, a combination of test levels of said high and low recording laser power levels being successively modified to scan a two-dimensional region of said high and low recording laser power levels;

means for driving said laser output means at said reproduction laser power level to reproduce said test signal from said track;

means for defining detection windows for detecting respective bits of said two-value signal, and for shifting said detection windows by a predetermined shift amount in a delaying and advancing direction;

means for determining first and second error rates of said reproduced test signal obtained, respectively, when said detection windows are shifted in said delaying and advancing direction, respectively, by means of said shifting means, said first and second error rates being determined for each successive combination of said test levels of said high and low recording laser power levels;

means for determining combinations of said test levels of said high and low recording laser power levels at which said first and second error rates of said reproduced signal are both less than a predetermined reference level; and means for determining an average of a maximum and a minimum of said high recording laser power levels, and an average of a maximum and a minimum of said low recording laser power levels, of said combinations determined by said combinations determining means, said optimal combination of high and low recording laser power levels being determined as a combination of said two averages.

19. A recording device for recording information upon an optically modulated overwritable magneto-optical recording medium, said recording device comprising:

laser output means for radiating a laser beam upon said recording medium at a high and a low recording laser power level and at a reproduction laser power level which is lower than said high and low recording laser power levels;

driver and controller means for driving said laser output means for recording and reproduction of a two-value signal, wherein said driver and controller means drives said laser output means at said high and low recording laser power levels to record said two-value signal upon said recording medium, said driver and controller means setting drive levels of said high and low recording laser power levels of said laser output means and supplying said signal to be recorded upon said recording medium to said laser output means; and wherein said driver and controller means includes test recording and reproduction means and determines an optimal combination of said high and low recording laser power levels by means of said test recording and reproduction means which includes:

means for driving said laser output means at test levels of said high and low recording laser power levels to record a two-value test signal upon a track of said recording medium, a combination of test levels of said high and low recording laser power levels being successively modified to scan a two-dimensional region of said high and low recording laser power levels;

means for driving said laser output means at said reproduction laser power level to reproduce said test signal from said track;

means for defining detection windows for detecting respective bits of said two-value test signal, and for shifting said detection windows successively by a variable shift amount in a delaying and advancing direction;

means for determining error rates of said reproduced test signal obtained when said detection windows are shifted successively by said variable shift amount in said delaying and advancing direction by means of said shifting means;

means for determining a window margin corresponding to each combination of said high and low recording laser power levels at which said test signal is recorded, said window margin being a smaller of a delaying and an advancing shift amount wherein error rate obtained with delaying shift of said detection windows smaller than said delaying shift amount is less than a predetermined level and error rate obtained with advancing shift of said detection windows smaller than said advancing shift amount is less than a predetermined level; and means for determining as said optimal combination of high and low recording laser power levels a combination of said test levels of said high and low recording laser power levels at which said window margin is at a maximum.

20. A recording device for recording information upon an optically modulated overwritable magneto-optical recording medium, said recording device comprising:

laser output means for radiating a laser beam upon said recording medium at a high and a low recording laser power level and at a reproduction laser power level which is lower than said high and low recording laser power levels;

level detector means for detecting a signal level reproduced from said recording medium; and driver and controller means for driving said laser output means for recording and reproduction of a two-value signal, wherein said driver and controller means drives said laser output means at said high and low recording laser power levels to record said two-value signal upon said recording medium, said driver and controller means setting drive levels of said high and low recording laser power levels of said laser output means and supplying said signal to be recorded upon said recording medium to said laser output means;

wherein said driver and controller means includes test recording and reproduction means and determines an optimal combination of said high and low recording laser power levels by means of said test recording and reproduction means which comprises:

means for driving said laser output means at a fixed high recording laser power level to record a DC high level signal upon a track of said recording medium;

means for driving said laser output means at test levels of said high and low recording laser power levels to record a test signal upon said track of said recording medium, a combination of test levels of said high and low recording laser power levels being successively modified to scan two-dimensional region of said high and low recording laser power levels;

means for driving said laser output means at said reproduction laser power level to reproduce said test signal from said track;

means for representing reproduction signal levels corresponding to successive combinations of said test levels of said high and low recording laser power levels upon a two-dimensional coordinate plane; and means for determining said optimal combination of said high and low recording laser power levels on the basis of said reproduction signal levels.

21. A recording device for recording information upon an optically modulated overwritable magneto-optical recording medium, said recording device comprising:

laser output means for radiating a laser beam upon said recording medium at a high and a low recording laser power level and at a reproduction laser power level which is lower than said high and low recording laser power levels;

level detector means for detecting a signal level reproduced from said recording medium; and driver and controller means for driving said laser output means means for recording and reproduction of a two-value signal, wherein said driver and controller means drives said laser output means at said high and low recording laser power levels to record said two-value signal upon said recording medium, said driver and controller means setting drive levels of said high and low recording laser power levels of said laser output means and supplying said signal to be recorded upon said recording medium to said laser output means;

wherein said driver and controller means includes test recording and reproduction means and determines an optimal combination of said high and low recording laser power levels by means of said test recording and reproduction means which comprises:

means for driving said laser output means at a fixed high recording laser power level or a fixed low recording laser power level to record a DC high level signal or a DC low level signal upon a track of said recording medium;

means for driving said laser output means at test levels of said high and low recording laser power levels to record a first bit pattern, corresponding to a test signal or a inversion of said test signal, upon said track of said recording medium, and, a second bit pattern consisting of inversion of said first bit pattern synchronized with said test signal, a combination of test levels of said high and low recording laser power levels being successively modified to scan a two-dimensional region of said high and low recording laser power levels;

means for driving said laser output means at said reproduction laser power level to reproduce said test signal from said track;

means for representing reproduction signal levels corresponding to successive combinations of said test levels of said high and low recording laser power levels upon a two-dimensional coordinate plane; and means for determining said optimal combination of said high and low recording laser power levels on the basis of said reproduction signal levels represented upon said two-dimensional coordinate plane.

22. A recording device for recording information upon an optically modulated overwritable magneto-optical recording medium, said recording device comprising:

laser output means for radiating a laser beam upon said recording medium at a high and a low recording laser power level and at a reproduction laser power level which is lower than said high and low recording laser power levels;

level detector means for detecting a signal level reproduced from said recording medium; and driver and controller means for driving said laser output means for recording and reproduction of a two-value signal, wherein said driver and controller means drives said laser output means at said high and low recording laser power levels to record said two-value signal upon said recording medium, said driver and controller means setting drive levels of said high and low recording laser power levels of said laser output means and supplying said signal to be recorded upon said recording medium to said laser output means;

wherein said driver and controller means includes test recording and reproduction means and determines an optimal combination of said high and low recording laser power levels by means of said test recording and reproduction means which comprises:

means for driving said laser output means at a fixed high recording laser power level to record a DC high level signal upon a track of said recording medium;

means for obtaining and storing data representative of a reproduction signal levels as a function of a high recording laser power level and a low recording laser power level as said high recording laser power level is successively varied over a first range and said low recording laser power level is successively varied over a second range; and means for determining said optimal combination of said high and low recording laser power levels on the basis of said stored data.

23. A recording device as claimed in claim 22, wherein said means for obtaining data representative of reproduction signal levels comprises:

means for driving said laser output means at test levels of said high and low recording laser power levels to record a test signal upon said track of said recording medium;

means for driving said laser output means at said reproduction laser power level to reproduce said test signal from said track; and means for storing reproduction signal levels corresponding to successive combinations of said test levels of said high and low recording laser power levels detected by means of said level detector.

24. A recording device as claimed in claim 22, wherein said means for obtaining data representative of reproduction signal levels varies the high and low recording laser power level successively over a series of discrete points within said first and second ranges, respectively.

25. A recording device for recording information upon an optically modulated overwritable magneto-optical recording medium, said recording device comprising:

laser output means for radiating a laser beam upon said recording medium at a high and a low recording laser power level and at a reproduction laser power level which is lower than said high and low recording laser power levels;

level detector means for detecting a signal level reproduced from said recording medium; and driver and controller means for driving said laser output means for recording and reproduction of a two-value signal, wherein said driver and controller means drives said laser output means at said high and low recording laser power levels to record said two-value signal upon said recording medium, said driver and controller means setting drive levels of said high and low recording laser power levels of said laser output means and supplying said signal to be recorded upon said recording medium to said laser output means;

wherein said driver and controller means includes test recording and reproduction means and determines an optimal combination of said high and low recording laser power levels by means of said test recording and reproduction means which comprises:

means for driving said laser output means at a fixed high recording laser power level to record a DC high level signal upon a track of said recording medium;

means for obtaining data representative reproduction signal amplitudes as a function of a high recording laser power level and a low recording laser power level as said high recording laser power level is successively varied over a first range and said low recording laser power level is successively varied over a second range; and means for determining said optimal combination of said high and low recording laser power levels on the basis of said data.

26. A recording device as claimed in claim 25, wherein said means for obtaining data representative of reproduction signal amplitudes comprises:

means for driving said laser output means at test levels of said high and low recording laser power levels to record a test signal upon said track of said recording medium;

means for driving said laser output means at said reproduction laser power level to reproduce said test signal from said track; and means for representing reproduction signal amplitudes corresponding to successive combinations of said test levels of said high and low recording laser power levels upon a two-dimensional coordinate plane.

27. A recording device as claimed in claim 25, wherein said means for obtaining data representative of a variation of a reproduction signal amplitude varies the high and low recording laser power level successively over a series of discrete points within said first and second ranges, respectively.

28. A recording device for recording information upon an optically modulated overwritable magneto-optical recording medium, said recording device comprising:

laser output means for radiating a laser beam upon said recording medium at a high and a low recording laser power level and at a reproduction laser power level which is lower than said high and low recording laser power levels;

level detector means for detecting a signal level reproduced from said recording medium; and driver and controller means for driving said laser output means for recording and reproduction of a two-value signal, wherein said driver and controller means drives said laser output means at said high and low recording laser power levels to record said two-value signal upon said recording medium, said driver and controller means setting drive levels of said high and low recording laser power levels of said laser output means and supplying said signal to be recorded upon said recording medium to said laser output means;

wherein said driver and controller means includes test recording and reproduction means and determines an optimal combination of said high and low recording laser power levels by means of said test recording and reproduction means which comprises:

means for driving said laser output means at a fixed high recording laser power level to record a DC high level signal upon a track of said recording medium;

means for obtaining and storing data representative of reproduction signal amplitudes as a function of a high recording laser power level and a low recording laser power level wherein a first one of said high recording laser power level and said low recording laser power level is successively varied over a first range while a second one of said high recording laser power level and said low recording laser power level is maintained at a constant, and upon reaching an end of said first range, said second one of said high recording laser power level and said low recording laser power level is incremented and said first one is again varied over said first range, and this sequence is repeated until an end of said second range is reached; and means for determining said optimal combination of said high and low recording laser power levels on the basis of said stored reproduction signal amplitudes.

29. A recording device for recording information upon an optically modulated overwritable magneto-optical recording medium, said recording device comprising:

laser output means for radiating a laser beam upon said recording medium at a high and a low recording laser power level and at a reproduction laser power level which is lower than said high and low recording laser power levels;

level detector means for detecting a signal level reproduced from said recording medium; and driver and controller means for driving said laser output means for recording and reproduction of a two-value signal, wherein said driver and controller means drives said laser output means at said high and low recording laser power levels to record said two-value signal upon said recording medium, said driver and controller means setting drive levels of said high and low recording laser power levels of said laser output means and supplying said signal to be recorded upon said recording medium to said laser output means;

wherein said driver and controller means includes test recording and reproduction means and determines an optimal combination of said high and low recording laser power levels by means of said test recording and reproduction means which comprises:

means for driving said laser output means at a fixed high recording laser power level to record a DC high level signal upon a track of said recording medium;

means for obtaining data representative of reproduction signal amplitudes as a function of a high recording laser power level and a low recording laser power level wherein a first one of said high recording laser power level and said low recording laser power level is successively varied over a first range while a second one of said high recording laser power level and said low recording laser power level is maintained at a constant, and upon reaching an end of said first range, said second one of said high recording laser power level and said low recording laser power level is incremented and said first one is again varied over said first range, and this sequence is repeated until an end of said second range is reached; and means for determining said optimal combination of said high and low recording laser power levels on the basis of said reproduction signal amplitudes.

* * * * *